(12) United States Patent
Shimomura

(10) Patent No.: US 8,988,786 B2
(45) Date of Patent: Mar. 24, 2015

(54) ZOOM LENS AND IMAGE PICKUP APPARATUS INCLUDING THE SAME

(71) Applicant: Canon Kabushiki Kaisha, Tokyo (JP)

(72) Inventor: Kazuya Shimomura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/860,595

(22) Filed: Apr. 11, 2013

(65) Prior Publication Data

US 2013/0271850 A1 Oct. 17, 2013

(30) Foreign Application Priority Data

Apr. 13, 2012 (JP) .................................. 2012-092305

(51) Int. Cl.
*G02B 15/14* (2006.01)
*G02B 15/173* (2006.01)

(52) U.S. Cl.
CPC .............. *G02B 15/14* (2013.01); *G02B 15/173* (2013.01)
USPC .......................................... 359/687; 359/683

(58) Field of Classification Search
USPC .................................................. 359/687, 683
See application file for complete search history.

(56) References Cited

U.S. PATENT DOCUMENTS

| | | | |
|---|---|---|---|
| 5,737,128 A | 4/1998 | Usui | |
| 5,986,820 A * | 11/1999 | Usui et al. ...................... | 359/684 |
| 6,545,818 B2 * | 4/2003 | Usui et al. ...................... | 359/686 |
| 7,885,014 B2 | 2/2011 | Inomoto et al. | |
| 2004/0070844 A1 | 4/2004 | Sato | |
| 2008/0144188 A1 | 6/2008 | Hamano | |
| 2009/0034091 A1 | 2/2009 | Sakamoto | |
| 2009/0296231 A1 | 12/2009 | Shirasuna | |
| 2010/0194969 A1 | 8/2010 | Sakamoto | |
| 2010/0302649 A1 | 12/2010 | Yoshimi et al. | |
| 2011/0037878 A1 | 2/2011 | Wakazono et al. | |
| 2012/0127587 A1 | 5/2012 | Yakita | |
| 2012/0134031 A1 | 5/2012 | Eguchi et al. | |
| 2012/0200940 A1 | 8/2012 | Ohmoto | |
| 2012/0218645 A1 | 8/2012 | Yoshimi | |
| 2013/0271849 A1 * | 10/2013 | Hori .............................. | 359/687 |

FOREIGN PATENT DOCUMENTS

| | | |
|---|---|---|
| JP | 52084754 A | 7/1977 |
| JP | 6242378 A | 9/1994 |
| JP | 11-174323 A | 7/1999 |
| JP | 2008-216480 A | 9/2008 |

OTHER PUBLICATIONS

Extended European Search Report for corresponding EP 13001820.3, mail date Jun. 26, 2013.

* cited by examiner

*Primary Examiner* — Scott J Sugarman
(74) *Attorney, Agent, or Firm* — Rossi, Kimms & McDowell LLP

(57) ABSTRACT

A zoom lens includes in order from an object side: a first lens unit having a positive refractive power which does not move for zooming; a second lens unit having a negative refractive power which moves during zooming; a third lens unit having a positive refractive power which moves during zooming; and a fourth lens unit having a positive refractive power which does not move for zooming, the third lens unit moving to an image side and then to the object side for zooming from a wide angle end to a telephoto end, in which a focal length (f1) of the first lens unit, a focal length (f2) of the second lens unit, a focal length (f3) of the third lens unit, and a lateral magnification (β3w) of the third lens unit at the wide angle end when a ray enters from infinity are appropriately set.

10 Claims, 18 Drawing Sheets

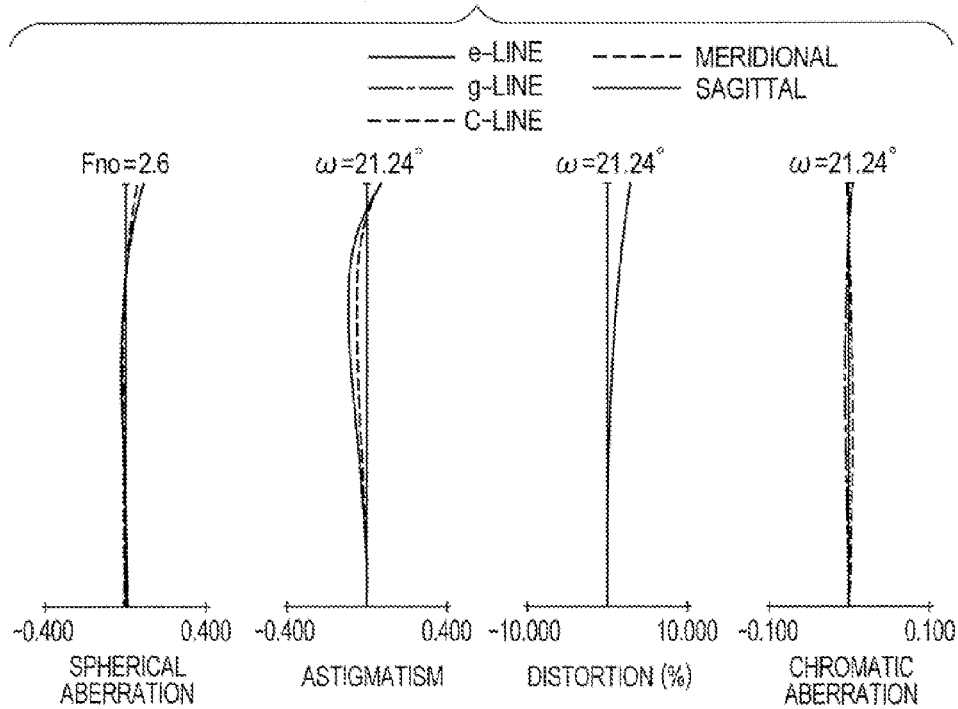
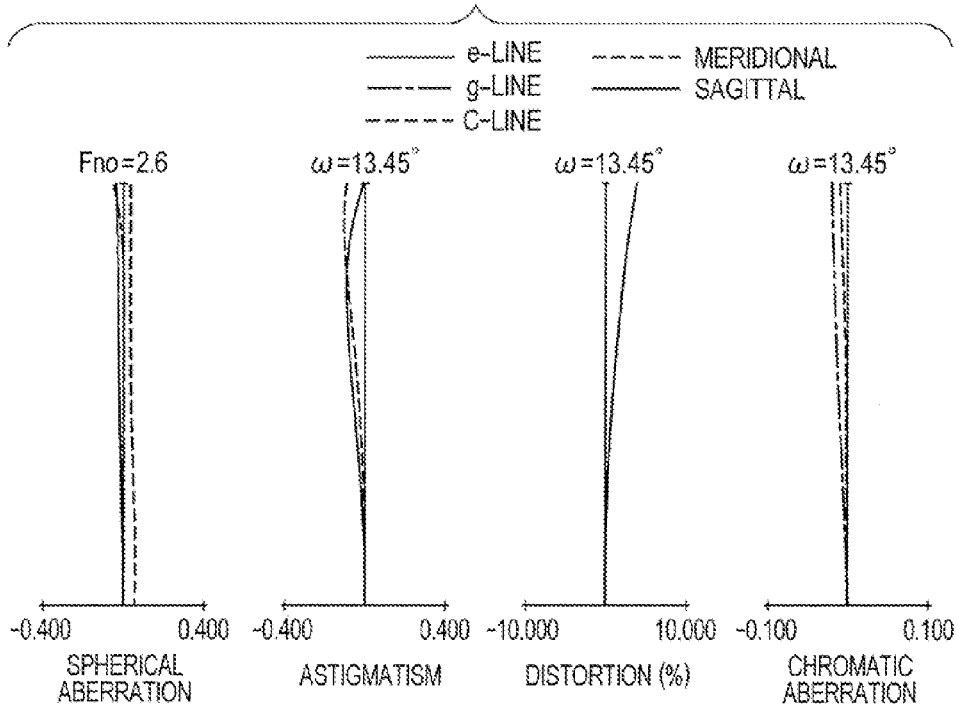

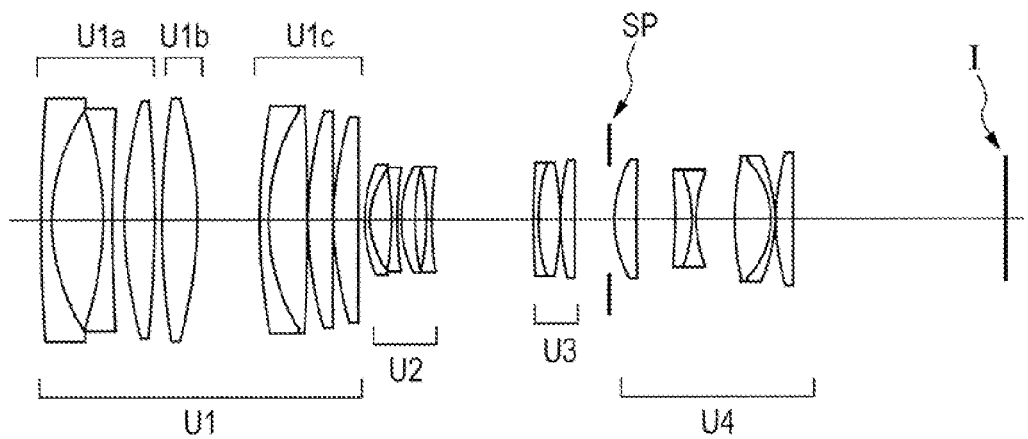
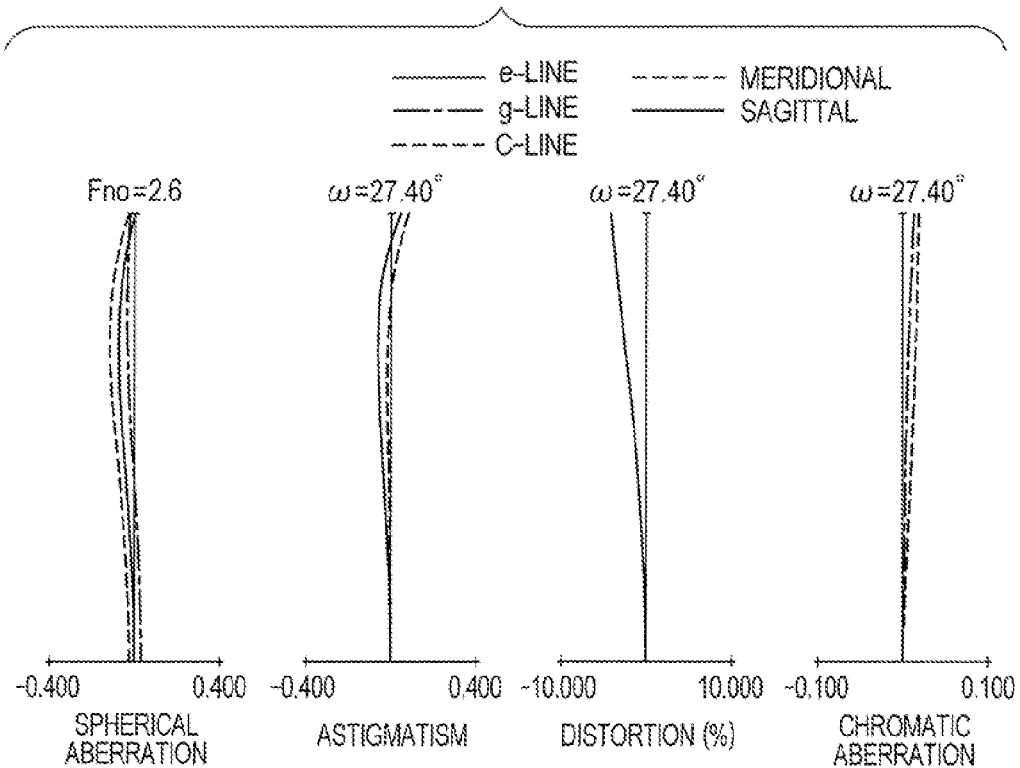

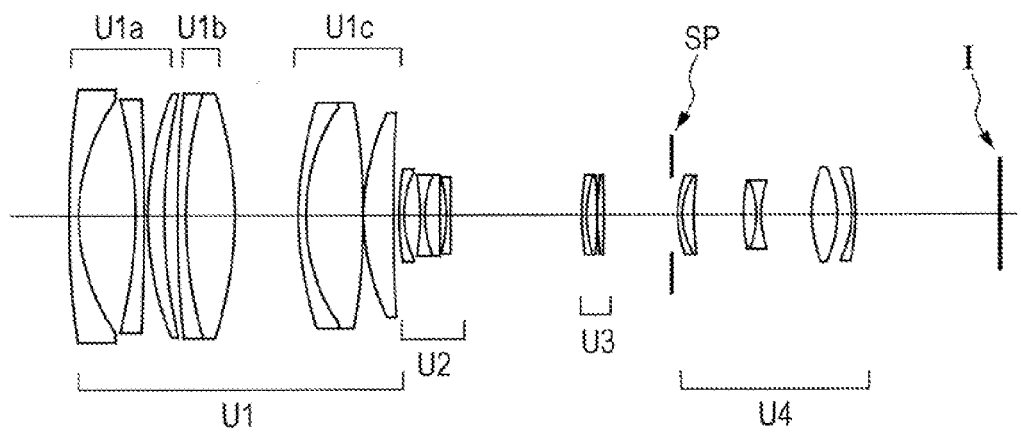
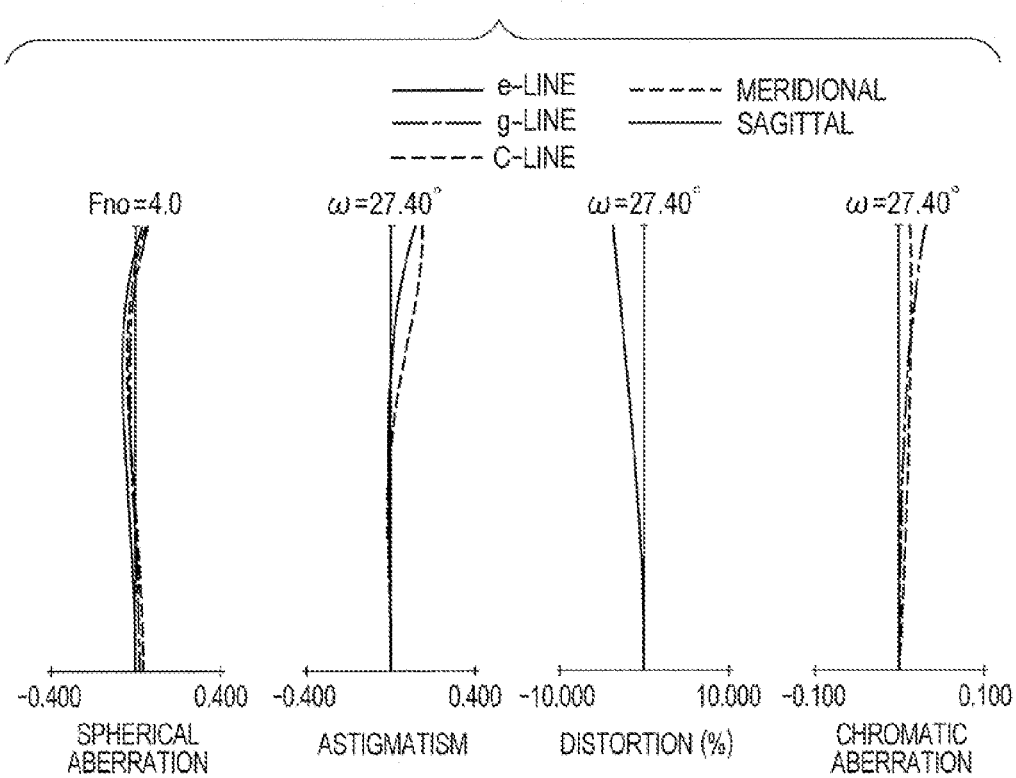

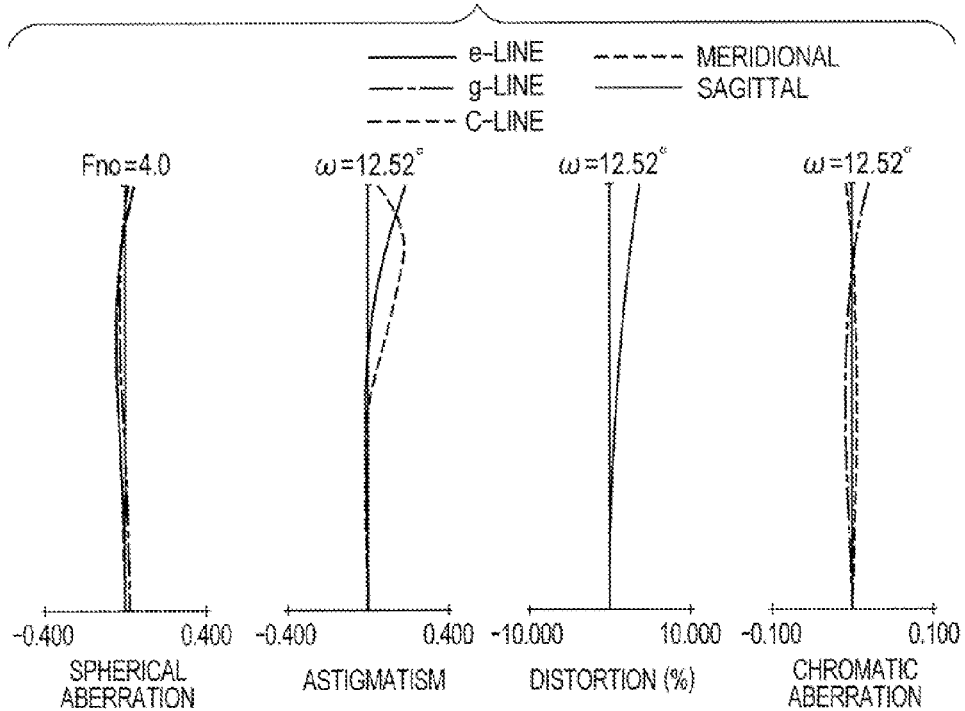
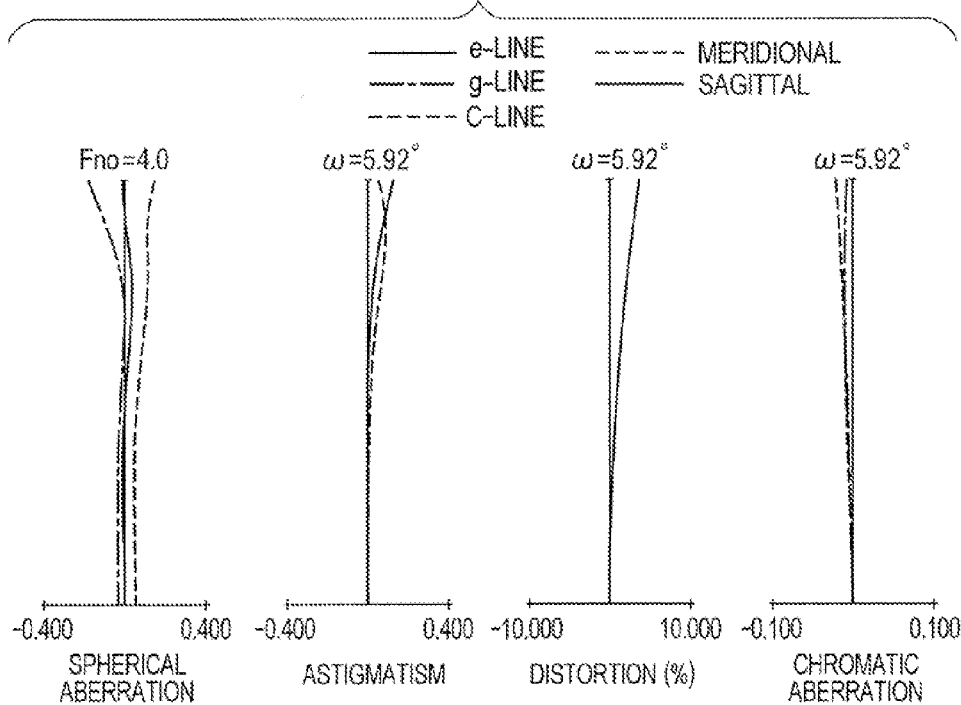

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, and more particularly, to a zoom lens suited for use in a broadcasting television camera, a cinema camera, a video camera, a digital still camera, and a silver-halide film camera.

2. Description of the Related Art

In recent years, a zoom lens having reduced size and weight, a wide angle of field, a high zoom ratio, and high optical performance is desired for use in an image pickup apparatus, such as a television camera, a cinema camera, a film camera, or a video camera. In particular, an image pickup device such as a charge coupled device (CCD) or a complementary metal oxide semiconductor (CMOS) used in a television or cinema camera as a professional moving image pickup system has a substantially uniform resolution over the entire image pickup range. Therefore, a zoom lens using the image pickup device is required to have a substantially uniform resolution from the center to the periphery of the screen. There are also needs for reductions in size and weight for an image pickup mode that places emphasis on mobility and operability.

As a zoom lens having a wide angle of field and a high zoom ratio, there has been known a positive-lead-type four-unit zoom lens in which a lens unit having a positive refractive power is arranged closest to the object and which consists of four lens units as a whole.

For example, Japanese Patent Application Laid-Open No. H06-242378 discloses a four-unit zoom lens having an F-number of about 1.6 to 1.7 at the wide angle end, an angle of field of about 65° to 87° at the wide angle end, an angle of field of about 4° to 13° at the telephoto end, and a magnification-varying ratio of about 8 to 18. The four-unit zoom lens is constituted of a first lens unit having a positive refractive power, a second lens unit having a negative refractive power, a third lens unit having a positive or negative refractive power, and a fourth lens unit having a positive refractive power. Further, the first lens unit is constituted of a first sub-lens unit having a negative refractive power, a second sub-lens unit having a positive refractive power, and a third sub-lens unit having a positive refractive power, and is configured so that the second sub-lens unit moves to the image side for focusing from the infinity side to the proximity side.

Japanese Patent Application Laid-Open No. S52-084754 discloses a four-unit zoom lens constituted of a first lens unit having a positive refractive power, a second lens unit having a negative refractive power, a third lens unit having a positive refractive power, and a fourth lens unit having a positive refractive power. The first lens unit is constituted of a first sub-lens unit having a negative refractive power, a second sub-lens unit having a positive refractive power, and a third sub-lens unit having a positive refractive power, and is configured so that the second sub-lens unit moves to the image side for focusing from the infinity side to the proximity side.

Japanese Patent Application Laid-Open No. 2008-216480 discloses a four-unit zoom lens having an F-number of about 2.8 at the wide angle end, an angle of field of about 35° at the wide angle end, an angle of field of about 12° at the telephoto end, and a magnification-varying ratio of about 2.7. The first lens unit is constituted of a first sub-lens unit having a negative refractive power and a second sub-lens unit having a positive refractive power, and is configured so that the second sub-lens unit moves to the object side when focusing from the infinity side to the proximity side.

However, with the zoom lens disclosed in Japanese Patent Application Laid-Open No. H06-242378, realization of both the further reductions in size and weight and the high optical performance is difficult. Japanese Patent Application Laid-Open No. H06-242378 discloses in the embodiments 1 and 2 a configuration in which lens units each having a negative refractive power are arranged on the object side with respect to the stop. The diameters of the second lens unit and the lens units on the image side of the first lens unit tend to increase, which is disadvantageous in reducing the size of the zoom lens. When the refractive power of each lens unit is increased in order to reduce the size and weight, an aberration variation is increased over the entire zoom range, which makes it difficult to achieve high optical performance. Further, Japanese Patent Application Laid-Open No. 6-242378 discloses the embodiment 3 in which the third lens unit has a positive refractive power, but the high refractive power of the third lens unit increases the number of constituent lenses, which is disadvantageous in reducing the size and weight. In addition, in order to ensure enough F-number and exit pupil for the strongly convergent ray that exits the third lens unit, the number of constituent lenses of the fourth lens unit is increased, with the result that the reductions in size and weight are difficult.

On the other hand, Japanese Patent Application Laid-Open No. S52-084754 discloses an example in which the third lens unit has a positive refractive power, but the third lens unit has weak refractive power, with the result that the ray that exits the third lens unit diverges. In order to ensure enough F-number and exit pupil for the divergent ray, the number of constituent lenses of the fourth lens unit is increased, with the result that the reductions in size and weight are difficult.

With regard to the zoom lens disclosed in Japanese Patent Application Laid-Open No. 2008-216480, the refractive power and lens configuration of each lens unit is disadvantageous in further increasing the angle of field, which makes it difficult to suppress an increase in lens diameter accompanying the increase in angle of field.

SUMMARY OF THE INVENTION

In view of the above-mentioned problem, the present invention provides, by appropriately setting a refractive power, lens configuration, aberration contribution, and the like of each lens unit, a zoom lens having a wide angle of field, a high zoom ratio, reduced size and weight, and high optical performance over the entire zoom range. To be specific, the present invention provides a zoom lens having a high magnification-varying ratio, reduced size and weight, and high performance with an angle of field of about 35° to 100° at a wide angle end, an angle of field of about 10° to 45° at a telephoto end, and a magnification-varying ratio of about 2.5 to 5.

Exemplary embodiments of the present invention provide a zoom lens and an image pickup apparatus including the same, the zoom lens including in order from an object side: a first lens unit having a positive refractive power which does not move for zooming; a second lens unit having a negative refractive power which moves during varying magnification; a third lens unit having a positive refractive power which moves during varying magnification; and a fourth lens unit having a positive refractive power which does not move for varying magnification, the third lens unit moving toward an image side and then toward the object side when varying magnification from a wide angle end to a telephoto end, the following relationships are satisfied:

$$-3.2 < f1/f2 < -1.0;$$

$$-0.55 < f2/f3 < -0.20; \text{ and}$$

$$-0.7 < 1/\beta3w < 0.5,$$

where f1 is a focal length of the first lens unit, f2 is a focal length of the second lens unit, f3 is a focal length of the third lens unit, and β3w is a lateral magnification of the third lens unit at the wide angle end when a ray enters from infinity.

Through the appropriate setting of the refractive power, lens configuration, aberration contribution, and the like of each lens unit, the zoom lens having a wide angle of field, a high zoom ratio, reduced size and weight, and high optical performance over the entire zoom range may be realized.

Further features of the present invention will become apparent from the following description of exemplary embodiments with reference to the attached drawings.

BRIEF DESCRIPTION OF THE DRAWINGS

FIG. 2B is an aberration diagram in the state in which focus is at infinity at an intermediate zoom position according to Numerical Embodiment 1.

FIG. 2C is an aberration diagram in the state in which focus is at infinity at a telephoto end according to Numerical Embodiment 1.

FIG. 3 is a lens cross-sectional view in the state in which focus is at infinity at a wide angle end according to Numerical Embodiment 2.

FIG. 4A is an aberration diagram in the state in which focus is at infinity at the wide angle end according to Numerical Embodiment 2.

FIG. 9 is a lens cross-sectional view in the state in which focus is at infinity at a wide angle end according to Numerical Embodiment 5.

FIG. 10A is an aberration diagram in the state in which focus is at infinity at the wide angle end according to Numerical Embodiment 5.

FIG. 10B is an aberration diagram in the state in which focus is at infinity at an intermediate zoom position according to Numerical Embodiment 5.

FIG. 10C is an aberration diagram in the state in which focus is at infinity at a telephoto end according to Numerical Embodiment 5.

DESCRIPTION OF THE EMBODIMENTS

Preferred embodiments of the present invention are described in detail below with reference to the accompanying drawings.

First, features of a zoom lens according to the present invention are described along with conditional expressions.

In order to achieve a wide angle of field, a high zoom ratio, reduced size and weight, and high optical performance over the entire zoom range, the zoom lens of the present invention has a feature in defining a ratio of focal lengths of the first lens unit and the second lens unit, a ratio of focal lengths of the second lens unit and the third lens unit, and a lateral magnification of the third lens unit at a wide angle end.

The zoom lens according to the present invention includes in order from an object side a first lens unit having a positive refractive power which does not move for zooming, a second lens unit having a negative refractive power which moves during varying magnification, a third lens unit having a positive refractive power which moves during varying magnification, and a fourth lens unit having a positive refractive power which does not move for varying magnification. Further, the zoom lens satisfies the following relationships:

$$-3.2 < f1/f2 < -1.0 \quad (1);$$

$$-0.55 < f2/f3 < -0.20 \quad (2); \text{ and}$$

$$-0.7 < 1/\beta 3w < 0.5 \quad (3),$$

where f1 is a focal length of the first lens unit, f2 is a focal length of the second lens unit, f3 is a focal length of the third lens unit, and $\beta 3w$ is the lateral magnification of the third lens unit at the wide angle end when a ray enters from infinity.

An optical effect obtained by including the first lens unit having a positive refractive power which does not move for zooming, the second lens unit having a negative refractive power which moves during varying magnification, the third lens unit having a positive refractive power which moves during varying magnification, and the fourth lens unit having a positive refractive power which does not move for varying magnification according the present invention is described.

Figure 15A:
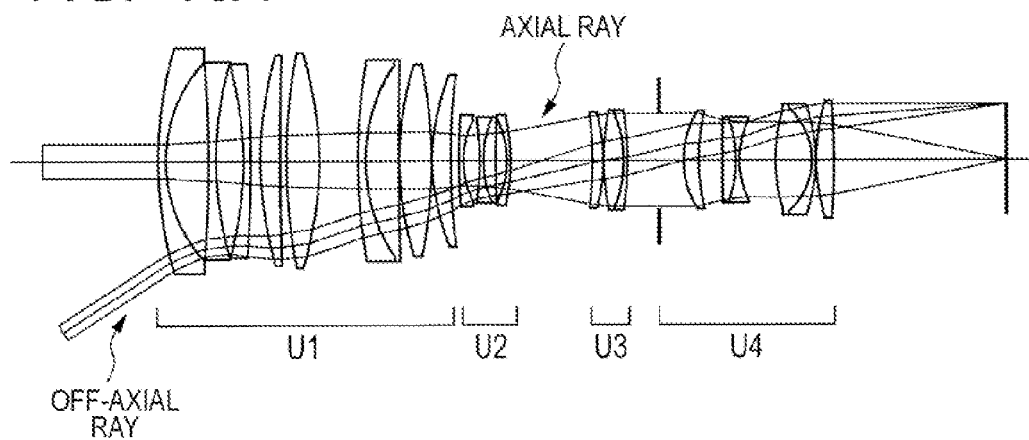
FIG. 15A is an optical path diagram at the wide angle end according to Numerical Embodiment 1.
Figure 15B:
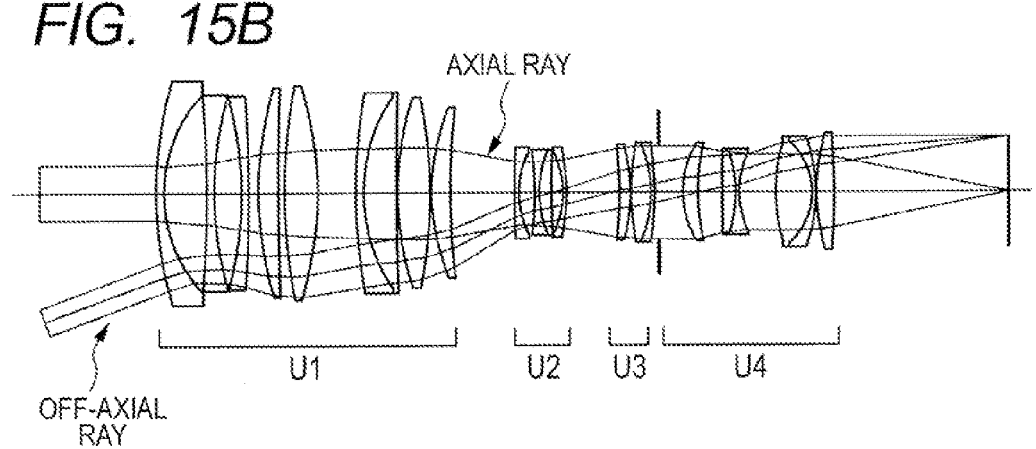
FIG. 15B is an optical path diagram at the intermediate zoom position according to Numerical Embodiment 1.
Figure 15C:
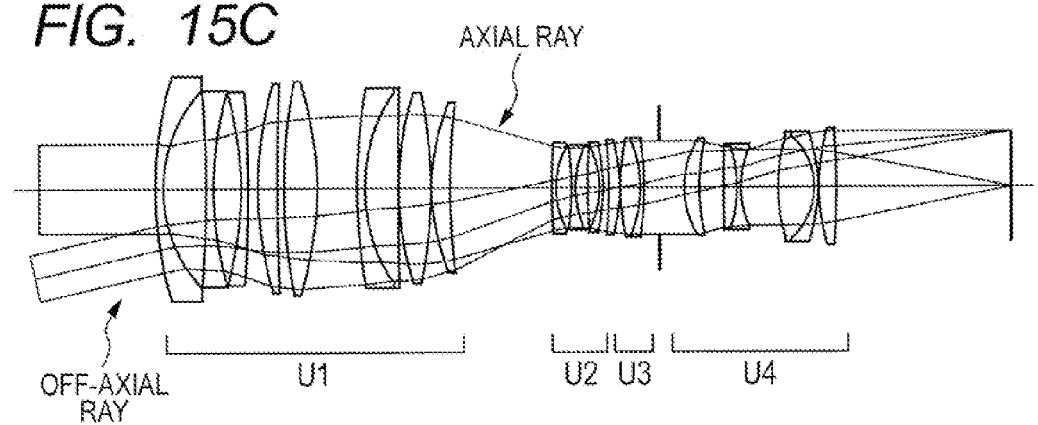
FIG. 15C is an optical path diagram at the telephoto end according to Numerical Embodiment 1.

FIGS. 15A, 15B, and 15C are optical path diagrams at the wide angle end, an intermediate zoom position, and a telephoto end according to Embodiment 1 of the present invention, respectively. The first to fourth lens units are denoted by U1 to U4, respectively. As can be seen from FIGS. 15A and 15C, a lens unit on the image side of the first lens unit has a lens diameter determined by an off-axial ray at the telephoto end, and a lens on the object side of the second lens unit has a lens diameter determined by an off-axial ray at the wide angle end. In order to achieve reduced size and weight, it is effective to suppress the lens diameters of the first lens unit and the second lens unit, which have heavy lens weights. When the refractive power of the third lens unit is positive as in the present invention, a ray height of the off-axial ray may be reduced, with the result that a lens configuration that is effective in reducing the size and weight may be obtained.

Further, when Expressions (1) to (3) described above are satisfied, it is possible to effectively achieve a wide angle of field, a high zoom ratio, reduced size and weight, and high optical performance over the entire zoom range.

Expression (1) defines a ratio of the focal length of the first lens unit to the focal length of the second lens unit. When Expression (1) is satisfied, both the wide angle of field of the zoom lens and the correction of an aberration variation may be achieved. A focal length of the zoom lens takes a value obtained by multiplying the focal length of the first lens unit by lateral magnifications of the second to fourth lens units, and hence in order to achieve the wide angle of field, the focal length of the first lens unit needs to be set appropriately. When the condition of the upper limit of Expression (1) is not satisfied, the refractive power of the first lens unit becomes stronger, which makes it difficult to correct the aberration variation. Further, the refractive power of the second lens unit becomes insufficient with respect to the first lens unit, which is disadvantageous in reducing size and weight of the zoom lens. In contrast, when the condition of the lower limit of Expression (1) is not satisfied, the refractive power of the first lens unit becomes insufficient, which makes it difficult to increase the angle of field and reduce the size and weight. It is further preferred to set Expression (1) as follows:

$$-3.0 < f1/f2 < -1.5 \quad (1a).$$

Expression (2) defines a ratio of the focal length of the second lens unit and the focal length of the third lens unit. When Expression (2) is satisfied, the focal length of the second lens unit with respect to the third lens unit may be appropriately set, and hence it is possible to efficiently realize not only both the wide angle of field and the reduced size and weight, but also a high zoom ratio and high optical performance. When the condition of the upper limit of Expression (2) is not satisfied, the refractive power of the second lens unit becomes strong, and hence the aberration variation accompanying the magnification varying becomes large, which makes it difficult to achieve good optical performance over the entire zoom range. Further, the refractive power of the third lens unit becomes weak, and hence the above-mentioned effect of suppressing the lens diameter on the image side of the first lens unit and the lens diameter on the object side of the second lens unit becomes weak, which is disadvantageous in reducing the size and weight. In contrast, when the condition of the lower limit of Expression (2) is not satisfied, the refractive power of the second lens unit becomes weak, and hence a moving amount of the second lens unit accompanying the varying magnification becomes large, which makes it difficult to achieve both the high zoom ratio and the reduced size and weight. It is further preferred to set Expression (2) as follows:

$$-0.45 < f2/f3 < -0.25 \quad (2a).$$

Expression (3) defines a reciprocal of the lateral magnification $\beta 3w$ of the third lens unit at the wide angle end when a ray enters from infinity. Expression (3) is defined to reduce the size and weight of the entire lens system. When Expression (3) is satisfied, the ray that exits the third lens unit becomes substantially afocal, and hence the number of constituent lenses of the fourth lens unit may be reduced, which is advantageous in reducing the size and weight. When the condition of the upper limit of Expression (3) is not satisfied, the ray that exits the third lens unit becomes more divergent, and hence a lens unit having a strong positive refractive power is required for the fourth lens unit, which increases the number of constituent lenses of the fourth lens unit. Conversely, when the condition of the lower limit of Expression (3) is not satisfied, the ray that exits the third lens unit becomes more convergent. In order for the ray that exits the third lens unit to be a strongly convergent ray, the refractive power of the third lens unit needs to be increased, which results in an increase in number of the constituent lenses of the third lens unit. Therefore, the reduction in size and weight becomes difficult to achieve. It is further preferred to set Expression (3) as follows:

$$-0.4 < 1/\beta 3w < 0.1 \quad (3a).$$

As a further embodiment of the zoom lens of the present invention, a configuration of the first lens unit for achieving a wide angle of field and high optical performance is defined. The first lens unit includes a first sub-lens unit having a negative refractive power that is fixed and does not move for focusing, a second sub-lens unit having a positive refractive power that moves to the image side for focusing from the infinity side to the proximity side, and a third sub-lens unit having a positive refractive power that does not move for focusing. The arrangements of the first lens unit with a lens unit having a negative refractive power on the object side of the first lens unit and a lens unit having a positive refractive power on the image side of the first lens unit facilitate setting an image side principal point of the first lens unit on the image side, resulting in a configuration that is advantageous in increasing the angle of field.

As a further embodiment of the zoom lens of the present invention, a ratio of a focal length of the second sub-lens unit to a focal length of the first sub-lens unit and a ratio of a focal length of the third sub-lens unit to the focal length of the first lens unit are defined. The first lens unit satisfies the following relationship:

$$-2.3 < f12/f11 < -1.5 \quad (4),$$

where f11 is the focal length of the first sub-lens unit and f12 is the focal length of the second sub-lens unit. Expression (4) is defined to suppress the moving amount of the second sub-lens unit in focusing and to increase the optical performance. Expression (4) is especially effective for the zoom lens having a short distance to the closest object (for example, when a focal length at the telephoto end and the distance to the closest object are expressed in mm, a ratio of the minimum object distance to the focal length of the telephoto end is smaller than 10). When the condition of the upper limit of Expression (4) is not satisfied, the refractive power of the first sub-lens unit becomes weak, and hence the moving amount of the second sub-lens unit for focusing becomes large, which is disadvantageous in reducing the size and weight of the zoom lens. In contrast, when the condition of the lower limit of Expression (4) is not satisfied, the refractive power of the first sub-lens unit becomes strong, with the result that the positive refractive power of the second sub-lens unit becomes strong, which makes it difficult to achieve good optical performance. It is further preferred to set Expression (4) as follows:

$$-2.1 < f12/f11 < -1.8 \quad (4a).$$

Further, the first lens unit satisfies the following relationship:

$$0.9 < f13/f1 < 1.5 \quad (5),$$

where f13 is the focal length of the third sub-lens unit. Expression (5) is defined to reduce the size and weight and to increase the performance. When the condition of the upper limit of Expression (5) is not satisfied, the refractive power of the third sub-lens unit becomes weak, which makes it difficult to suppress the diameters of the first sub-lens unit and the second sub-lens unit. This results in a disadvantage in reducing the size and weight of the zoom lens. In contrast, when the condition of the lower limit of Expression (5) is not satisfied, the refractive index of the third sub-lens unit becomes strong, and hence curvature radii of the lenses constituting the third sub-lens unit become smaller, which leads to increases in high-order aberrations and distortion and in number of the constituent lenses and makes it difficult to achieve both the reduction in size and weight and the good optical performance. It is further preferred to set Expression (5) as follows:

$$0.95 < f13/f1 < 1.45 \quad (5a).$$

As a further embodiment of the zoom lens of the present invention, a configuration of the first sub-lens unit and dispersion of an optical material used in the first sub-lens unit are defined.

The first sub-lens unit includes at least one convex lens and at least one concave lens and satisfies the following relationship:

$$18 < v11n - v11p < 45 \quad (6),$$

where v11p is an average value of an Abbe constant of the convex lens constituting the first sub-lens unit, and v11n is an average value of an Abbe constant of the concave lens.

Expression (6) defines a condition for achieving good optical performance while suppressing a variation in chromatic aberration during focusing. Existing optical materials have a tendency that as an Abbe constant vd becomes larger, a refractive index becomes smaller, and when the condition of the upper limit of Expression (6) is not satisfied, the refractive index of the concave lens constituting the first sub-lens unit becomes lower. As a result, the curvature radii of the lenses become smaller, which makes it difficult to correct the high-order aberrations. In contrast, when the condition of the lower limit of Expression (6) is not satisfied, the refractive powers of the convex lens and the concave lens constituting the first sub-lens unit become stronger, and hence the high-order aberrations occur, which makes it difficult to correct the residual aberration. In addition, the variation in chromatic aberration during focusing becomes larger, which makes it difficult to achieve high optical performance over the entire focus range. It is further preferred to set Expression (6) as follows:

$$25 < v11n - v11p < 38 \quad (6a).$$

As a further embodiment of the zoom lens of the present invention, a shape of a lens closest to the object of the first sub-lens unit is defined. The lens closest to the object of the first sub-lens unit is a concave lens and satisfies the following relationship:

$$-0.5 < (R1+R2)/(R1-R2) < 2.5 \quad (7),$$

where R1 is a curvature radius of a surface on the object side, and R2 is a curvature radius of a surface on the image side.

Expression (7) defines an increase in angle of field and off-axial aberration at the wide angle end for successfully correcting the distortion in particular.

In the third-order aberration theory, an aberration coefficient V of the distortion is proportional to the first power of an axial paraxial chief ray height H and to the third power of a paraxial chief ray height H'. The paraxial chief ray height at the wide angle end is high for the lens closest to the object of the first sub-lens unit, and in order to successfully correct the distortion at the wide angle end, the shape of a lens G1 closest to the object of the first sub-lens unit needs to be set appropriately. A surface on the object side and a surface on the image side of the lens G1 are defined here as an r1 surface and an r2 surface, respectively. When the r1 surface of the lens G1 is a concave surface and its curvature radius becomes smaller, an incident angle on the r1 surface becomes larger and a large barrel distortion occurs. Therefore, it becomes hard to correct the barrel distortion at the wide angle end.

When the condition of the upper limit of Expression (7) is not satisfied, the lens G1 has a meniscus shape in which the r1 surface is a convex surface and the r2 surface is a concave surface, and further the difference of the curvature radii of the r1 surface and the r2 surface becomes smaller, and hence the negative refractive power of the lens becomes weaker. As a result, it becomes difficult to set the image side principal point of the first lens unit on the image side, which is disadvantageous in increasing the angle of field. In contrast, when the condition of the lower limit of Expression (7) is not satisfied, the r1 surface is the concave surface and the curvature radius becomes even smaller, which makes it difficult to correct the barrel distortion at the wide angle end. It is further preferred to set Expression (7) as follows:

$$0.5 < (R1+R2)/(R1-R2) < 2.0 \quad (7a).$$

As a further embodiment of the zoom lens of the present invention, a configuration of the third sub-lens unit and a partial dispersion ratio of an optical material used in the third sub-lens unit are defined. The third sub-lens unit includes at least two convex lenses and at least one concave lens and satisfies the following conditional expression:

$$-2.5 \times 10^{-3} < (\theta 13p - \theta 13n)/(\nu 13p - \nu 13n) < -5.0 \times 10^{-4} \quad (8),$$

where $\nu 13p$ and $\theta 13p$ are average values of Abbe constants and partial dispersion ratios of the convex lenses constituting the third sub-lens unit, respectively, and $\nu 13n$ and $\theta 13n$ are average values of an Abbe constant and a partial dispersion ratio of the concave lens, respectively.

Here, the Abbe constant and the partial dispersion ratio of a material of an optical device (lens) used in the present invention are defined as follows. Refractive indices with respect to g-line (435.8 nm), F-line (486.1 nm), d-line (587.6 nm), and C-line (656.3 nm) of Fraunhofer line are denoted by Ng, NF, Nd, and NC, respectively. The Abbe constant $\nu d$ and a partial dispersion ratio $\theta gF$ with respect to g-line and F-line are defined by the following expressions.

$$\nu d = (Nd-1)/(NF-NC) \quad (i)$$

$$\theta gF = (Ng-NF)/(NF-NC) \quad (ii)$$

The partial dispersion ratio $\theta gF$ of an existing optical material is present in a narrow range with respect to the Abbe constant $\nu d$. Further, the existing optical material has a tendency that, as the Abbe constant $\nu d$ becomes smaller, the partial dispersion ratio $\theta gF$ becomes larger. Here, a condition for effectively correcting chromatic aberration in a thin contact lens system including two lenses 1 and 2 having refractive powers $\phi 1$ and $\phi 2$ and Abbe constants $\nu 1$ and $\nu 2$, respectively, is expressed by the following expression.

$$\phi 1/\nu 1 + \phi 2/\nu 2 = E \quad (iii)$$

In this case, a combined refractive power $\phi$ of the lenses 1 and 2 is expressed by the following expression.

$$\phi = \phi 1 + \phi 2 \quad (iv)$$

When $E=0$ is satisfied in expression (iii), in correcting chromatic aberration, imaging positions of C-line and F-line correspond to each other. At this time, $\phi 1$ and $\phi 2$ are expressed by the following expressions.

$$\phi 1 = \phi \times \nu 1/(\nu 1-\nu 2) \quad (v)$$

$$\phi 2 = \phi \times \nu 2/(\nu 1-\nu 2) \quad (vi)$$

Figure 16:
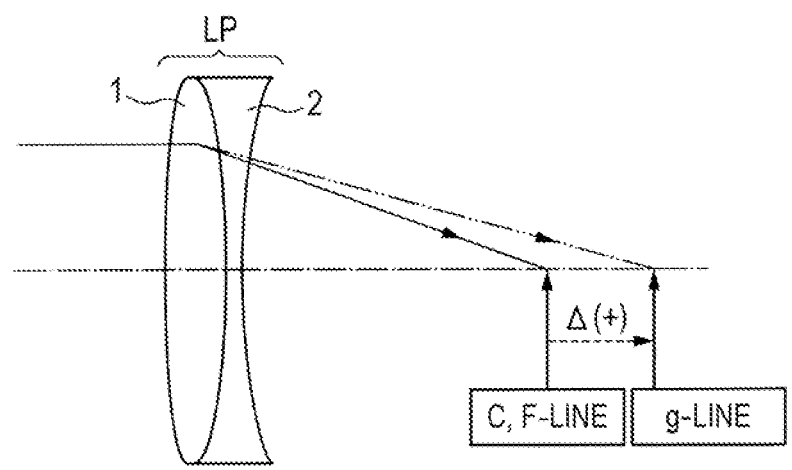
FIG. 16 is a schematic diagram of achromatism for two colors and a residual secondary spectrum of an axial chromatic aberration of a positive lens unit.

FIG. 16 is a schematic diagram of achromatism for two colors and a residual secondary spectrum of an axial chromatic aberration of a lens unit having a positive refractive power LP. In FIG. 16, a material having a large Abbe constant $\nu 1$ is used for a positive lens 1, and a material having a small Abbe constant $\nu 2$ is used for a negative lens 2. Therefore, the positive lens 1 has a small partial dispersion ratio $\theta 1$ and the negative lens 2 has a large partial dispersion ratio $\theta 2$, and when the axial chromatic aberration is corrected for the C-line and the F-line, an imaging point of the g-line deviates to the image side. When an amount of deviation of the axial chromatic aberration in a case where a ray is caused to enter with the object distance being set to infinity is defined as a secondary spectrum amount $\Delta S$, the secondary spectrum amount $\Delta S$ is expressed as follows:

$$\Delta S = -(1/\phi \times (\theta 1-\theta 2)/(\nu 1-\nu 2) \quad (vii).$$

Figure 17:
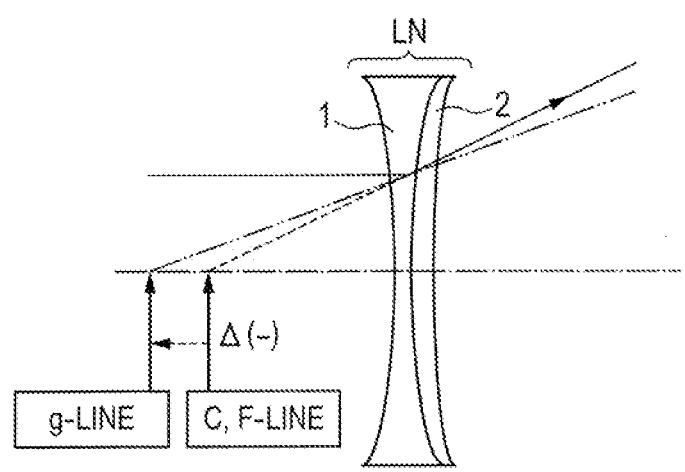
FIG. 17 is a schematic diagram of achromatism for two colors and a residual secondary spectrum of an axial chromatic aberration of a negative lens unit.

On the other hand, for the achromatism of a negative lens unit LN as illustrated in FIG. 17, a material having a large Abbe constant $\nu 1$ is used for a negative lens 1, and a material having a small Abbe constant $\nu 2$ is used for a positive lens 2. Therefore, the negative lens 1 has a small partial dispersion ratio $\theta 1$ and the positive lens 2 has a large partial dispersion ratio $\theta 2$. In this case, as illustrated in FIG. 17, when the chromatic aberration is corrected for the C-line and the F-line, the imaging point of the g-line deviates to the object side. In order to successfully correct the secondary spectrum of the axial chromatic aberration at the telephoto end, the third sub-lens unit and the second lens unit, in which the secondary spectrum occurs significantly, need to be adjusted for the amount of occurrence. The third sub-lens unit has a positive refractive power, and in order to successfully correct the secondary spectrum of the axial chromatic aberration at the telephoto end, such glass material as to reduce the secondary spectrum amount $\Delta S$ that occurs in the third sub-lens unit needs to be selected. Similarly, the second lens unit has a negative refractive power, and such glass material as to increase the secondary spectrum amount $\Delta S$ in the second lens unit may be selected to successfully correct the secondary spectrum of the axial chromatic aberration that occurs in the first lens unit.

Figure 18:
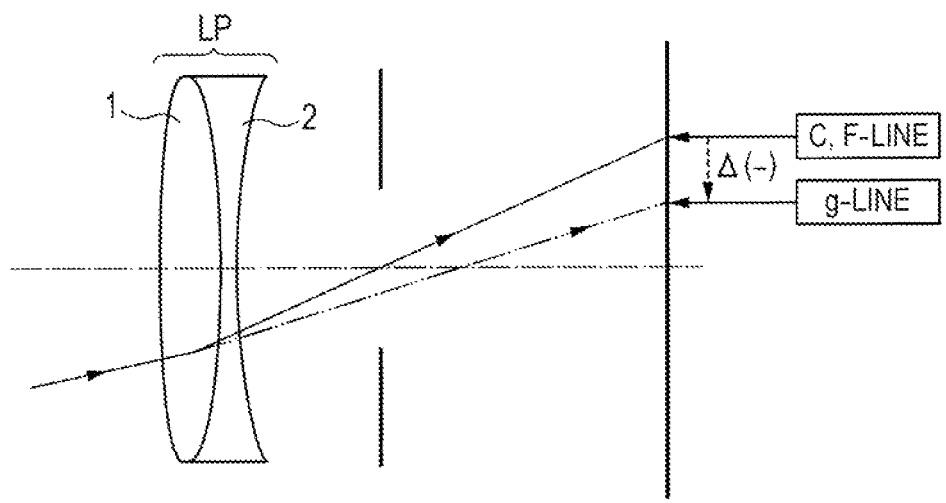
FIG. 18 is a schematic diagram of achromatism for two colors and a residual secondary spectrum of a lateral chromatic aberration of the positive lens unit.

FIG. 18 is a schematic diagram of the achromatism for two colors and the residual secondary spectrum of a lateral chromatic aberration of the lens unit LP having a positive refractive power, which is located between the object surface and the stop. As described above, a material having a large Abbe constant $\nu 1$ is used for the positive lens 1, and a material having a small Abbe constant $\nu 2$ is used for the negative lens 2. Therefore, the positive lens 1 has a small partial dispersion ratio $\theta 1$ and the negative lens 2 has a large partial dispersion ratio $\theta 2$, and when the lateral chromatic aberration is corrected for the C-line and the F-line, the imaging point of the g-line deviates toward an optical axis. When an amount of deviation of the lateral chromatic aberration is defined as a secondary spectrum amount $\Delta Y$, the secondary spectrum amount $\Delta Y$ is expressed as follows:

$$\Delta Y = (1/\phi \times (\theta 1-\theta 2)/(\nu 1-\nu 2) \quad (viii).$$

Figure 19:
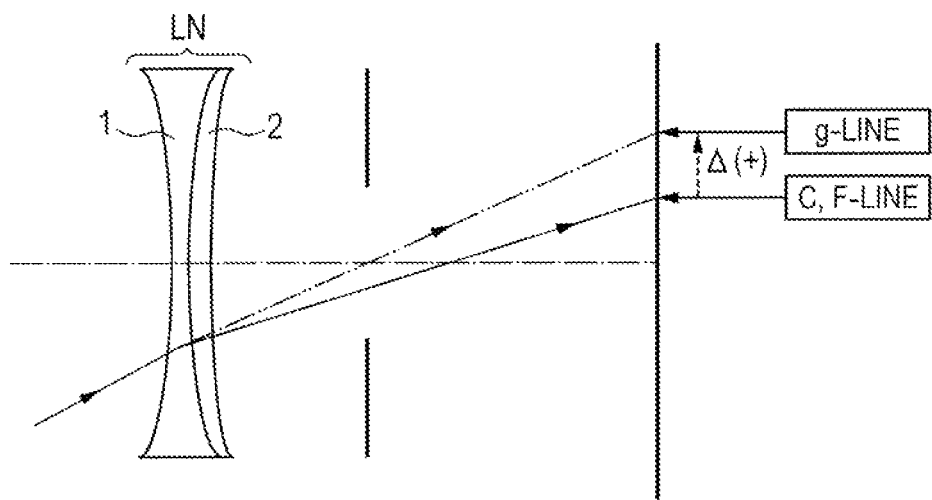
FIG. 19 is a schematic diagram of achromatism for two colors and a residual secondary spectrum of a lateral chromatic aberration of the negative lens unit.

On the other hand, for the achromatism of a negative lens unit LN as illustrated in FIG. 19, a material having a large Abbe constant $\nu 1$ is used for the negative lens 1, and a material having a small Abbe constant $\nu 2$ is used for the positive lens 2. Therefore, the negative lens 1 has a small partial dispersion ratio $\theta 1$, and the positive lens 2 has a large partial dispersion ratio $\theta 2$. In this case, when the lateral chromatic aberration is corrected for the C-line and the F-line, the imaging point of the g-line deviates away from the optical axis. In order to successfully correct the secondary spectrum of the lateral chromatic aberration at the wide angle end, the amounts of occurrence need to be adjusted for the third sub-lens unit and the second lens unit. The third sub-lens unit has a positive refractive power, and in order to successfully correct the secondary spectrum of the lateral chromatic aberration at the wide angle end, such glass material as to increase the secondary spectrum amount $\Delta Y$ that occurs in the third sub-lens unit needs to be selected. Similarly, the second lens unit has a negative refractive power, and such glass material as to reduce the secondary spectrum amount $\Delta Y$ that occurs in the second lens unit needs to be selected.

The condition of Expression (8) is defined to successfully correct the lateral chromatic aberration at the wide angle end and the axial chromatic aberration at the telephoto end. When the condition of the upper limit of Expression (8) is not satisfied, which is advantageous in correcting the secondary spectrum of the axial chromatic aberration at the telephoto end, the secondary spectrum of the lateral chromatic aberration at the wide angle end is increased, which makes it difficult to achieve high optical performance over the entire zoom range. In contrast, when the condition of the lower limit of Expression (8) is not satisfied, which is advantageous in correcting the secondary spectrum of the lateral chromatic aberration at the wide angle end, the secondary spectrum of the axial chromatic aberration at the telephoto end is increased, which makes it difficult to achieve high optical performance over the entire zoom range. It is further preferred to set Expression (8) as follows:

$$-2.0 \times 10^{-3} < (\theta 13p - \theta 13n)/(\nu 13p - \nu 13n) < -1.0 \times 10^{-3} \quad (8a).$$

As a further embodiment of the zoom lens of the present invention, a configuration of the second lens unit and a partial dispersion ratio of an optical material used in the second lens unit are defined. The second lens unit includes at least one convex lens and at least two concave lenses and satisfies the following relationship:

$$-3.5 \times 10^{-3} < (\theta 2p - \theta 2n)/(\nu 2p - \nu 2n) < -1.5 \times 10^{-3} \quad (9),$$

where $\nu 2p$ and $\theta 2p$ are average values of an Abbe constant and a partial dispersion ratio of the convex lens constituting the second lens unit, respectively, and $\nu 2n$ and $\theta 2n$ are average values of Abbe constants and partial dispersion ratios of the concave lenses, respectively.

This condition is defined to successfully correct the lateral chromatic aberration at the wide angle end and the axial chromatic aberration at the telephoto end. When the condition of the upper limit of Expression (9) is not satisfied, which is advantageous in correcting the secondary spectrum of the lateral chromatic aberration at the wide angle end, the secondary spectrum of the axial chromatic aberration at the telephoto end is increased, which makes it difficult to achieve high optical performance over the entire zoom range. In contrast, when the condition of the lower limit of Expression (9) is not satisfied, which is advantageous in correcting the secondary spectrum of the axial chromatic aberration at the telephoto end, the secondary spectrum of the lateral chromatic aberration at the wide angle end is increased, which makes it difficult to achieve high optical performance over the entire zoom range. It is further preferred to set Expression (9) as follows:

$$-3.0 \times 10^{-3} < (\theta 2p - \theta 2n)/(\nu 2p - \nu 2n) < -2.0 \times 10^{-3} \quad (9a).$$

As a further embodiment of the zoom lens of the present invention, a configuration of the first sub-lens unit for achieving a wide angle of field is defined. The first sub-lens unit includes one convex lens and at least two concave lenses, and the lens closest to the image of the first sub-lens unit includes a convex lens. The arrangements of a lens unit having a negative refractive power on the object side of the first sub-lens unit and a lens unit having a positive refractive power on the image side of the first sub-lens unit facilitate setting the image side principal point of the first lens unit on the image side, resulting in a configuration that is advantageous in increasing the angle of field.

As a further embodiment of the zoom lens of the present invention, a ratio of a focal length of each of the convex lens and the concave lenses in the first sub-lens unit to the focal length of the first sub-lens unit is defined. The first sub-lens unit satisfies the following relationship:

$$-3.5 < f11p/f11 < -1.5 \quad (10); \text{ and}$$

$$0.5 < f11n/f11 < 0.8 \quad (11),$$

where $f11p$ and $f11n$ are a combined focal length of the convex lens and a combined focal length of the concave lenses in the first sub-lens unit, respectively.

This condition is defined to achieve good optical performance in addition to the realization of both the wide angle of field and the reductions in size and weight. When the condition of the upper limit of Expression (10) is not satisfied, the curvature radius of the lens having a positive refractive power of the first sub-lens unit becomes smaller to increase the high-order aberrations, which makes it difficult to achieve high optical performance. In contrast, when the condition of the lower limit of Expression (10) is not satisfied, the positive refractive power of the first sub-lens unit becomes weaker, with the result that the negative refractive power of the first sub-lens unit also becomes weaker, which makes it difficult to obtain the effect of an enough increase in angle of field.

When the condition of the upper limit of Expression (11) is not satisfied, the negative refractive power of the first sub-lens unit becomes insufficient, which makes it difficult to obtain the effect of an enough increase in angle of field. In contrast, when the condition of the lower limit of Expression (11) is not satisfied, the reduced curvature radius of the lens having a negative refractive power leads to an increase in high-order aberrations and to increases in number of the constituent lenses and the weights of the lenses, which makes it difficult to realize both the reductions in size and weight and the good optical performance. It is further preferred to set Expression (10) as follows:

$$-3.2 < f11p/f11 < -2.0 \quad (10a).$$

It is further preferred to set Expression (11) as follows:

$$0.60 < f11n/f11 < 0.75 \quad (11a).$$

Further, an image pickup apparatus of the present invention has a feature in including the zoom lens of each of the embodiments and a solid-state image pick-up element having a predetermined effective image pick-up range for receiving an image formed by the zoom lens.

A specific configuration of the zoom lens of the present invention is described below by way of features of lens configurations of Numerical Embodiments 1 to 7 corresponding to Embodiments 1 to 7, respectively.

Embodiment 1

Figure 1:
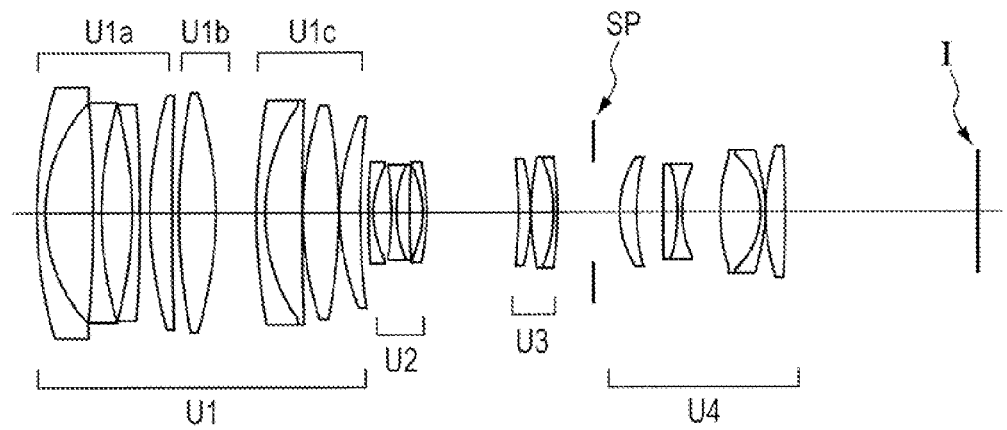
FIG. 1 is a lens cross-sectional view in a state in which focus is at infinity at a wide angle end according to Numerical Embodiment 1.
Figure 2A:
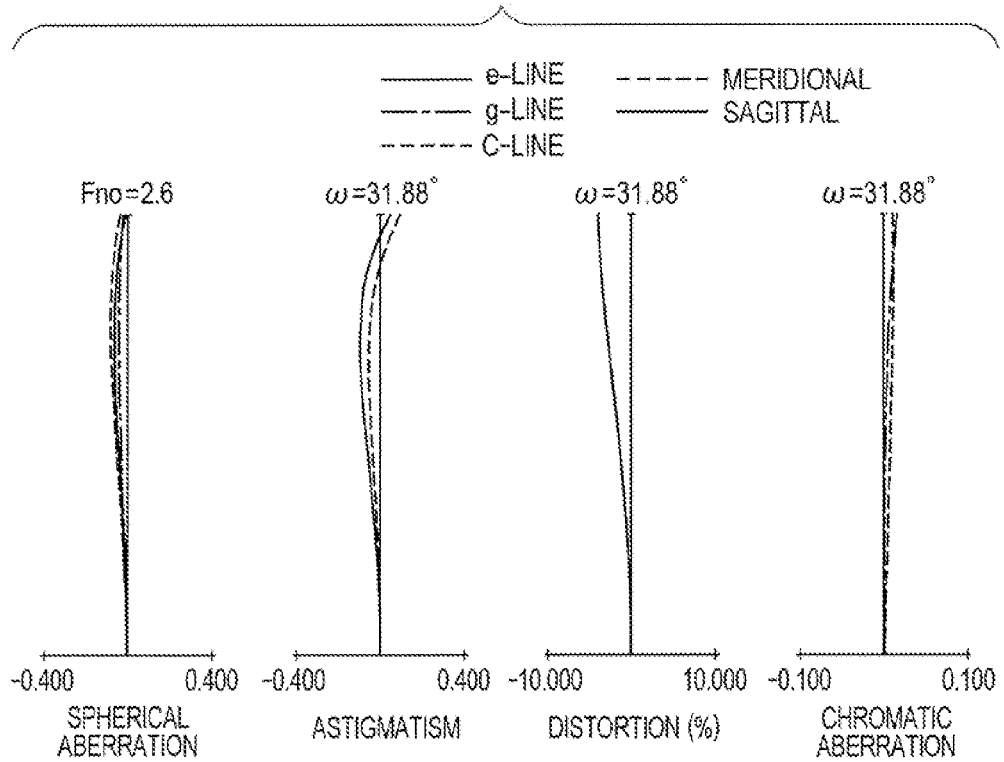
FIG. 2A is an aberration diagram in the state in which focus is at infinity at the wide angle end according to Numerical Embodiment 1.

FIG. 1 is a lens cross-sectional view when focused on infinity at the wide angle end in the zoom lens according to Embodiment 1 (Numerical Embodiment 1) of the present invention. FIGS. 2A, 2B, and 2C are longitudinal aberration diagrams of the wide angle end of Numerical Embodiment 1, the focal length of 40 mm of Numerical Embodiment 1, and the telephoto end of Numerical Embodiment 1, respectively. Each of the aberration diagrams is a longitudinal aberration diagram when focused on infinity. Further, the value of the focal length is a value obtained by expressing numerical embodiments, which are to be described below, in mm. This applies to all the numerical embodiments below.

In FIG. 1, the zoom lens includes in order from the object side a first lens unit (focus lens unit) U1 having a positive refractive power for focusing. The zoom lens further includes a second lens unit (variator) U2 having a negative refractive power for varying magnification which moves to the image side for varying magnification from the wide angle end to the telephoto end. The zoom lens further includes a third lens unit (compensator) U3 having a positive refractive power which moves on the optical axis nonlinearly in conjunction with the movement of the second lens unit U2 and corrects an image plane variation accompanying the magnification varying. The zoom lens further includes a fourth lens unit (relay lens unit) U4 having a positive refractive power and an imaging function which does not move for varying magnification.

The second lens unit U2 and the third lens unit U3 constitute a magnification-varying system. An aperture stop SP is arranged on the object side of the fourth lens unit U4. When used as an image pickup optical system for a broadcasting television camera, a video camera, or a digital still camera, an image plane I corresponds to an image pickup surface of a solid-state image pick-up element (photoelectric conversion element) or the like for receiving an image formed by the zoom lens and converting light to electricity. When used as an image pickup optical system for a film camera, the image plane I corresponds to a film surface on which the image formed by the zoom lens is exposed.

In each of the longitudinal aberration diagrams, spherical aberrations are illustrated with respect to e-line, g-line, and C-line by a solid line, a one-dot chain line, and a dotted line, respectively. Further, astigmatisms are illustrated on a meridional image plane by a dotted line and on a sagittal image plane by a solid line. In addition, lateral chromatic aberrations are illustrated with respect to g-line and C-line by a one-dot chain line and a dotted line, respectively. A half angle of field is denoted by ω and an F-number is denoted by Fno.

In each of the longitudinal aberration diagrams, the spherical aberration is illustrated in the unit of 0.4 mm, the astigmatism in the unit of 0.4 mm, the distortion in the unit of 10%, and the lateral chromatic aberration in the unit of 0.1 mm. Note that, in each embodiment described below, each of the wide angle end and the telephoto end refers to a zooming position obtained when the second lens unit U2 for magnification-varying is positioned at each of the ends of a range in which the second lens unit U2 may mechanically move along the optical axis.

Next, the first lens unit U1 of this embodiment is described. The first lens unit U1 corresponds to first to seventeenth surfaces. The first lens unit U1 includes a first sub-lens unit U1a having a negative refractive power which does not move for focusing, a second sub-lens unit U1b having a positive refractive power which moves to the image side when focusing from the infinity side to the proximity side, and a third sub-lens unit U1c having a positive refractive power which does not move for focusing. The first sub-lens unit U1a includes in order from the object side a meniscus concave lens G1 having a convex surface facing to the object side, a biconcave lens G2, a meniscus concave lens G3 having a convex surface facing toward the image side, and a meniscus convex lens G4 having a concave surface facing toward the image side. The second sub-lens unit U1b includes a biconvex lens G5. The third sub-lens unit U1c includes a cemented lens obtained by cementing a meniscus concave lens G6 having a convex surface facing toward the object side and a meniscus convex lens G7 having a concave surface facing toward the image side, a biconvex lens G8, and a meniscus convex lens G9 having a concave surface facing toward the image side. The second lens unit U2 includes a meniscus concave lens having a convex surface facing toward the object side, a cemented lens of a biconcave lens and a meniscus convex lens having a concave surface facing toward the image side, and a meniscus concave lens having a convex surface facing toward the image side. The third lens unit U3 includes a convex lens and a concave lens and is constituted of a total of three lenses. The fourth lens unit U4 includes a convex lens and a concave lens and is constituted of a total of six lenses.

Numerical Embodiment 1 which corresponds to the above-mentioned Embodiment 1 is described. Not only in Numerical Embodiment 1 but in all numerical embodiments, "i" denotes an order of a surface (optical surface) from the object side, "ri" denotes a curvature radius of an i-th surface from the object side, and "di" denotes an interval (on the optical axis) between the i-th surface and the (i+1)th surface from the object side. Further, "ndi", "vdi", and "θgFi" respectively denote a refractive index, an Abbe constant, and a partial dispersion ratio of a medium (optical member) between the i-th surface and the (i+1)th surface.

The aspherical shape is expressed in the following expression where an X axis corresponds to the optical axis, an H axis is set perpendicularly to the optical axis, a traveling direction of light corresponds to a positive direction, "R" denotes a paraxial curvature radius, "k" denotes a conic coefficient, and "A4", "A6", "A8", "A10", and "A12" each denote an aspherical coefficient. Further, "e-Z" denotes "×10$^{-Z}$".

$$X = \frac{H^2/R}{1+\sqrt{1-(1+k)(H/R)^2}} + A4H^4 + A6H^6 + A8H^8 + A10H^{10} + A12H^{12}$$

Moreover, the axial paraxial chief ray height H at each optical surface (lens surface), an angle α formed by the axial paraxial chief ray and the optical axis, the paraxial chief ray height H', and an angle α' formed by the paraxial chief ray and the optical axis when focused on an object at infinity at the wide angle end of this embodiment are also described in the numerical embodiments. Further, contribution values at each surface of the aberration coefficient V of the third-order distortion when focused on the object at infinity at the wide angle end of this embodiment are described. The axial paraxial chief ray (paraxial axial ray) as used herein refers to, when the focal length at the wide angle end of the entire optical system is normalized to 1, a paraxial ray that is caused to enter the optical system in parallel to the optical axis with an incident height of 1 (of rays that enter positions in the vicinity of the optical axis of the surface closest to the object in a state of being parallel to the optical axis, a ray that passes through the optical axis at the image plane position). Moreover, tables of the numerical embodiments show the height of the axial paraxial chief ray (distance from the optical axis) on each optical surface and an incident angle on each optical surface. Moreover, the paraxial chief ray is, of rays that enter a maximum image height of the image plane (receiving surface of the image pickup element) when the focal length at the wide angle end of the entire optical system is normalized to 1, a paraxial ray that passes through an intersection of an incident pupil and the optical axis of the optical system. The tables of the numerical embodiments show a height of the paraxial chief ray (distance from the optical axis) on each optical surface and the incident angle on each optical surface.

Values corresponding to each conditional expression of this embodiment are shown in Table 1.

In this embodiment, Expressions (1) to (11) are satisfied, and with a high zoom ratio of 2.60×, a wide angle of field is achieved as an image pick-up field angle (angle of field) of 63.76° at the wide angle end.

Moreover, the aberration coefficient (aberration coefficient of the third-order distortion) V of one surface having the highest paraxial chief ray height is set in an appropriate range, to thereby effectively correct the barrel distortion at the wide angle end. It is preferred that the value Vdis of the aberration coefficient V of the third-order distortion at the surface (lens surface) having the highest paraxial chief ray height satisfy:

$$-0.5 < V\text{dis} < 1.5 \tag{12}$$

It is further preferred to satisfy:

$$0.1 < V\text{dis} < 1.0 \quad (12a)$$

Moreover, the zoom lens having high optical performance in which the aberrations are successfully corrected over the entire zoom range is achieved. However, it is essential that the zoom lens of the present invention satisfy Expressions (1), (2), and (3), but the zoom lens does not necessarily satisfy Expressions (4) to (12). However, when even at least one of Expressions (4) to (12) is satisfied, better effects may be provided. This is also true for the other embodiments.

Figure 20:
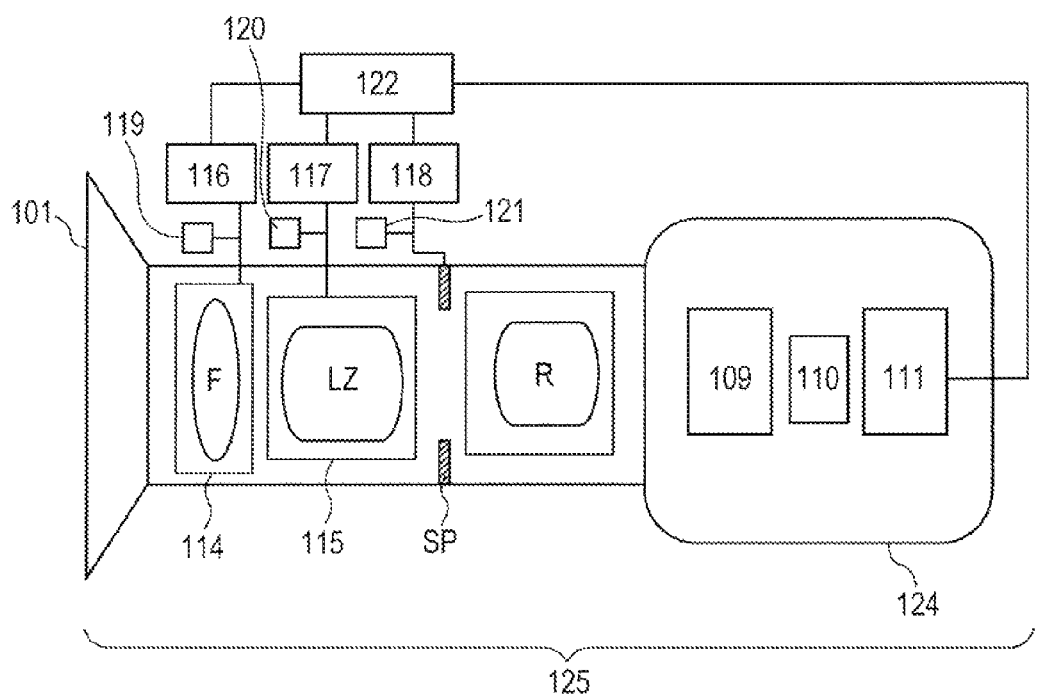
FIG. 20 is a schematic diagram illustrating a main part of an image pickup apparatus according to the present invention.

FIG. 20 is a schematic diagram illustrating an image pickup apparatus (television camera system) having the zoom lens according to each embodiment as an image pickup optical system. Referring to FIG. 20, an image pickup apparatus 125 includes a zoom lens 101, which is any one of the zoom lenses according to Embodiments 1 to 7. The zoom lens 101 may be detachably mounted on a camera body 124, to thereby constitute the image pickup apparatus 125. The zoom lens 101 includes a first lens unit F, a magnification varying unit LZ, and a fourth lens unit for imaging R. The first lens unit F includes a focusing lens unit. The magnification varying unit LZ includes a second lens unit which moves along the optical axis to vary magnification. In addition, the magnification varying unit LZ includes a third lens unit which moves along the optical axis to correct an image plane variation due to magnification varying. Further, the zoom lens 101 includes an aperture stop SP. In addition, the zoom lens 101 includes driving mechanisms 114 and 115, such as a helicoid or a cam, which drives the first lens unit F and the magnification varying unit LZ, respectively, along the optical axis. The image pickup apparatus 125 includes motors (driving units) 116 to 118, which electrically drive the driving mechanisms 114 and 115 and the aperture stop SP, respectively. Detectors 119 to 121, such as an encoder, a potentiometer, or a photo-sensor, are configured to detect the position of the first lens unit F, the position of the magnification varying unit LZ on the optical axis, and the aperture diameter of the aperture stop SP. In addition, the camera body 124 includes a glass block 109, which is equivalent to an optical filter or a color separation optical system provided within the camera body 124. Furthermore, the camera body 124 includes a solid state image pickup element (photoelectrical conversion element) 110, such as a charge-coupled device (CCD) sensor or a complementary metal-oxide semiconductor (CMOS) sensor. The solid state image pickup element 110 is configured to receive an object image formed by the zoom lens 101. Further, central processing units (CPUs) 111 and 122 control the driving of the camera body 124 and the zoom lens 101, respectively.

By applying the zoom lens according to the present invention to a television camera as described above, an image pickup apparatus having high optical performance may be implemented.

Embodiment 2

Figure 4B:
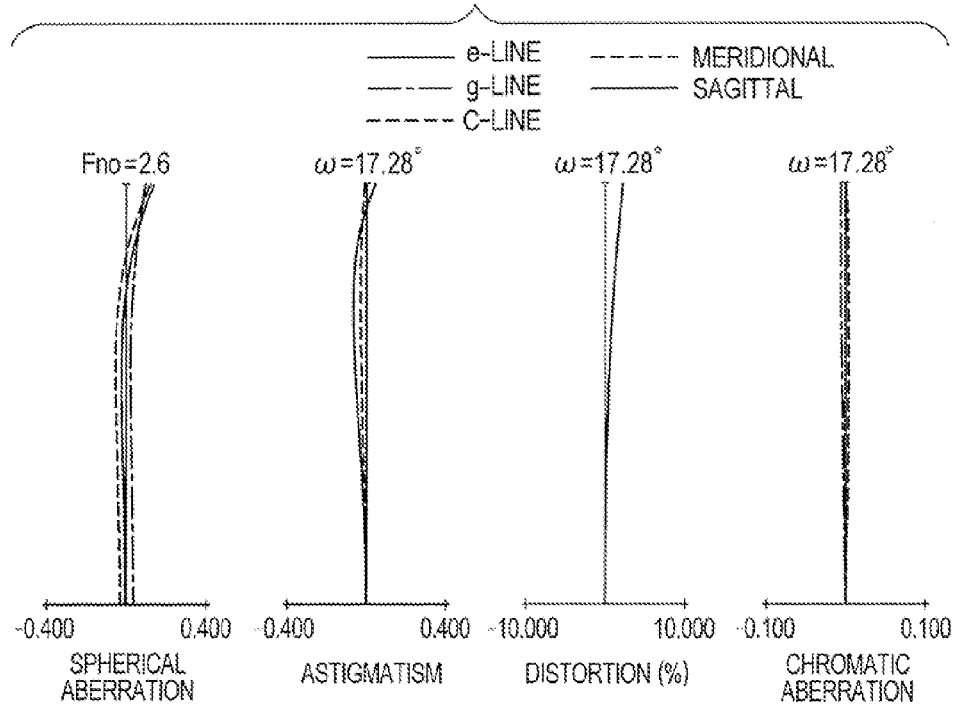
FIG. 4B is an aberration diagram in the state in which focus is at infinity at an intermediate zoom position according to Numerical Embodiment 2.
Figure 4C:
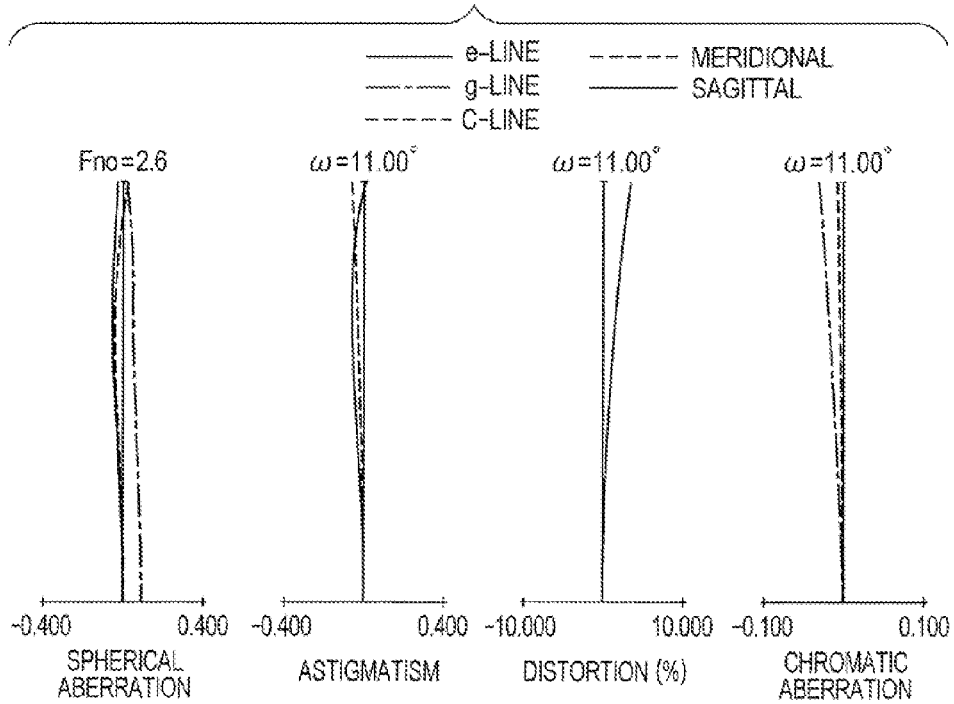
FIG. 4C is an aberration diagram in the state in which focus is at infinity at a telephoto end according to Numerical Embodiment 2.

FIG. 3 is a lens cross-sectional view when focused on infinity at the wide angle end in the zoom lens according to Embodiment 2 (Numerical Embodiment 2) of the present invention. FIGS. 4A, 4B, and 4C are longitudinal aberration diagrams of the wide angle end of Numerical Embodiment 2, the focal length of 50 mm of Numerical Embodiment 2, and the telephoto end of Numerical Embodiment 2, respectively. Each of the aberration diagrams is a longitudinal aberration diagram when focused on infinity.

In FIG. 3, the zoom lens includes in order from the object side a first lens unit (focus lens unit) U1 having a positive refractive power for focusing. The zoom lens further includes a second lens unit (variator) U2 having a negative refractive power for varying magnification which moves to the image side for varying magnification from the wide angle end to the telephoto end. The zoom lens further includes a third lens unit (compensator) U3 having a positive refractive power which moves on the optical axis nonlinearly in conjunction with the movement of the second lens unit U2 and corrects an image plane variation accompanying the magnification varying. The zoom lens further includes a fourth lens unit (relay lens unit) U4 having a positive refractive power and an imaging function which does not move for varying magnification.

Next, the first lens unit U1 of this embodiment is described. The first lens unit U1 corresponds to first to fifteenth surfaces. The first lens unit U1 includes a first sub-lens unit U1a having a negative refractive power which does not move for focusing, a second sub-lens unit U1b having a positive refractive power which moves to the image side when focusing from the infinity side to the proximity side, and a third sub-lens unit U1c having a positive refractive power which does not move for focusing. The first sub-lens unit U1a includes in order from the object side a meniscus concave lens G1 having a convex surface facing toward the object side, a biconcave lens G2, and a biconvex lens G3. The second sub-lens unit U1b includes a biconvex lens G4. The third sub-lens unit U1c includes a cemented lens obtained by cementing a meniscus concave lens G5 having a convex surface facing toward the object side and a biconvex lens G6, a biconvex lens G7, and a meniscus convex lens G8 having a concave surface facing toward the image side. The second lens unit U2 includes a meniscus concave lens having a convex surface facing toward the object side, a biconcave lens, a meniscus convex lens having a concave surface facing toward the image side, and a biconcave lens. The third lens unit U3 includes a convex lens and a concave lens and is constituted of a total of three lenses. The fourth lens unit U4 includes a convex lens and a concave lens and is constituted of a total of six lenses.

Values corresponding to each conditional expression of this embodiment are shown in Table 1.

In this embodiment, Expressions (1) to (11) are satisfied, and with a high zoom ratio of 2.67×, a wide angle of field is achieved as an image pick-up field angle (angle of field) of 54.80° at the wide angle end. Moreover, the aberration coefficient V of the one surface having the highest paraxial chief ray height is set in an appropriate range to effectively correct the barrel distortion at the wide angle end. In addition, the zoom lens having high optical performance in which the aberrations are successfully corrected over the entire zoom range is achieved.

Embodiment 3

Figure 5:
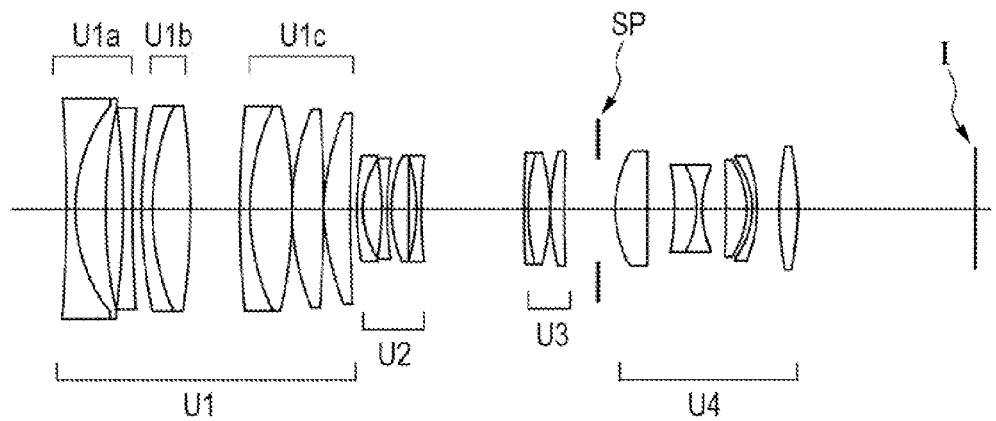
FIG. 5 is a lens cross-sectional view in the state in which focus is at infinity at a wide angle end according to Numerical Embodiment 3.
Figure 6A:
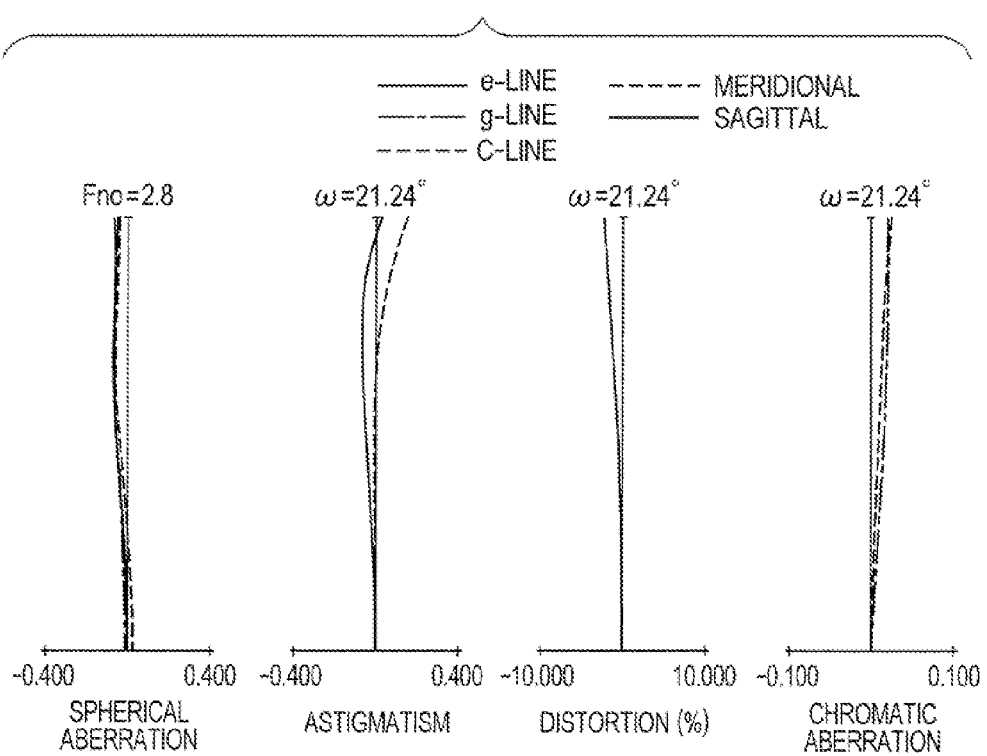
FIG. 6A is an aberration diagram in the state in which focus is at infinity at the wide angle end according to Numerical Embodiment 3.
Figure 6B:
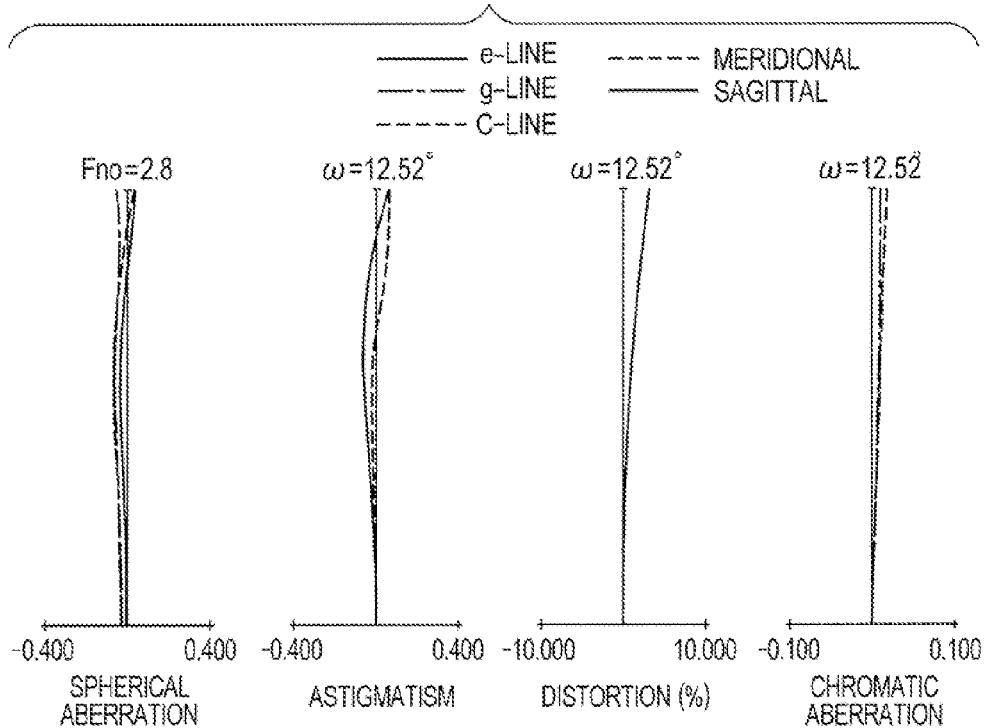
FIG. 6B is an aberration diagram in the state in which focus is at infinity at an intermediate zoom position according to Numerical Embodiment 3.
Figure 6C:
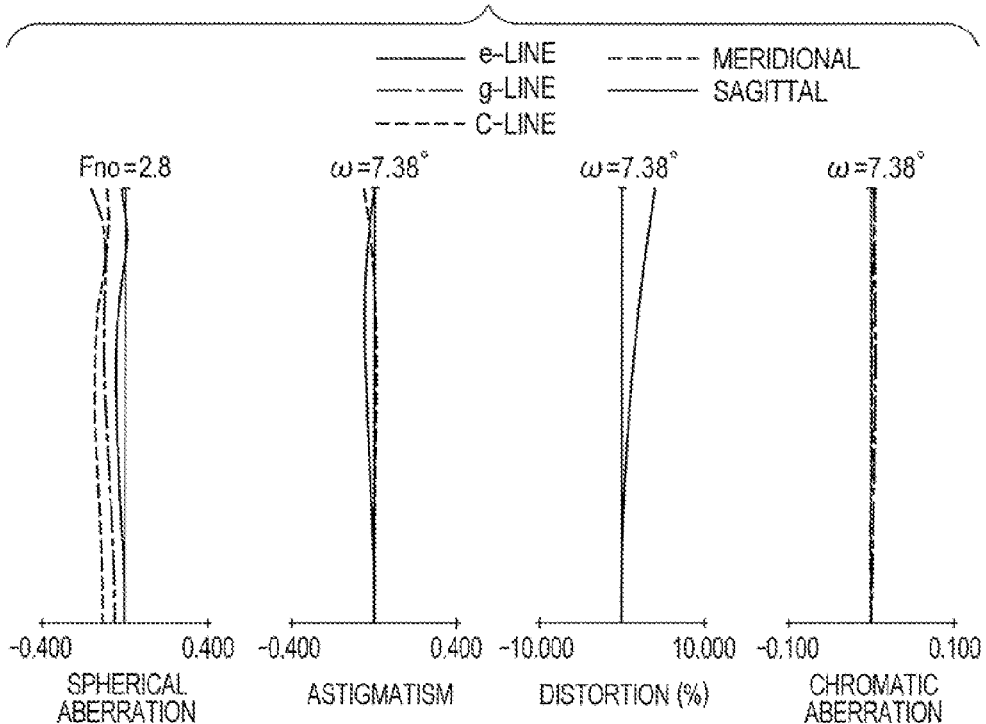
FIG. 6C is an aberration diagram in the state in which focus is at infinity at a telephoto end according to Numerical Embodiment 3.

FIG. 5 is a lens cross-sectional view when focused on infinity at the wide angle end in the zoom lens according to Embodiment 3 (Numerical Embodiment 3) of the present invention. FIGS. 6A, 6B, and 6C are longitudinal aberration diagrams of the wide angle end of Numerical Embodiment 3, the focal length of 70 mm of Numerical Embodiment 3, and the telephoto end of Numerical Embodiment 3, respectively. Each of the aberration diagrams is a longitudinal aberration diagram when focused on infinity.

In FIG. 5, the zoom lens includes in order from the object side a first lens unit (focus lens unit) U1 having a positive refractive power for focusing. The zoom lens further includes a second lens unit (variator) U2 having a negative refractive power for varying magnification which moves to the image side for varying magnification from the wide angle end to the telephoto end. The zoom lens further includes a third lens unit (compensator) U3 having a positive refractive power which moves on the optical axis nonlinearly in conjunction with the movement of the second lens unit U2 and corrects an image plane variation accompanying the magnification varying. The zoom lens further includes a fourth lens unit (relay lens unit) U4 having a positive refractive power and an imaging function which does not move for varying magnification.

Next, the first lens unit U1 of this embodiment is described. The first lens unit U1 corresponds to first to seventeenth surfaces. The first lens unit U1 includes a first sub-lens unit U1a having a negative refractive power which does not move for focusing, a second sub-lens unit U1b having a positive refractive power which moves to the image side when focusing from the infinity side to the proximity side, and a third sub-lens unit U1c having a positive refractive power which does not move for focusing. The first sub-lens unit U1a includes in order from the object side a cemented lens of a biconcave lens G1 and a meniscus convex lens G2 having a concave surface facing toward the image side, and a biconcave lens G3. The second sub-lens unit U1b includes a cemented lens of a meniscus concave lens G4 having a convex surface facing toward the object side and a biconvex lens G5. The third sub-lens unit U1c includes a meniscus concave lens G6 having a convex surface facing toward the object side, a biconvex lens G7, a meniscus convex lens G8, and a meniscus convex lens G9 having a concave surface facing toward the image side. The second lens unit U2 includes a meniscus concave lens having a convex surface facing toward the object side, a biconcave lens, a biconvex lens, and a biconcave lens. The third lens unit U3 includes a convex lens and a concave lens and is constituted of a total of three lenses. The fourth lens unit U4 includes a convex lens and a concave lens and is constituted of a total of six lenses.

Values corresponding to each conditional expression of this embodiment are shown in Table 1.

In this embodiment, Expressions (1) to (9) are satisfied, and with a high zoom ratio of 3.00×, a wide angle of field is achieved as an image pick-up field angle (angle of field) of 42.48° at the wide angle end. Moreover, the aberration coefficient V of the one surface having the highest paraxial chief ray height is set in an appropriate range to effectively correct the barrel distortion at the wide angle end. In addition, the zoom lens having high optical performance in which the aberrations are successfully corrected over the entire zoom range is achieved.

Embodiment 4

Figure 7:
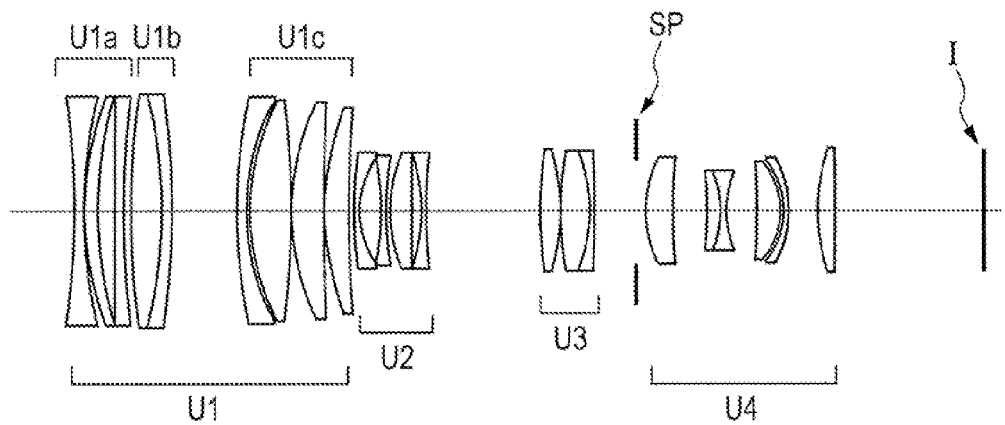
FIG. 7 is a lens cross-sectional view in the state in which focus is at infinity at a wide angle end according to Numerical Embodiment 4.
Figure 8A:
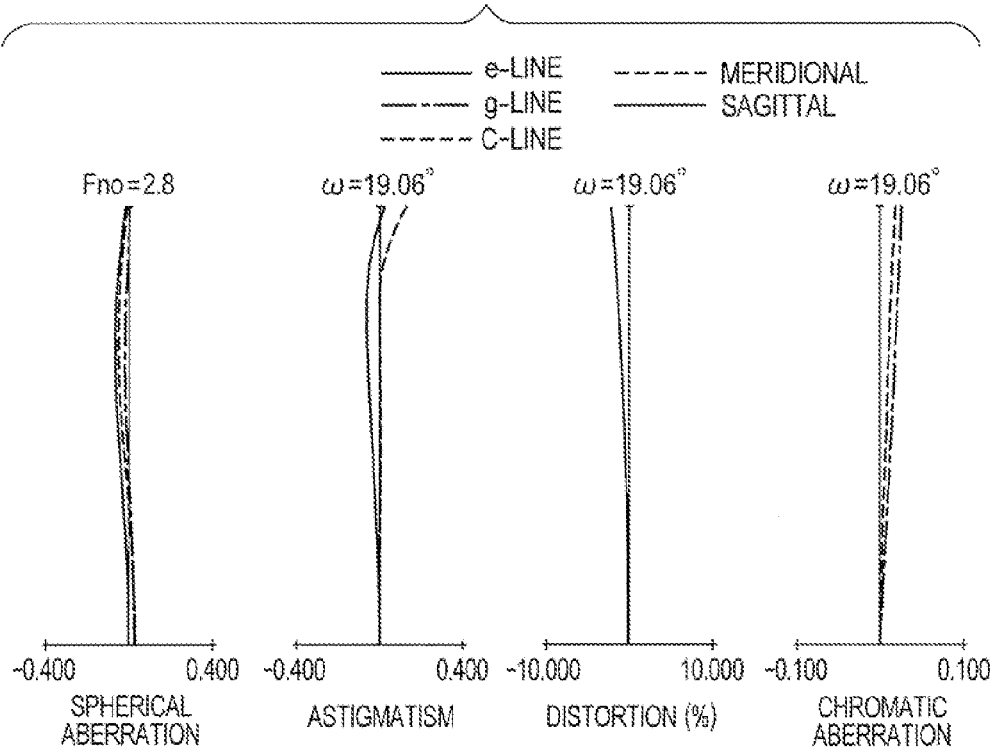
FIG. 8A is an aberration diagram in the state in which focus is at infinity at the wide angle end according to Numerical Embodiment 4.
Figure 8B:
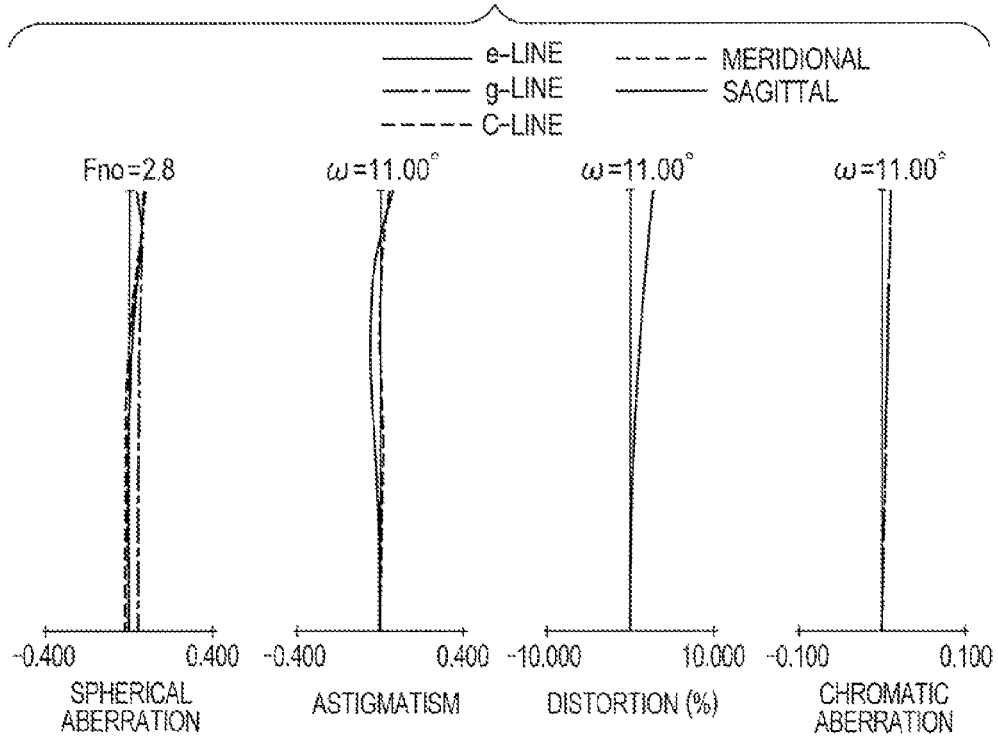
FIG. 8B is an aberration diagram in the state in which focus is at infinity at an intermediate zoom position according to Numerical Embodiment 4.
Figure 8C:
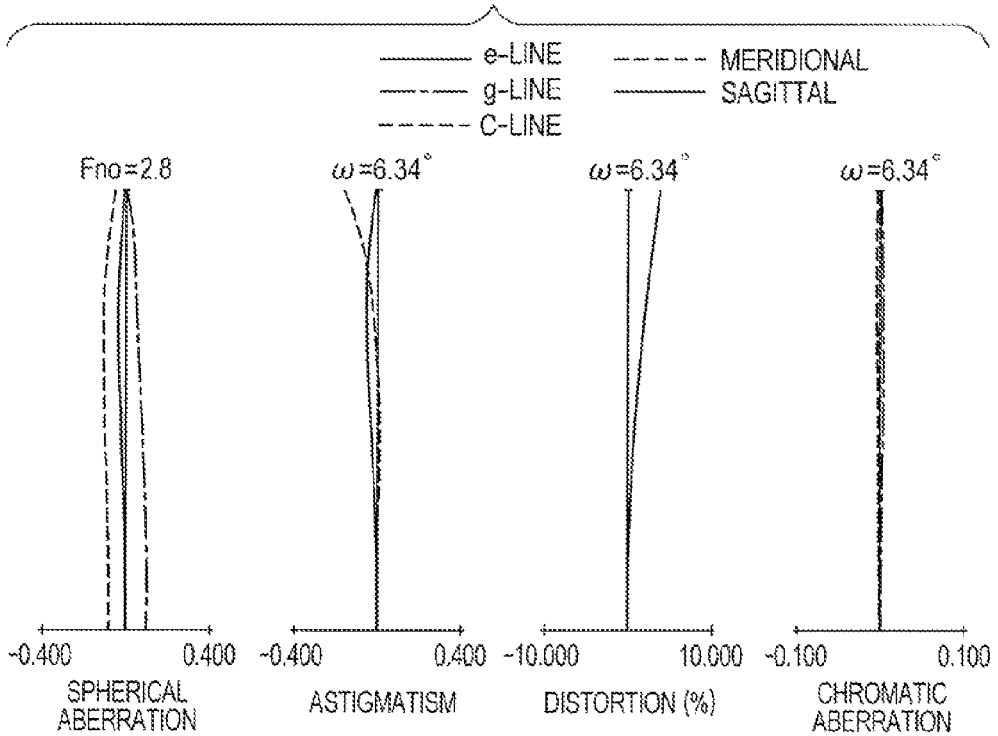
FIG. 8C is an aberration diagram in the state in which focus is at infinity at a telephoto end according to Numerical Embodiment 4.

FIG. 7 is a lens cross-sectional view when focused on infinity at the wide angle end in the zoom lens according to Embodiment 4 (Numerical Embodiment 4) of the present invention. FIGS. 8A, 8B, and 8C are longitudinal aberration diagrams of the wide angle end of Numerical Embodiment 4, the focal length of 80 mm of Numerical Embodiment 4, and the telephoto end of Numerical Embodiment 4, respectively. Each of the aberration diagrams is a longitudinal aberration diagram when focused on infinity.

In FIG. 7 the zoom lens includes in order from the object side a first lens unit (focus lens unit) U1 having a positive refractive power for focusing. The zoom lens further includes a second lens unit (variator) U2 having a negative refractive power for varying magnification which moves to the image side for varying magnification from the wide angle end to the telephoto end. The zoom lens further includes a third lens unit (compensator) U3 having a positive refractive power which moves on the optical axis nonlinearly in conjunction with the movement of the second lens unit U2 and corrects an image plane variation accompanying the magnification varying. The zoom lens further includes a fourth lens unit (relay lens unit) U4 having a positive refractive power and an imaging function which does not move for varying magnification.

Next, the first lens unit U1 of this embodiment is described. The first lens unit U1 corresponds to first to seventeenth surfaces. The first lens unit U1 includes a first sub-lens unit U1a having a negative refractive power which does not move for focusing, a second sub-lens unit U1b having a positive refractive power which moves to the image side when focusing from the infinity side to the proximity side, and a third sub-lens unit U1c having a positive refractive power which does not move for focusing. The first sub-lens unit U1a includes in order from the object side a biconcave lens G1, a meniscus convex lens G2 having a concave surface facing toward the image side, and a biconcave lens G3. The second sub-lens unit U1b includes a cemented lens of a biconvex lens G4 and a meniscus concave lens G5 having a convex surface facing toward the image side. The third sub-lens unit U1c includes a meniscus concave lens G6 having a convex surface facing toward the object side, a biconvex lens G7, a meniscus convex lens G8 having a concave surface facing toward the image side, and a meniscus convex lens G9 having a concave surface facing toward the image side. The second lens unit U2 includes a meniscus concave lens having a convex surface facing toward the object side, a biconcave lens, a biconvex lens, and a biconcave lens. The third lens unit U3 includes a convex lens and a concave lens and is constituted of a total of three lenses. The fourth lens unit U4 includes a convex lens and a concave lens and is constituted of a total of six lenses.

Values corresponding to each conditional expression of this embodiment are shown in Table 1.

In this embodiment, Expressions (1) to (9) are satisfied, and with a high zoom ratio of 3.11×, a wide angle of field is achieved as an image pick-up field angle (angle of field) of 38.12° at the wide angle end. Moreover, the aberration coefficient V of the one surface having the highest paraxial chief ray height is set in an appropriate range to effectively correct the barrel distortion at the wide angle end. In addition, the zoom lens having high optical performance in which the aberrations are successfully corrected over the entire zoom range is achieved.

Embodiment 5

FIG. 9 is a lens cross-sectional view when focused on infinity at the wide angle end in the zoom lens according to Embodiment 5 (Numerical Embodiment 5) of the present invention. FIGS. 10A, 10B, and 10C are longitudinal aberration diagrams of the wide angle end of Numerical Embodiment 5, the focal length of 70 mm of Numerical Embodiment 5, and the telephoto end of Numerical Embodiment 5, respectively. Each of the aberration diagrams is a longitudinal aberration diagram when focused on infinity.

In FIG. 9, the zoom lens includes in order from the object side a first lens unit (focus lens unit) U1 having a positive refractive power for focusing. The zoom lens further includes a second lens unit (variator) U2 having a negative refractive power for varying magnification which moves to the image side for varying magnification from the wide angle end to the telephoto end. The zoom lens further includes a third lens unit (compensator) U3 having a positive refractive power which moves on the optical axis nonlinearly in conjunction with the movement of the second lens unit U2 and corrects an image plane variation accompanying the magnification varying. The zoom lens further includes a fourth lens unit (relay lens unit)

U4 having a positive refractive power and an imaging function which does not move for varying magnification.

Next, the first lens unit U1 of this embodiment is described. The first lens unit U1 corresponds to first to fourteenth surfaces. The first lens unit U1 includes a first sub-lens unit U1a having a negative refractive power which does not move for focusing, a second sub-lens unit U1b having a positive refractive power which moves to the image side when focusing from the infinity side to the proximity side, and a third sub-lens unit U1c having a positive refractive power which does not move for focusing. The first sub-lens unit U1a includes in order from the object side a meniscus concave lens G1 having a convex surface facing toward the object side, a meniscus concave lens G2 having a convex surface facing toward the image side, and a meniscus convex lens G3 having a concave surface facing toward the image side. The second sub-lens unit U1b includes a meniscus concave lens G4 having a convex surface facing toward the object side and a biconvex lens G5. The third sub-lens unit U1c includes a cemented lens obtained by cementing a meniscus concave lens G6 having a convex surface facing toward the object side and a biconvex lens G7, and a meniscus convex lens G8 having a concave surface facing toward the image side. The second lens unit U2 includes a meniscus concave lens having a convex surface facing toward the object side, a cemented lens of a biconcave lens and a meniscus convex lens having a concave surface facing toward the image side, and a biconcave lens. The twenty-first surface has an aspherical surface shape. The twenty-first surface mainly corrects the field curvature on the wide angle side. The third lens unit U3 includes a convex lens and a concave lens and is constituted of a total of three lenses. The fourth lens unit U4 includes a convex lens and a concave lens and is constituted of a total of six lenses.

Values corresponding to each conditional expression of this embodiment are shown in Table 1.

In this embodiment, Expressions (1) to (11) are satisfied, and with a high zoom ratio of 5.00×, a wide angle of field is achieved as an image pick-up field angle (angle of field) of 54.80° at the wide angle end. Moreover, the aberration coefficient V of the one surface having the highest paraxial chief ray height is set in an appropriate range to effectively correct the barrel distortion at the wide angle end. In addition, the zoom lens having high optical performance in which the aberrations are successfully corrected over the entire zoom range is achieved.

Embodiment 6

Figure 11:
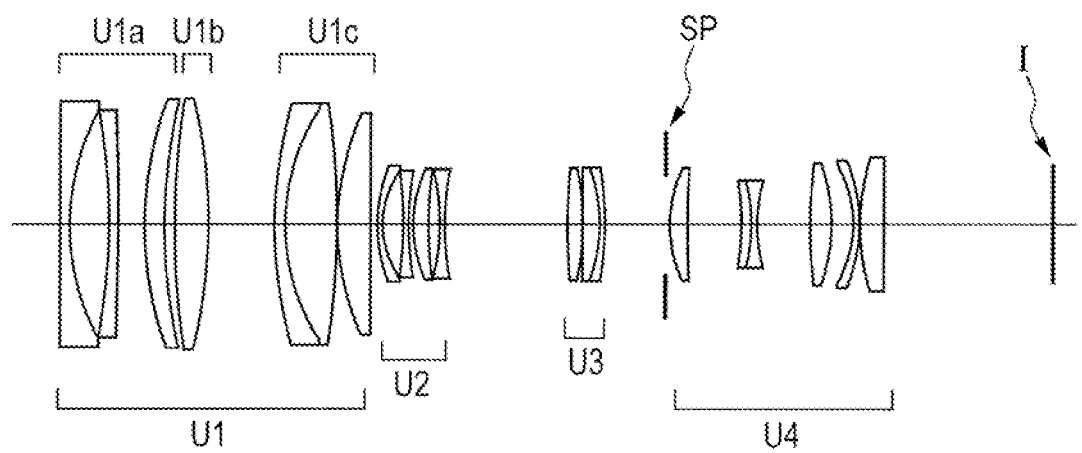
FIG. 11 is a lens cross-sectional view in the state in which focus is at infinity at a wide angle end according to Numerical Embodiment 6.
Figure 12A:
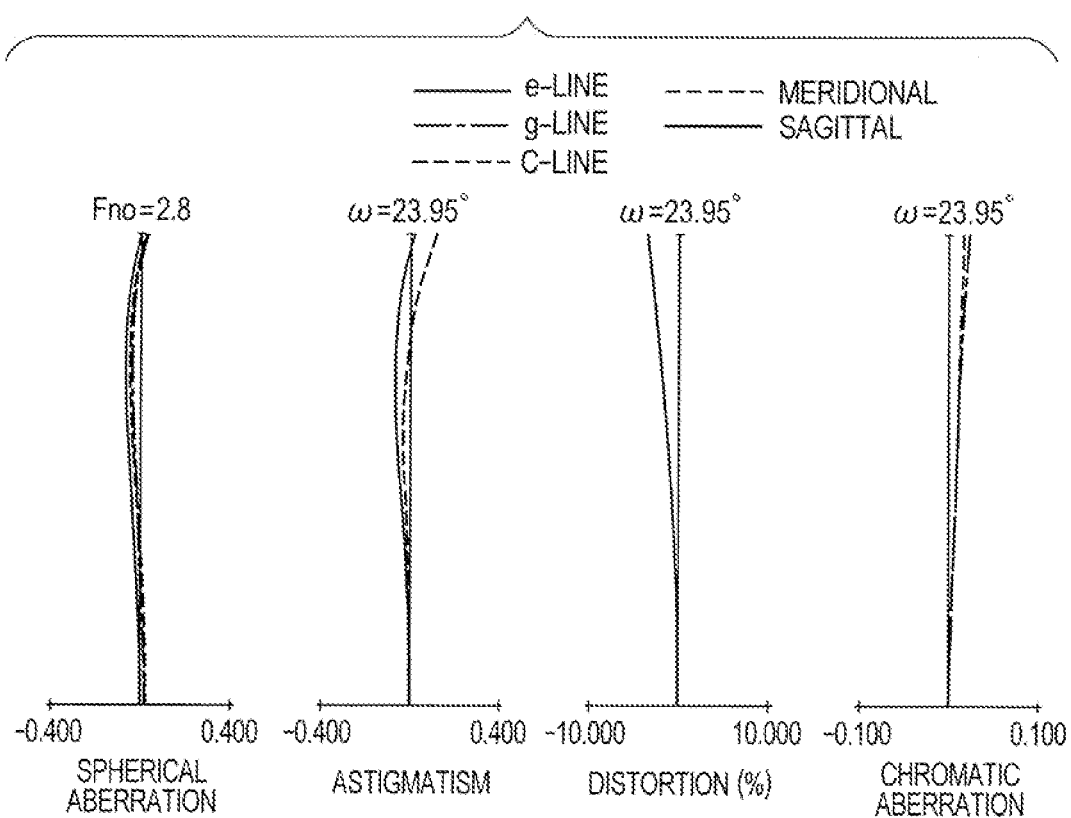
FIG. 12A is an aberration diagram in the state in which focus is at infinity at the wide angle end according to Numerical Embodiment 6.
Figure 12B:
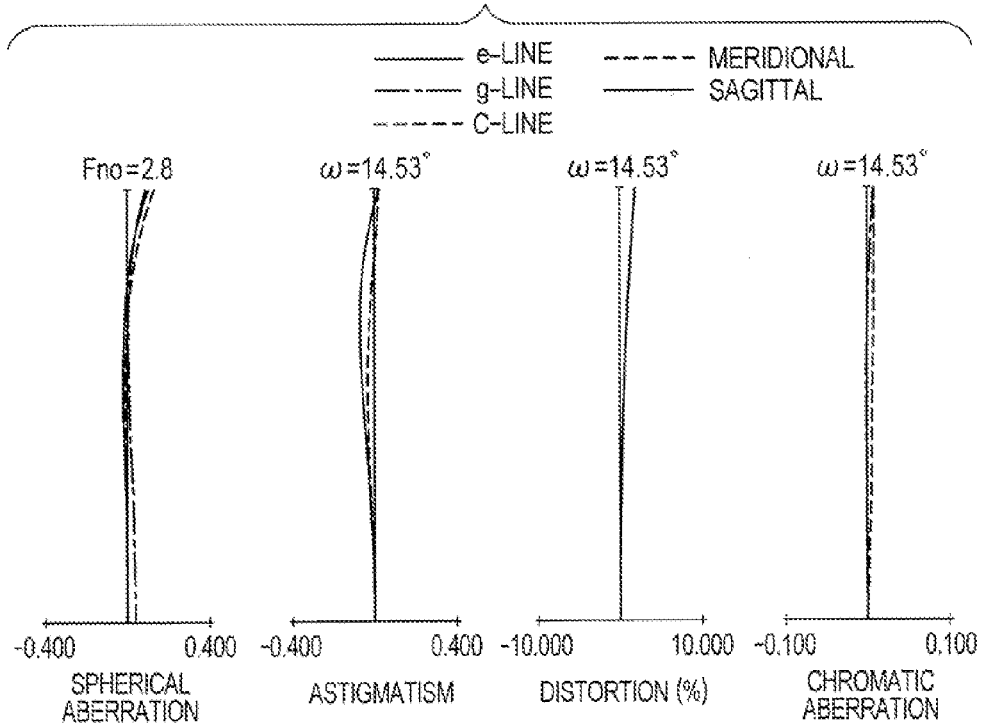
FIG. 12B is an aberration diagram in the state in which focus is at infinity at an intermediate zoom position according to Numerical Embodiment 6.
Figure 12C:
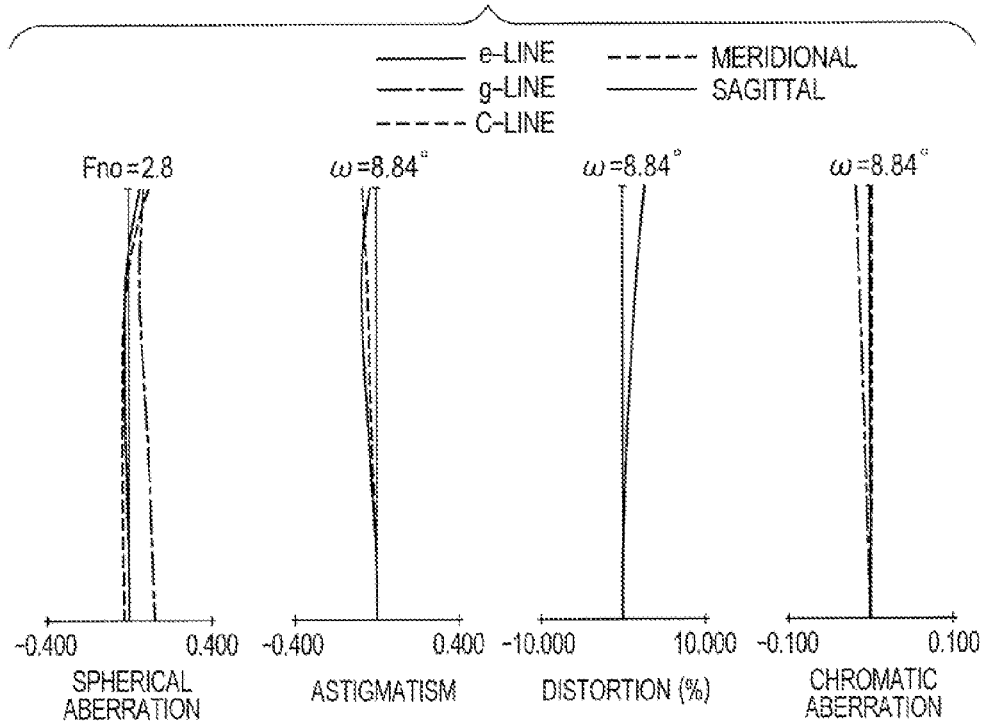
FIG. 12C is an aberration diagram in the state in which focus is at infinity at a telephoto end according to Numerical Embodiment 6.

FIG. 11 is a lens cross-sectional view when focused on infinity at the wide angle end in the zoom lens according to Embodiment 6 (Numerical Embodiment 6) of the present invention. FIGS. 12A, 12B, and 12C are longitudinal aberration diagrams of the wide angle end of Numerical Embodiment 6, the focal length of 60 mm of Numerical Embodiment 6, and the telephoto end of Numerical Embodiment 6, respectively. Each of the aberration diagrams is a longitudinal aberration diagram when focused on infinity.

In FIG. 11, the zoom lens includes in order from the object side a first lens unit (focus lens unit) U1 having a positive refractive power for focusing. The zoom lens further includes a second lens unit (variator) U2 having a negative refractive power for varying magnification which moves to the image side for varying magnification from the wide angle end to the telephoto end. The zoom lens further includes a third lens unit (compensator) U3 having a positive refractive power which moves on the optical axis nonlinearly in conjunction with the movement of the second lens unit U2 and corrects an image plane variation accompanying the magnification varying. The zoom lens further includes a fourth lens unit (relay lens unit) U4 having a positive refractive power and an imaging function which does not move for varying magnification.

Next, the first lens unit U1 of this embodiment is described. The first lens unit U1 corresponds to first to thirteenth surfaces. The first lens unit U1 includes a first sub-lens unit U1a having a negative refractive power which does not move for focusing, a second sub-lens unit U1b having a positive refractive power which moves to the image side when focusing from the infinity side to the proximity side, and a third sub-lens unit U1c having a positive refractive power which does not move for focusing. The first sub-lens unit U1a includes in order from the object side a biconcave lens G1, a meniscus concave lens G2 having a convex surface facing toward the image side, and a meniscus convex lens G3 having a concave surface facing toward the image side. The second sub-lens unit U1b includes a biconvex lens G4. The third sub-lens unit U1c includes a cemented lens obtained by cementing a meniscus concave lens G5 having a convex surface facing toward the object side and a biconvex lens G6, and a meniscus convex lens G7 having a concave surface facing toward the image side. The second lens unit U2 includes a meniscus concave lens having a convex surface facing toward the object side, a biconcave lens, a meniscus convex lens having a concave surface facing toward the image side, and a biconcave lens. The third lens unit U3 includes a convex lens and a concave lens and is constituted of a total of three lenses. The fourth lens unit U4 includes a convex lens and a concave lens and is constituted of a total of six lenses.

Values corresponding to each conditional expression of this embodiment are shown in Table 1.

In this embodiment, Expressions (1) to (11) are satisfied, and with a high zoom ratio of 2.86×, a wide angle of field is achieved as an image pick-up field angle (angle of field) of 47.90° at the wide angle end. Moreover, the aberration coefficient V of the one surface having the highest paraxial chief ray height is set in an appropriate range to effectively correct the barrel distortion at the wide angle end. In addition, the zoom lens having high optical performance in which the aberrations are successfully corrected over the entire zoom range is achieved.

Embodiment 7

Figure 13:
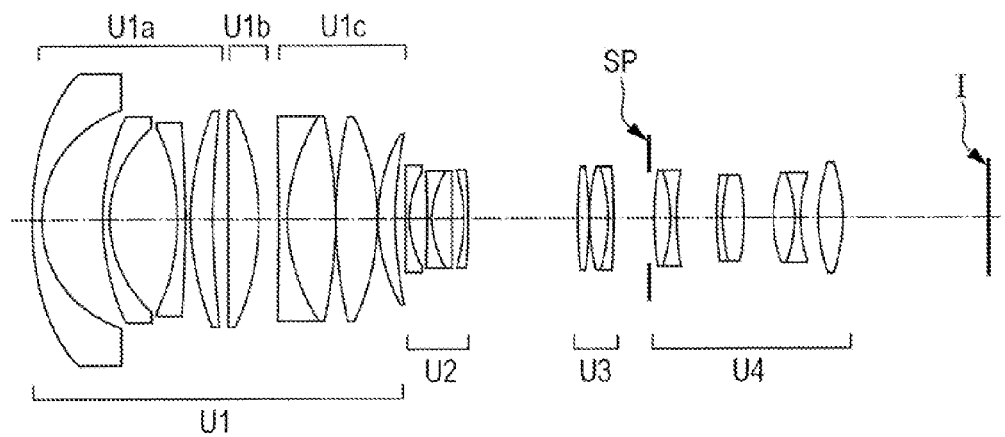
FIG. 13 is a lens cross-sectional view in the state in which focus is at infinity at a wide angle end according to Numerical Embodiment 7.
Figure 14A:
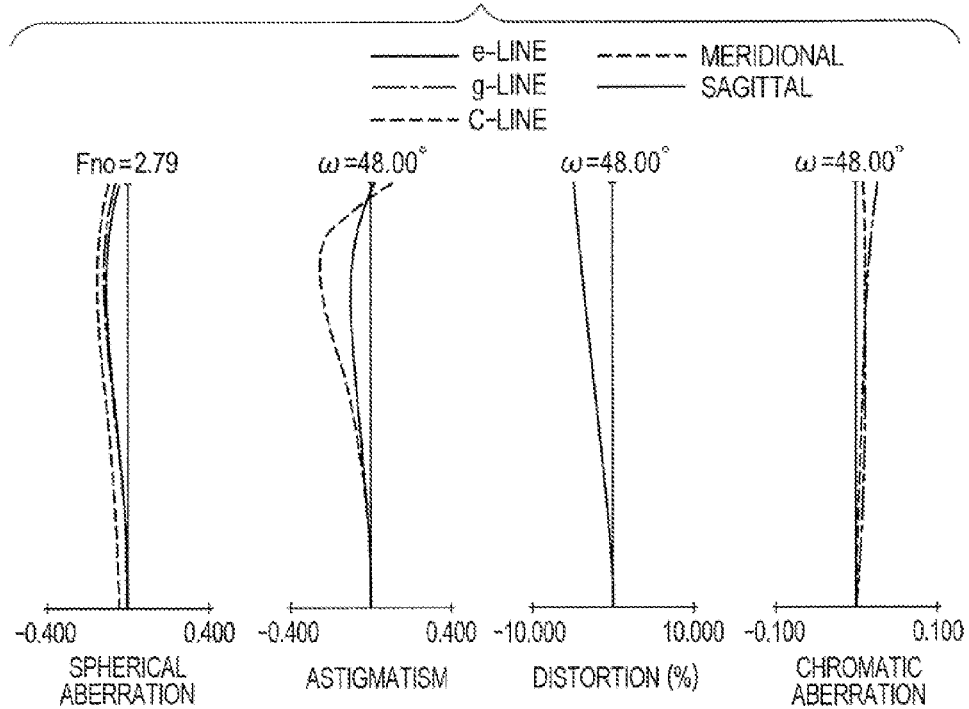
FIG. 14A is an aberration diagram in the state in which focus is at infinity at the wide angle end according to Numerical Embodiment 7.
Figure 14B:
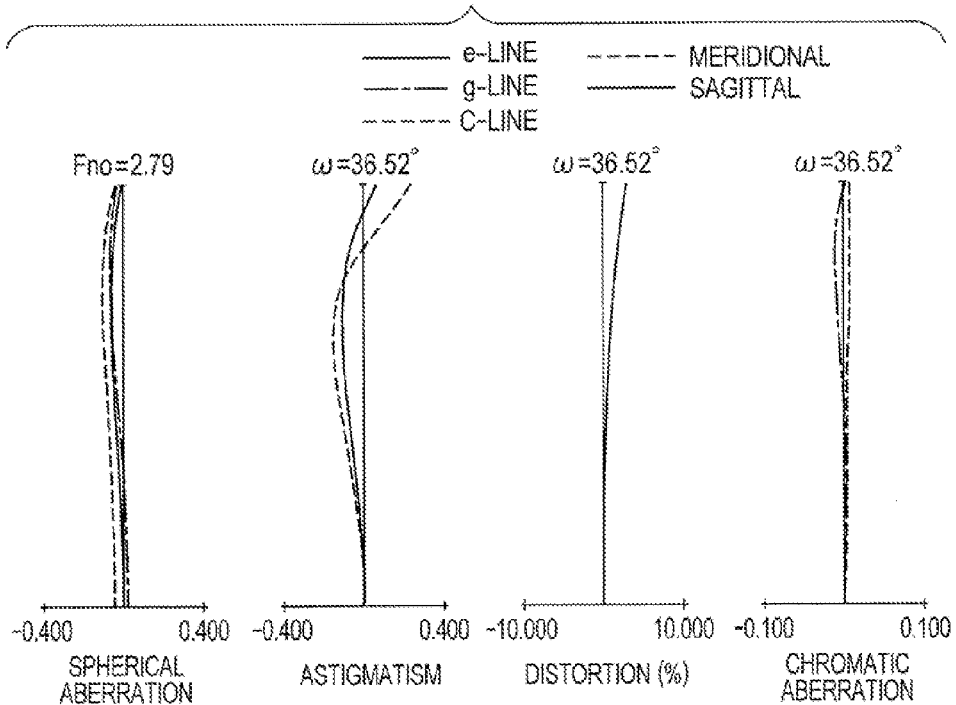
FIG. 14B is an aberration diagram in the state in which focus is at infinity at an intermediate zoom position according to Numerical Embodiment 7.
Figure 14C:
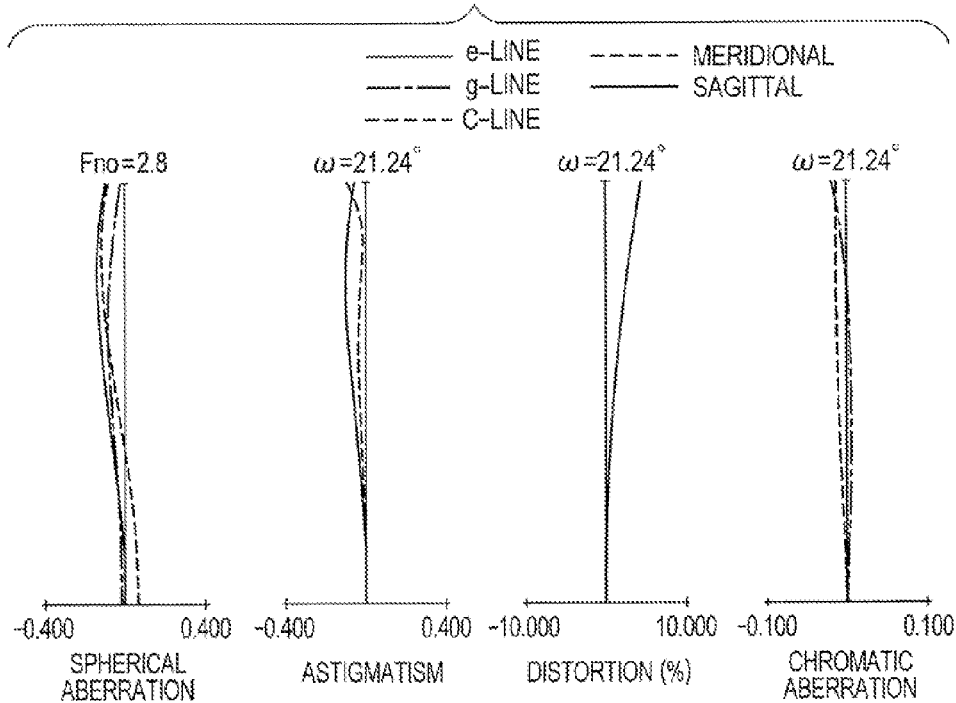
FIG. 14C is an aberration diagram in the state in which focus is at infinity at a telephoto end according to Numerical Embodiment 7.

FIG. 13 is a lens cross-sectional view when focused on infinity at the wide angle end in the zoom lens according to Embodiment 7 (Numerical Embodiment 7) of the present invention. FIGS. 14A, 14B, and 14C are longitudinal aberration diagrams of the wide angle end of Numerical Embodiment 7, the focal length of 21 mm of Numerical Embodiment 7, and the telephoto end of Numerical Embodiment 7, respectively. Each of the aberration diagrams is a longitudinal aberration diagram when focused on infinity.

In FIG. 13, the zoom lens includes in order from the object side a first lens unit (focus lens unit) U1 having a positive refractive power for focusing. The zoom lens further includes a second lens unit (variator) U2 having a negative refractive power for varying magnification which moves to the image side for varying magnification from the wide angle end to the telephoto end. The zoom lens further includes a third lens unit (compensator) U3 having a positive refractive power which moves on the optical axis nonlinearly in conjunction with the movement of the second lens unit U2 and corrects an image plane variation accompanying the magnification varying. The zoom lens further includes a fourth lens unit (relay lens unit)

U4 having a positive refractive power and an imaging function which does not move for varying magnification.

Next, the first lens unit U1 of this embodiment is described. The first lens unit U1 corresponds to first to seventeenth surfaces. The first lens unit U1 includes a first sub-lens unit U1a having a negative refractive power which does not move for focusing, a second sub-lens unit U1b having a positive refractive power which moves to the image side when focusing from the infinity side to the proximity side, and a third sub-lens unit U1c having a positive refractive power which does not move for focusing. The first sub-lens unit U1a includes in order from the object side a meniscus concave lens G1 having a convex surface facing toward the object side, a meniscus concave lens G2 having a convex surface facing toward the object side, a meniscus concave lens G3 having a convex surface facing toward the image side, and a meniscus convex lens G4 having a concave surface facing toward the image side. The second sub-lens unit U1b includes a biconvex lens G5. The third sub-lens unit U1c includes a cemented lens obtained by cementing a biconcave lens G6 and a biconvex lens G7, a biconvex lens G8, and a meniscus convex lens G9 having a concave surface facing toward the image side. The first surface has an aspherical surface shape. The first surface mainly corrects the distortion on the wide angle side. The second lens unit U2 includes a meniscus concave lens having a convex surface facing toward the object side, a cemented lens of a biconcave lens and a biconvex lens, and a meniscus concave lens having a convex surface facing toward the image side. The third lens unit U3 includes a convex lens and a concave lens and is constituted of a total of three lenses. The fourth lens unit U4 includes a convex lens and a concave lens and is constituted of a total of seven lenses.

Values corresponding to each conditional expression of this embodiment are shown in Table 1.

In this embodiment, Expressions (1) to (3), (6) to (9), and (11) are satisfied, and with a high zoom ratio of 2.86×, a wide angle of field is achieved as an image pick-up field angle (angle of field) of 96.00° at the wide angle end. Moreover, the aberration coefficient V of the one surface having the highest paraxial chief ray height is set in an appropriate range to effectively correct the barrel distortion at the wide angle end. In addition, the zoom lens having high optical performance in which the aberrations are successfully corrected over the entire zoom range is achieved.

The exemplary embodiments of the present invention have been described above. However, the present invention is not limited to these exemplary embodiments, and various modifications and changes can be made thereto within the gist of the present invention.

Numerical Embodiment 1

| | | Unit: mm | | | | | |
|---|---|---|---|---|---|---|---|
| | | | Surface data | | | | |
| i-th surface | ri | di | ndi | vdi | θgFi | Effective diameter | Focal length |
| 1 | 113.35495 | 2.10000 | 1.772499 | 49.60 | 0.5521 | 62.167 | −84.555 |
| 2 | 41.22933 | 12.22908 | | | | 54.489 | |
| 3 | −380.22797 | 2.00000 | 1.589130 | 61.14 | 0.5406 | 54.058 | −131.963 |
| 4 | 98.39664 | 7.84168 | | | | 52.642 | |
| 5 | −92.86928 | 2.00000 | 1.589130 | 61.14 | 0.5406 | 52.633 | −222.909 |
| 6 | −316.72478 | 2.50000 | | | | 53.594 | |
| 7 | 105.42501 | 5.54987 | 1.805181 | 25.42 | 0.6161 | 57.774 | 148.201 |
| 8 | 825.97252 | 1.71834 | | | | 58.025 | |
| 9 | 160.20088 | 9.37829 | 1.496999 | 81.54 | 0.5374 | 59.154 | 122.738 |
| 10 | −97.05090 | 10.36281 | | | | 59.275 | |
| 11 | 161.98385 | 2.00000 | 1.805181 | 25.42 | 0.6161 | 55.212 | −83.312 |
| 12 | 47.48212 | 9.70418 | 1.496999 | 81.54 | 0.5374 | 53.020 | 99.816 |
| 13 | 969.23400 | 0.15372 | | | | 52.875 | |
| 14 | 86.41375 | 9.27635 | 1.487490 | 70.23 | 0.5300 | 52.555 | 106.410 |
| 15 | −126.27409 | 0.15372 | | | | 51.902 | |
| 16 | 64.28015 | 5.18222 | 1.729157 | 54.68 | 0.5444 | 47.224 | 123.534 |
| 17 | 214.49049 | (Variable) | | | | 45.879 | |
| 18 | 154.04994 | 1.15291 | 1.772499 | 49.60 | 0.5521 | 24.596 | −40.274 |
| 19 | 25.90238 | 4.64707 | | | | 22.567 | |
| 20 | −76.38966 | 1.07605 | 1.589130 | 61.14 | 0.5406 | 22.637 | −35.603 |
| 21 | 29.22191 | 3.45874 | 1.846660 | 23.78 | 0.6034 | 23.277 | 38.757 |
| 22 | 233.70320 | 3.39659 | | | | 23.278 | |
| 23 | −27.39565 | 0.99919 | 1.589130 | 61.14 | 0.5406 | 23.321 | −88.730 |
| 24 | −58.09515 | (Variable) | | | | 24.239 | |
| 25 | −143.82535 | 3.02257 | 1.589130 | 61.14 | 0.5406 | 25.120 | 138.124 |
| 26 | −52.50607 | 0.10376 | | | | 25.713 | |
| 27 | 70.73807 | 5.74776 | 1.496999 | 81.54 | 0.5374 | 26.247 | 48.232 |
| 28 | −35.43497 | 1.07605 | 1.834000 | 37.16 | 0.5775 | 26.236 | −74.678 |
| 29 | −82.65359 | (Variable) | | | | 26.592 | |
| 30 (Stop) | ∞ | 6.80013 | | | | 26.476 | |
| 31 | 26.04181 | 4.38025 | 1.651597 | 58.55 | 0.5426 | 26.346 | 74.782 |
| 32 | 51.97292 | 6.78396 | | | | 25.274 | |
| 33 | 296.75559 | 3.92358 | 1.846660 | 23.78 | 0.6205 | 22.972 | 41.104 |
| 34 | −39.62446 | 1.03762 | 1.720467 | 34.70 | 0.5834 | 22.429 | −21.464 |
| 35 | 25.93030 | 10.00000 | | | | 20.836 | |
| 36 | 52.04781 | 10.35747 | 1.496999 | 81.54 | 0.5374 | 27.625 | 30.287 |
| 37 | −19.85686 | 1.03762 | 1.720467 | 34.70 | 0.5834 | 28.256 | −47.764 |
| 38 | −47.53798 | 0.20000 | | | | 30.269 | |
| 39 | 57.39627 | 4.98220 | 1.438750 | 94.93 | 0.5343 | 31.721 | 112.479 |
| 40 | −348.94714 | 49.43659 | | | | 31.777 | |

-continued

| Unit: mm | |
|---|---|
| Image plane | ∞ |

Various data
Zoom ratio2.60

| | Wide angle | Intermidiate | Telephoto |
|---|---|---|---|
| Focal length | 25.00 | 40.00 | 65.00 |
| F-number | 2.60 | 2.60 | 2.60 |
| Half angle of field | 31.88 | 21.24 | 13.45 |
| Image height | 15.55 | 15.55 | 15.55 |
| Entire lens length | 239.92 | 239.92 | 239.92 |
| BF | 49.44 | 49.44 | 49.44 |
| d17 | 2.00 | 18.21 | 28.40 |
| d24 | 23.15 | 14.96 | 1.50 |
| d29 | 9.00 | 0.97 | 4.25 |
| Incidence pupil position | 48.49 | 63.91 | 79.56 |
| Exit pupil position | −78.87 | −78.87 | −78.87 |
| Front principal point position | 68.62 | 91.44 | 111.63 |
| Rear principal point position | 24.44 | 9.44 | −15.56 |

Zoom lens unit data

| Unit | First surface | Focal length | Lens structure length | Front principal point position | Rear principal point position |
|---|---|---|---|---|---|
| 1 | 1 | 46.50 | 82.15 | 52.36 | 26.10 |
| 2 | 18 | −24.00 | 14.73 | 3.80 | −7.34 |
| 3 | 25 | 67.50 | 9.95 | 3.01 | −3.44 |
| 4 | 30 | 69.21 | 49.50 | 32.84 | −16.37 |

Moving amount of second sub-lens unit in focusing (provided that direction from object side to image side is positive)

| Unit | Infinity | Closest (0.6 m) |
|---|---|---|
| Second sub-lens unit | 0 | 8.83 |

Paraxial ray tracing value (Wide angle end)

| Surface number | α | H | α' | H' |
|---|---|---|---|---|
| 1 | 0.0000 | 1.0000 | −1.0000 | −1.9396 |
| 2 | 0.1712 | 0.9919 | −1.3320 | −1.8766 |
| 3 | −0.2957 | 1.1365 | −0.4488 | −1.6570 |
| 4 | −0.3399 | 1.1536 | −0.3844 | −1.6377 |
| 5 | −0.5132 | 1.3146 | −0.1383 | −1.5944 |
| 6 | −0.7225 | 1.3509 | 0.1156 | −1.6002 |
| 7 | −0.6594 | 1.4169 | 0.0409 | −1.6043 |
| 8 | −0.3864 | 1.4642 | −0.2683 | −1.5714 |
| 9 | −0.4224 | 1.4932 | −0.2296 | −1.5556 |
| 10 | −0.3063 | 1.5699 | −0.3506 | −1.4678 |
| 11 | −0.1047 | 1.6133 | −0.5391 | −1.2444 |
| 12 | 0.0976 | 1.6090 | −0.6952 | −1.2137 |
| 13 | −0.1685 | 1.6526 | −0.4944 | −1.0856 |
| 14 | −0.1898 | 1.6538 | −0.4804 | −1.0827 |
| 15 | 0.0443 | 1.6428 | −0.6337 | −0.9248 |
| 16 | 0.2034 | 1.6415 | −0.7232 | −0.9203 |
| 17 | 0.6709 | 1.5612 | −0.9853 | −0.8024 |
| 18 | 0.5376 | 1.5182 | −0.9168 | −0.7291 |
| 19 | 0.7289 | 1.4993 | −1.0087 | −0.7029 |
| 20 | −0.3943 | 1.5726 | −0.4821 | −0.6133 |
| 21 | −0.6987 | 1.5915 | −0.3634 | −0.6034 |
| 22 | −0.3398 | 1.6168 | −0.4995 | −0.5662 |
| 23 | −0.4877 | 1.6831 | −0.4477 | −0.5054 |
| 24 | −1.3961 | 1.7182 | −0.1750 | −0.5010 |
| 25 | −0.9588 | 2.6059 | −0.3025 | −0.2209 |
| 26 | −1.2267 | 2.6991 | −0.2798 | −0.1997 |
| 27 | −0.4666 | 2.7010 | −0.3360 | −0.1983 |
| 28 | 0.0092 | 2.6996 | −0.3709 | −0.1414 |
| 29 | −0.6400 | 2.7146 | −0.3369 | −0.1335 |
| 30 | 0.0491 | 2.6969 | −0.3708 | 0.0000 |
| 31 | 0.0491 | 2.6835 | −0.3708 | 0.1009 |

-continued

| Unit: mm | | | | |
|---|---|---|---|---|
| 32 | 1.7346 | 2.4998 | −0.3075 | 0.1334 |
| 33 | 0.9479 | 2.2426 | −0.3494 | 0.2282 |
| 34 | 1.1094 | 2.1487 | −0.3330 | 0.2564 |
| 35 | 1.2852 | 2.1178 | −0.3120 | 0.2639 |
| 36 | −0.1959 | 2.1962 | −0.4966 | 0.4626 |
| 37 | 0.3299 | 2.1050 | −0.3859 | 0.5692 |
| 38 | −0.2715 | 2.1115 | −0.5485 | 0.5824 |
| 39 | 0.5340 | 2.1072 | −0.3263 | 0.5851 |
| 40 | 0.9377 | 1.9775 | −0.2142 | 0.6147 |

| Aberration coefficient of third-order distortion (Wide angle end) | |
|---|---|
| Surface number | V |
| 1 | 0.2962 |
| 2 | 0.3301 |
| 3 | 0.0824 |
| 4 | 0.0442 |
| 5 | −0.0127 |
| 6 | 0.0040 |
| 7 | −0.1027 |
| 8 | −0.0111 |
| 9 | −0.0010 |
| 10 | −0.3904 |
| 11 | 0.0935 |
| 12 | 0.0313 |
| 13 | −0.0923 |
| 14 | 0.0262 |
| 15 | −0.5358 |
| 16 | 0.1418 |
| 17 | −0.6554 |
| 18 | 0.6194 |
| 19 | 0.0488 |
| 20 | 0.1973 |
| 21 | −0.0217 |
| 22 | −0.0841 |
| 23 | 0.3707 |
| 24 | −0.0661 |
| 25 | 0.0533 |
| 26 | −0.0979 |
| 27 | 0.0388 |
| 28 | 0.0415 |
| 29 | −0.1169 |
| 30 | 0.0000 |
| 31 | 0.1338 |
| 32 | −0.0909 |
| 33 | 0.0737 |
| 34 | −0.0002 |
| 35 | −0.3877 |
| 36 | 0.3154 |
| 37 | −0.0556 |
| 38 | −0.0027 |
| 39 | 0.1134 |
| 40 | −0.0061 |

Numerical Embodiment 2

| Unit: mm | | | | | | | |
|---|---|---|---|---|---|---|---|
| Surface data | | | | | | | |
| i-th surface | ri | di | ndi | vdi | θgFi | Effective diameter | Focal length |
| 1 | 569.09377 | 2.50000 | 1.772499 | 49.60 | 0.5521 | 60.901 | −70.246 |
| 2 | 49.66287 | 13.37511 | | | | 54.777 | |
| 3 | −79.91880 | 2.30000 | 1.589130 | 61.14 | 0.5406 | 54.739 | −112.798 |
| 4 | 408.02306 | 3.09406 | | | | 56.294 | |
| 5 | 112.28112 | 7.70636 | 1.720467 | 34.70 | 0.5834 | 58.902 | 119.452 |
| 6 | −368.60510 | 2.00000 | | | | 59.446 | |
| 7 | 206.34761 | 8.86325 | 1.496999 | 81.54 | 0.5374 | 60.794 | 149.796 |
| 8 | −115.33272 | 15.73443 | | | | 60.953 | |
| 9 | 147.60148 | 2.40000 | 1.846660 | 23.78 | 0.6205 | 56.869 | −102.392 |

-continued

Unit: mm

| | | | | | | | |
|---|---|---|---|---|---|---|---|
| 10 | 54.54195 | 10.13325 | 1.487490 | 70.23 | 0.5300 | 54.911 | 101.597 |
| 11 | −525.18292 | 0.19000 | | | | 54.771 | |
| 12 | 105.32160 | 6.29682 | 1.589130 | 61.14 | 0.5406 | 54.082 | 165.676 |
| 13 | −1375.48863 | 0.19000 | | | | 53.347 | |
| 14 | 86.03858 | 6.39104 | 1.729157 | 54.68 | 0.5444 | 51.176 | 117.556 |
| 15 | 138926.03827 | (Variable) | | | | 49.796 | |
| 16 | 34.99716 | 1.42500 | 1.882997 | 40.76 | 0.5667 | 27.336 | −72.631 |
| 17 | 22.25354 | 5.50719 | | | | 25.453 | |
| 18 | −67.59354 | 1.33000 | 1.589130 | 61.14 | 0.5406 | 25.399 | −63.016 |
| 19 | 83.68381 | 1.14000 | | | | 25.514 | |
| 20 | 32.48916 | 3.50000 | 1.959060 | 17.47 | 0.6599 | 26.210 | 60.670 |
| 21 | 68.51665 | 3.11055 | | | | 25.605 | |
| 22 | −51.90144 | 1.23500 | 1.772499 | 49.60 | 0.5521 | 25.530 | −42.723 |
| 23 | 92.79882 | (Variable) | | | | 25.855 | |
| 24 | 283.11036 | 1.33000 | 1.834000 | 37.16 | 0.5775 | 26.788 | −69.257 |
| 25 | 48.12367 | 5.48001 | 1.496999 | 81.54 | 0.5374 | 27.275 | 58.380 |
| 26 | −70.82342 | 0.12825 | | | | 28.003 | |
| 27 | 69.02571 | 3.76292 | 1.589130 | 61.14 | 0.5406 | 28.973 | 110.369 |
| 28 | −1177.06735 | (Variable) | | | | 29.045 | |
| 29 (Stop) | ∞ | 1.00000 | | | | 29.114 | |
| 30 | 31.40773 | 5.67589 | 1.622296 | 53.20 | 0.5542 | 29.291 | 57.226 |
| 31 | 239.58077 | 10.00000 | | | | 28.374 | |
| 32 | −118.60112 | 4.38050 | 1.808095 | 22.76 | 0.6307 | 23.562 | 46.770 |
| 33 | −29.36460 | 1.03762 | 1.720467 | 34.70 | 0.5834 | 23.059 | −20.270 |
| 34 | 29.88605 | 10.00000 | | | | 21.693 | |
| 35 | 84.94267 | 9.52402 | 1.496999 | 81.54 | 0.5374 | 28.303 | 35.324 |
| 36 | −21.38315 | 1.03762 | 1.755199 | 27.51 | 0.6103 | 29.200 | −68.341 |
| 37 | −37.05262 | 0.20000 | | | | 31.055 | |
| 38 | 63.03441 | 4.47896 | 1.589130 | 61.14 | 0.5406 | 32.663 | 115.819 |
| 39 | 769.33635 | 55.44627 | | | | 32.591 | |
| Image plane | ∞ | | | | | | |

Various data
Zoom ratio 2.67

| | Wide angle | Intermidiate | Telephoto |
|---|---|---|---|
| Focal length | 30.00 | 50.00 | 80.00 |
| F-number | 2.60 | 2.60 | 2.60 |
| Half angle of field | 27.40 | 17.28 | 11.00 |
| Image height | 15.55 | 15.55 | 15.55 |
| Entire lens length | 248.72 | 248.72 | 248.72 |
| BF | 55.45 | 55.45 | 55.45 |
| d15 | 1.59 | 18.97 | 29.02 |
| d23 | 26.23 | 17.01 | 2.73 |
| d28 | 9.00 | 0.84 | 5.06 |
| Incidence pupil position | 54.66 | 75.54 | 94.32 |
| Exit pupil position | −76.32 | −76.32 | −76.32 |
| Front principal point position | 77.83 | 106.57 | 125.75 |
| Rear principal point position | 25.45 | 5.45 | −24.55 |

Zoom lens unit data

| Unit | First surface | Focal length | Lens structure length | Front principal point position | Rear principal point position |
|---|---|---|---|---|---|
| 1 | 1 | 54.00 | 81.17 | 53.22 | 25.18 |
| 2 | 16 | −25.00 | 17.25 | 8.59 | −4.20 |
| 3 | 24 | 82.00 | 10.70 | 5.57 | −1.25 |
| 4 | 29 | 71.11 | 47.33 | 30.98 | −21.43 |

Moving amount of second sub-lens unit in focusing (provided that direction from object side to image side is positive)

| Unit | Infinity | Closest (0.6 m) |
|---|---|---|
| Second sub-lens unit | 0 | 13.73 |

Paraxial ray tracing value (Wide angle end)

| Surface number | α | H | α' | H' |
|---|---|---|---|---|
| 1 | 0.0000 | 1.0000 | −1.0000 | −1.8221 |
| 2 | 0.0409 | 0.9981 | −1.0746 | −1.7717 |
| 3 | −0.4271 | 1.1885 | −0.2438 | −1.6630 |
| 4 | −0.6909 | 1.2218 | 0.1254 | −1.6690 |

-continued

| | | Unit: mm | | |
|---|---|---|---|---|
| 5 | −0.7441 | 1.2985 | 0.1979 | −1.6894 |
| 6 | −0.4924 | 1.3718 | −0.1295 | −1.6702 |
| 7 | −0.4114 | 1.3992 | −0.2281 | −1.6550 |
| 8 | −0.3100 | 1.4604 | −0.3480 | −1.5863 |
| 9 | −0.1207 | 1.5236 | −0.5537 | −1.2959 |
| 10 | 0.1441 | 1.5174 | −0.7789 | −1.2623 |
| 11 | −0.1613 | 1.5540 | −0.5249 | −1.1433 |
| 12 | −0.1178 | 1.5547 | −0.5568 | −1.1398 |
| 13 | 0.1441 | 1.5357 | −0.7488 | −1.0410 |
| 14 | 0.1639 | 1.5347 | −0.7623 | −1.0362 |
| 15 | 0.5558 | 1.4664 | −1.0268 | −0.9099 |
| 16 | 0.5556 | 1.4369 | −1.0267 | −0.8555 |
| 17 | 1.6495 | 1.3954 | −1.6780 | −0.8133 |
| 18 | −0.0212 | 1.3993 | −0.7043 | −0.6840 |
| 19 | −0.3885 | 1.4101 | −0.5247 | −0.6694 |
| 20 | −0.6875 | 1.4363 | −0.3828 | −0.6549 |
| 21 | 0.6014 | 1.4007 | −0.9705 | −0.5974 |
| 22 | 0.0054 | 1.4001 | −0.7162 | −0.5232 |
| 23 | −0.6228 | 1.4146 | −0.4815 | −0.5120 |
| 24 | −0.9778 | 2.2694 | −0.3530 | −0.2034 |
| 25 | −0.7759 | 2.2881 | −0.3711 | −0.1944 |
| 26 | −1.2622 | 2.4420 | −0.3298 | −0.1542 |
| 27 | −0.7466 | 2.4452 | −0.3624 | −0.1527 |
| 28 | −0.1180 | 2.4545 | −0.4016 | −0.1210 |
| 29 | −0.0810 | 2.4788 | −0.4034 | 0.0000 |
| 30 | −0.0810 | 2.4815 | −0.4034 | 0.0134 |
| 31 | 1.4006 | 2.3184 | −0.3954 | 0.0595 |
| 32 | 1.2191 | 1.9121 | −0.4001 | 0.1928 |
| 33 | 0.8242 | 1.8458 | −0.4399 | 0.2282 |
| 34 | 0.9959 | 1.8258 | −0.4186 | 0.2366 |
| 35 | −0.3335 | 1.9370 | −0.5909 | 0.4336 |
| 36 | 0.0075 | 1.9354 | −0.5146 | 0.5426 |
| 37 | −0.7073 | 1.9493 | −0.7150 | 0.5566 |
| 38 | 0.4949 | 1.9460 | −0.3717 | 0.5591 |
| 39 | 1.0426 | 1.8482 | −0.2143 | 0.5792 |

| Aberration coefficient of third-order distortion (Wide angle end) | |
|---|---|
| Surface number | V |
| 1 | 0.5768 |
| 2 | 0.4525 |
| 3 | 0.0613 |
| 4 | 0.0333 |
| 5 | −0.2554 |
| 6 | −0.0128 |
| 7 | −0.0010 |
| 8 | −0.4111 |
| 9 | 0.0773 |
| 10 | 0.0428 |
| 11 | −0.1792 |
| 12 | 0.0499 |
| 13 | −0.4349 |
| 14 | 0.1649 |
| 15 | −1.0577 |
| 16 | 0.1699 |
| 17 | 0.1521 |
| 18 | 0.5928 |
| 19 | −0.0178 |
| 20 | −0.0567 |
| 21 | −0.1937 |
| 22 | 0.6842 |
| 23 | −0.0235 |
| 24 | 0.0639 |
| 25 | −0.0041 |
| 26 | −0.0870 |
| 27 | 0.0510 |
| 28 | −0.0988 |
| 29 | 0.0000 |
| 30 | 0.1070 |
| 31 | −0.0952 |
| 32 | 0.0706 |
| 33 | −0.0001 |
| 34 | −0.4815 |
| 35 | 0.3500 |
| 36 | −0.0484 |

-continued

| | Unit: mm |
|---|---|
| 37 | 0.0137 |
| 38 | 0.1642 |
| 39 | −0.0145 |

Numerical Embodiment 3

Unit: mm

Surface data

| i-th surface | ri | di | ndi | vdi | θgFi | Effective diameter | Focal length |
|---|---|---|---|---|---|---|---|
| 1 | −387.64273 | 2.50000 | 1.696797 | 55.53 | 0.5433 | 59.898 | −59.064 |
| 2 | 46.38826 | 8.64808 | 1.755199 | 27.51 | 0.6103 | 55.136 | 90.636 |
| 3 | 130.00855 | 5.00033 | | | | 54.147 | |
| 4 | −198.93482 | 2.50000 | 1.589130 | 61.14 | 0.5406 | 54.025 | −227.124 |
| 5 | 415.54663 | 2.50037 | | | | 54.708 | |
| 6 | 136.25286 | 3.00000 | 1.805181 | 25.42 | 0.6161 | 56.044 | −181.576 |
| 7 | 70.14039 | 10.81699 | 1.589130 | 61.14 | 0.5406 | 55.871 | 89.414 |
| 8 | −202.60045 | 13.52988 | | | | 56.141 | |
| 9 | 258.20501 | 2.85000 | 1.720467 | 34.70 | 0.5834 | 55.717 | −121.610 |
| 10 | 65.44554 | 0.05688 | | | | 54.938 | |
| 11 | 64.07890 | 11.55971 | 1.438750 | 94.93 | 0.5343 | 55.060 | 100.928 |
| 12 | −136.54293 | 0.19000 | | | | 55.179 | |
| 13 | 73.47706 | 8.63795 | 1.438750 | 94.93 | 0.5343 | 54.241 | 141.235 |
| 14 | −387.57107 | 0.19000 | | | | 53.439 | |
| 15 | 65.89591 | 7.11833 | 1.487490 | 70.23 | 0.5300 | 51.447 | 152.586 |
| 16 | 542.70635 | (Variable) | | | | 50.295 | |
| 17 | 90.34638 | 1.42500 | 1.772499 | 49.60 | 0.5521 | 28.500 | −43.805 |
| 18 | 24.53389 | 5.49570 | | | | 26.391 | |
| 19 | −65.70815 | 1.33000 | 1.589130 | 61.14 | 0.5406 | 26.405 | −66.841 |
| 20 | 99.97739 | 1.14000 | | | | 27.051 | |
| 21 | 38.05226 | 4.85065 | 1.846660 | 23.78 | 0.6205 | 28.433 | 43.812 |
| 22 | −2268.67983 | 2.38400 | | | | 28.151 | |
| 23 | −47.60904 | 1.23500 | 1.729157 | 54.68 | 0.5444 | 28.068 | −45.632 |
| 24 | 113.33972 | (Variable) | | | | 28.537 | |
| 25 | 326.79061 | 1.20000 | 1.834000 | 37.16 | 0.5775 | 28.981 | −91.748 |
| 26 | 62.21608 | 6.00133 | 1.496999 | 81.54 | 0.5374 | 29.422 | 58.799 |
| 27 | −53.63319 | 0.20000 | | | | 30.096 | |
| 28 | 67.51788 | 3.77676 | 1.651597 | 58.55 | 0.5426 | 30.910 | 144.366 |
| 29 | 231.53313 | (Variable) | | | | 30.738 | |
| 30 (Stop) | ∞ | 4.42650 | | | | 30.488 | |
| 31 | 31.66067 | 9.01039 | 1.620411 | 60.29 | 0.5426 | 30.269 | 48.264 |
| 32 | −530.41808 | 7.64675 | | | | 28.182 | |
| 33 | −64.40672 | 6.07509 | 1.805181 | 25.42 | 0.6161 | 23.096 | 46.617 |
| 34 | −24.86149 | 1.50000 | 1.737999 | 32.26 | 0.5899 | 22.128 | −17.751 |
| 35 | 28.84693 | 6.87481 | | | | 22.056 | |
| 36 | −254.47813 | 5.67446 | 1.496999 | 81.54 | 0.5374 | 25.005 | 50.317 |
| 37 | −23.00000 | 1.64526 | | | | 25.938 | |
| 38 | −22.50692 | 1.50000 | 1.772499 | 49.60 | 0.5521 | 26.032 | −78.195 |
| 39 | −36.81350 | 6.14540 | | | | 27.836 | |
| 40 | 94.65141 | 5.34629 | 1.595220 | 67.74 | 0.5442 | 32.702 | 69.715 |
| 41 | −72.78282 | 54.89683 | | | | 33.010 | |
| Image plane | ∞ | | | | | | |

Various data
Zoom ratio 3.00

| | Wide angle | Intermidiate | Telephoto |
|---|---|---|---|
| Focal length | 40.00 | 70.00 | 120.00 |
| F-number | 2.80 | 2.80 | 2.80 |
| Half angle of field | 21.24 | 12.52 | 7.38 |
| Image height | 15.55 | 15.55 | 15.55 |
| Entire lens length | 259.93 | 259.93 | 259.93 |
| BF | 54.90 | 54.90 | 54.90 |
| d16 | 1.97 | 21.72 | 32.35 |
| d24 | 29.08 | 18.60 | 1.51 |
| d29 | 10.00 | 0.73 | 7.20 |
| Incidence pupil position | 73.17 | 113.26 | 152.33 |
| Exit pupil position | −92.49 | −92.49 | −92.49 |

-continued

| Unit: mm | | | |
|---|---|---|---|
| Front principal point position | 102.31 | 150.01 | 174.63 |
| Rear principal point position | 14.90 | −15.10 | −65.10 |

Zoom lens unit data

| Unit | First surface | Focal length | Lens structure length | Front principal point position | Rear principal point position |
|---|---|---|---|---|---|
| 1 | 1 | 68.00 | 79.10 | 54.36 | 10.07 |
| 2 | 17 | −25.00 | 17.86 | 5.60 | −6.93 |
| 3 | 25 | 74.00 | 11.18 | 4.98 | −2.11 |
| 4 | 30 | 88.57 | 55.84 | 37.87 | −26.32 |

Moving amount of second sub-lens unit in focusing (provided that direction from object side to image side is positive)

| Unit | Infinity | Closest (1.0 m) |
|---|---|---|
| Second sub-lens unit | 0 | 12.03 |

Paraxial ray tracing value (Wide angle end)

| Surface number | α | H | α' | H' |
|---|---|---|---|---|
| 1 | 0.0000 | 1.0000 | −1.0000 | −1.8292 |
| 2 | −0.0722 | 1.0027 | −0.8679 | −1.7972 |
| 3 | −0.0187 | 1.0050 | −0.9638 | −1.6790 |
| 4 | −0.2542 | 1.0367 | −0.5704 | −1.6077 |
| 5 | −0.3775 | 1.0516 | −0.3792 | −1.5928 |
| 6 | −0.4374 | 1.0789 | −0.2885 | −1.5747 |
| 7 | −0.1800 | 1.0863 | −0.6642 | −1.5473 |
| 8 | −0.3170 | 1.1402 | −0.4690 | −1.4676 |
| 9 | −0.1839 | 1.2024 | −0.6404 | −1.2510 |
| 10 | −0.0488 | 1.2044 | −0.7809 | −1.2187 |
| 11 | −0.5827 | 1.2053 | −0.2406 | −1.2184 |
| 12 | −0.2518 | 1.2558 | −0.5751 | −1.1029 |
| 13 | −0.0900 | 1.2562 | −0.7173 | −1.0995 |
| 14 | 0.2108 | 1.2246 | −0.9805 | −0.9525 |
| 15 | 0.2664 | 1.2233 | −1.0238 | −0.9476 |
| 16 | 0.6296 | 1.1481 | −1.3051 | −0.7916 |
| 17 | 0.5882 | 1.1191 | −1.2766 | −0.7288 |
| 18 | 0.9728 | 1.0996 | −1.5271 | −0.6982 |
| 19 | −0.4188 | 1.1572 | −0.6435 | −0.6097 |
| 20 | −0.8354 | 1.1746 | −0.4240 | −0.6009 |
| 21 | −1.1133 | 1.2063 | −0.2818 | −0.5928 |
| 22 | −0.0291 | 1.2082 | −0.8147 | −0.5396 |
| 23 | −0.0108 | 1.2089 | −0.8228 | −0.4906 |
| 24 | −0.7547 | 1.2223 | −0.5210 | −0.4813 |
| 25 | −1.0706 | 2.0007 | −0.3966 | −0.1929 |
| 26 | −0.8650 | 2.0149 | −0.4164 | −0.1861 |
| 27 | −1.3066 | 2.1457 | −0.3756 | −0.1485 |
| 28 | −0.5089 | 2.1482 | −0.4308 | −0.1464 |
| 29 | 0.3237 | 2.1297 | −0.4876 | −0.1185 |
| 30 | 0.0830 | 2.1090 | −0.4742 | 0.0000 |
| 31 | 0.0830 | 2.0994 | −0.4742 | 0.0551 |
| 32 | 1.7501 | 1.8606 | −0.4304 | 0.1138 |
| 33 | 1.8473 | 1.5125 | −0.4245 | 0.1938 |
| 34 | 1.0865 | 1.4217 | −0.5219 | 0.2374 |
| 35 | 1.2418 | 1.4032 | −0.4960 | 0.2448 |
| 36 | −0.2128 | 1.4525 | −0.7498 | 0.4187 |
| 37 | −0.2950 | 1.4836 | −0.7735 | 0.5002 |
| 38 | 0.9911 | 1.4428 | −0.3398 | 0.5143 |
| 39 | −1.0096 | 1.4575 | −1.0530 | 0.5296 |
| 40 | 0.1349 | 1.4492 | −0.6371 | 0.5688 |
| 41 | 0.4512 | 1.4100 | −0.5129 | 0.6134 |

Aberration coefficient of third-order distortion (Wide angle end)

| Surface number | V |
|---|---|
| 1 | 0.8963 |
| 2 | −0.0884 |

| | |
|---|---|
| Unit: mm | |
| 3 | −0.0128 |
| 4 | 0.2409 |
| 5 | −0.0104 |
| 6 | −0.0332 |
| 7 | 0.0794 |
| 8 | −0.3488 |
| 9 | 0.1270 |
| 10 | 0.1646 |
| 11 | −0.1328 |
| 12 | −0.4952 |
| 13 | 0.0260 |
| 14 | −0.8156 |
| 15 | 0.1919 |
| 16 | −1.1958 |
| 17 | 0.9417 |
| 18 | 0.2032 |
| 19 | 0.4273 |
| 20 | −0.0039 |
| 21 | −0.0917 |
| 22 | −0.4869 |
| 23 | 0.9818 |
| 24 | −0.0303 |
| 25 | 0.0801 |
| 26 | −0.0063 |
| 27 | −0.1459 |
| 28 | 0.0761 |
| 29 | −0.1334 |
| 30 | 0.0000 |
| 31 | 0.1787 |
| 32 | −0.0851 |
| 33 | 0.0536 |
| 34 | 0.0011 |
| 35 | −0.8212 |
| 36 | 0.3014 |
| 37 | 0.1554 |
| 38 | −0.2295 |
| 39 | −0.0283 |
| 40 | 0.3857 |
| 41 | 0.0177 |

Numerical Embodiment 4

| | | | | | | |
|---|---|---|---|---|---|---|
| Unit: mm | | | | | | |
| Surface data | | | | | | |
| i-th surface | ri | di | ndi | νdi | θgFi | Effective diameter | Focal length |
| 1 | −204.79851 | 2.50000 | 1.696797 | 55.53 | 0.5433 | 62.091 | −115.366 |
| 2 | 133.93464 | 0.20000 | | | | 61.905 | |
| 3 | 91.69315 | 3.72815 | 2.102050 | 16.77 | 0.6721 | 62.534 | 355.261 |
| 4 | 116.67681 | 4.63519 | | | | 61.950 | |
| 5 | −3328.10384 | 2.50000 | 1.696797 | 55.53 | 0.5433 | 61.981 | −354.526 |
| 6 | 268.15995 | 2.00000 | | | | 62.278 | |
| 7 | 244.03004 | 8.40980 | 1.620411 | 60.29 | 0.5426 | 62.904 | 137.836 |
| 8 | −130.70000 | 3.00000 | 1.654115 | 39.70 | 0.5737 | 63.082 | −580.448 |
| 9 | −200.50000 | 17.84704 | | | | 63.428 | |
| 10 | 157.56595 | 2.85000 | 1.846660 | 23.78 | 0.6205 | 61.590 | −132.757 |
| 11 | 65.42970 | 0.59717 | | | | 59.994 | |
| 12 | 66.79239 | 11.66371 | 1.496999 | 81.54 | 0.5374 | 60.241 | 105.153 |
| 13 | −229.34107 | 0.19000 | | | | 60.162 | |
| 14 | 69.82956 | 9.08594 | 1.487490 | 70.23 | 0.5300 | 58.600 | 151.196 |
| 15 | 1197.68869 | 0.19000 | | | | 57.449 | |
| 16 | 84.53680 | 6.59855 | 1.620411 | 60.29 | 0.5426 | 55.734 | 178.009 |
| 17 | 345.20662 | (Variable) | | | | 54.273 | |
| 18 | 115.60141 | 1.42500 | 1.772499 | 49.60 | 0.5521 | 30.692 | −43.106 |
| 19 | 25.80886 | 6.09645 | | | | 28.296 | |
| 20 | −64.68927 | 1.33000 | 1.589130 | 61.14 | 0.5406 | 28.312 | −65.105 |
| 21 | 95.85406 | 1.14000 | | | | 29.108 | |
| 22 | 41.92068 | 6.12593 | 1.846660 | 23.78 | 0.6205 | 30.632 | 45.368 |
| 23 | −484.67721 | 2.52170 | | | | 30.324 | |
| 24 | −47.97539 | 1.23500 | 1.729157 | 54.68 | 0.5444 | 30.247 | −49.743 |

-continued

| | | | Unit: mm | | | | | |
|---|---|---|---|---|---|---|---|---|
| 25 | 152.99974 | (Variable) | | | | 30.877 | |
| 26 | 116.05829 | 5.58544 | 1.589130 | 61.14 | 0.5406 | 32.230 | 64.177 |
| 27 | −55.39353 | 0.12825 | | | | 32.523 | |
| 28 | 91.69957 | 8.25612 | 1.496999 | 81.54 | 0.5374 | 31.995 | 58.440 |
| 29 | −41.41239 | 1.33000 | 1.800999 | 34.97 | 0.5863 | 31.213 | −61.762 |
| 30 | −249.24669 | (Variable) | | | | 31.105 | |
| 31 (Stop) | ∞ | 2.91177 | | | | 29.303 | |
| 32 | 33.09875 | 7.50204 | 1.620411 | 60.29 | 0.5426 | 28.376 | 67.061 |
| 33 | 145.56585 | 9.56548 | | | | 26.187 | |
| 34 | −121.47875 | 3.89638 | 1.805181 | 25.42 | 0.6161 | 20.882 | 37.522 |
| 35 | −24.72443 | 1.50000 | 1.737999 | 32.26 | 0.5899 | 20.911 | −17.475 |
| 36 | 28.08335 | 8.73653 | | | | 20.782 | |
| 37 | −118.63157 | 6.43084 | 1.496999 | 81.54 | 0.5374 | 24.545 | 53.011 |
| 38 | −22.00000 | 0.74840 | | | | 25.901 | |
| 39 | −21.49045 | 1.50000 | 1.816000 | 46.62 | 0.5568 | 25.918 | −91.821 |
| 40 | −31.01771 | 8.02212 | | | | 27.619 | |
| 41 | 55.68313 | 4.88195 | 1.589130 | 61.14 | 0.5406 | 33.032 | 83.152 |
| 42 | −407.26788 | 45.96507 | | | | 33.040 | |
| Image plane | ∞ | | | | | | |

Various data
Zoom ratio 3.11

| | Wide angle | Intermediate | Telephoto |
|---|---|---|---|
| Focal length | 45.00 | 80.00 | 140.00 |
| F-number | 2.80 | 2.80 | 2.80 |
| Half angle of field | 19.06 | 11.00 | 6.34 |
| Image height | 15.55 | 15.55 | 15.55 |
| Entire lens length | 257.46 | 257.46 | 257.46 |
| BF | 45.97 | 45.97 | 45.97 |
| d17 | 1.50 | 23.19 | 32.54 |
| d25 | 31.63 | 20.74 | 2.38 |
| d30 | 11.50 | 0.69 | 9.7 |
| Incidence pupil position | 80.79 | 138.40 | 197.15 |
| Exit pupil position | −96.93 | −96.93 | −96.93 |
| Front principal point position | 111.62 | 173.62 | 199.98 |
| Rear principal point position | 0.97 | −34.04 | −94.03 |

Zoom lens unit data

| Unit | First surface | Focal length | Lens structure length | Front principal point position | Rear principal point position |
|---|---|---|---|---|---|
| 1 | 1 | 73.00 | 76.00 | 51.28 | 4.66 |
| 2 | 18 | −25.00 | 19.87 | 5.66 | −8.06 |
| 3 | 26 | 58.00 | 15.30 | 1.31 | −8.45 |
| 4 | 31 | 106.46 | 55.70 | 46.06 | −15.74 |

Moving amount of second sub-lens unit in focusing (provided that direction from object side to image side is positive)

| Unit | Infinity | Closest (1.0 m) |
|---|---|---|
| Second sub-lens unit | 0 | 16.35 |

Paraxial ray tracing value (Wide angle end)

| Surface number | α | H | α' | H' |
|---|---|---|---|---|
| 1 | 0.0000 | 1.0000 | −1.0000 | −1.7954 |
| 2 | −0.1538 | 1.0050 | −0.7239 | −1.7718 |
| 3 | −0.3901 | 1.0068 | −0.3074 | −1.7704 |
| 4 | 0.1620 | 1.0004 | −1.2782 | −1.7204 |
| 5 | −0.2691 | 1.0281 | −0.5368 | −1.6651 |
| 6 | −0.2788 | 1.0373 | −0.5210 | −1.6481 |
| 7 | −0.4007 | 1.0551 | −0.3275 | −1.6335 |
| 8 | −0.2795 | 1.0872 | −0.5151 | −1.5742 |
| 9 | 0.2926 | 1.0990 | −0.4961 | −1.5542 |
| 10 | −0.1303 | 1.1507 | −0.7256 | −1.2665 |
| 11 | 0.1507 | 1.1456 | −1.0349 | −1.2311 |
| 12 | −0.5230 | 1.1525 | −0.3109 | −1.2270 |
| 13 | −0.1360 | 1.1760 | −0.7229 | −1.1020 |
| 14 | −0.0209 | 1.1761 | −0.8307 | −1.0984 |

-continued

| | | Unit: mm | | |
|---|---|---|---|---|
| 15 | 0.3498 | 1.1287 | −1.1770 | −0.9389 |
| 16 | 0.3291 | 1.1273 | −1.1597 | −0.9340 |
| 17 | 0.7028 | 1.0638 | −1.4694 | −0.8012 |
| 18 | 0.6164 | 1.0432 | −1.4043 | −0.7544 |
| 19 | 0.9317 | 1.0266 | −1.6323 | −0.7253 |
| 20 | −0.4578 | 1.0886 | −0.6507 | −0.6371 |
| 21 | −0.9056 | 1.1055 | −0.3885 | −0.6299 |
| 22 | −1.2126 | 1.1362 | −0.2136 | −0.6245 |
| 23 | −0.1697 | 1.1486 | −0.7868 | −0.5668 |
| 24 | −0.0786 | 1.1530 | −0.8318 | −0.5202 |
| 25 | −0.8706 | 1.1668 | −0.4745 | −0.5126 |
| 26 | −1.1219 | 1.9554 | −0.3641 | −0.2567 |
| 27 | −0.6735 | 2.0079 | −0.4230 | −0.2237 |
| 28 | 0.2912 | 2.0071 | −0.5305 | −0.2222 |
| 29 | 0.7821 | 1.9113 | −0.5848 | −0.1506 |
| 30 | 0.1425 | 1.9090 | −0.5344 | −0.1419 |
| 31 | 0.4205 | 1.8015 | −0.5551 | 0.0000 |
| 32 | 0.4205 | 1.7743 | −0.5551 | 0.0359 |
| 33 | 1.9255 | 1.5763 | −0.5247 | 0.0898 |
| 34 | 1.6233 | 1.2303 | −0.5419 | 0.2053 |
| 35 | 1.2462 | 1.1675 | −0.6048 | 0.2358 |
| 36 | 1.3963 | 1.1490 | −0.5745 | 0.2434 |
| 37 | 0.0320 | 1.1435 | −0.8635 | 0.3934 |
| 38 | −0.1877 | 1.1637 | −0.9391 | 0.4943 |
| 39 | 0.9987 | 1.1497 | −0.4351 | 0.5005 |
| 40 | −0.9790 | 1.1621 | −1.2960 | 0.5169 |
| 41 | 0.4238 | 1.0726 | −0.6720 | 0.6587 |
| 42 | 0.9306 | 1.0098 | −0.3608 | 0.6831 |

| Aberration coefficient of third-order distortion (Wide angle end) | |
|---|---|
| Surface number | V |
| 1 | 1.2309 |
| 2 | 0.0658 |
| 3 | −0.2504 |
| 4 | 0.0403 |
| 5 | 0.1095 |
| 6 | −0.0062 |
| 7 | 0.0031 |
| 8 | 0.0221 |
| 9 | −0.5429 |
| 10 | 0.1254 |
| 11 | 0.2058 |
| 12 | −0.1452 |
| 13 | −0.5805 |
| 14 | 0.0339 |
| 15 | −0.9106 |
| 16 | 0.4242 |
| 17 | −1.5735 |
| 18 | 1.2840 |
| 19 | 0.2877 |
| 20 | 0.4676 |
| 21 | 0.0086 |
| 22 | −0.1447 |
| 23 | −0.5205 |
| 24 | 1.0808 |
| 25 | −0.0245 |
| 26 | 0.0368 |
| 27 | −0.3221 |
| 28 | 0.1115 |
| 29 | 0.1119 |
| 30 | −0.2453 |
| 31 | 0.0000 |
| 32 | 0.2190 |
| 33 | −0.1692 |
| 34 | 0.1111 |
| 35 | 0.0016 |
| 36 | −1.0078 |
| 37 | 0.2939 |
| 38 | 0.1873 |
| 39 | −0.2717 |
| 40 | 0.0279 |

-continued

| | Unit: mm | |
|---|---|---|
| 41 | | 0.5813 |
| 42 | | −0.0164 |

Numerical Embodiment 5

| | | Unit: mm | | | | | |
|---|---|---|---|---|---|---|---|
| | | | Surface data | | | | |
| i-th surface | ri | di | ndi | vdi | θgFi | Effective diameter | Focal length |
| 1 | 295.01268 | 2.66000 | 1.772499 | 49.60 | 0.5521 | 72.176 | −91.878 |
| 2 | | 57.20621 | 16.51744 | | | 65.371 | |
| 3 | −126.03429 | 2.37500 | 1.589130 | 61.14 | 0.5406 | 65.361 | −256.308 |
| 4 | −752.89141 | 1.04955 | | | | 66.519 | |
| 5 | 92.29299 | 4.75000 | 1.922860 | 18.90 | 0.6495 | 69.140 | 234.329 |
| 6 | 155.58877 | 3.80686 | | | | 68.901 | |
| 7 | 344.35398 | 2.28000 | 1.805181 | 25.42 | 0.6161 | 69.233 | −245.887 |
| 8 | 126.07007 | 14.08461 | 1.589130 | 61.14 | 0.5406 | 69.331 | 104.438 |
| 9 | −116.07149 | 18.59321 | | | | 69.722 | |
| 10 | 99.01089 | 2.18500 | 1.805181 | 25.42 | 0.6161 | 63.476 | −159.575 |
| 11 | 55.58844 | 16.67748 | 1.496999 | 81.54 | 0.5374 | 61.426 | 88.788 |
| 12 | −195.44112 | 0.19000 | | | | 60.748 | |
| 13 | 66.75712 | 8.88535 | 1.595220 | 67.74 | 0.5442 | 57.417 | 122.045 |
| 14 | 752.89620 | (Variable) | | | | 55.734 | |
| 15 | 98.72346 | 1.23500 | 1.816000 | 46.62 | 0.5568 | 25.757 | −53.696 |
| 16 | 30.28261 | 4.84874 | | | | 23.508 | |
| 17 | −55.04852 | 1.14000 | 1.589130 | 61.14 | 0.5406 | 22.470 | −31.974 |
| 18 | 29.02742 | 4.45572 | 1.808095 | 22.76 | 0.6307 | 21.197 | 37.017 |
| 19 | 683.54291 | 1.82601 | | | | 20.577 | |
| 20 | −43.07889 | 1.23500 | 1.772499 | 49.60 | 0.5521 | 20.518 | −53.747 |
| 21* | 1337.73630 | (Variable) | | | | 20.895 | |
| 22 | 66.18922 | 1.23500 | 1.834000 | 37.16 | 0.5775 | 21.741 | −88.269 |
| 23 | 34.65998 | 3.06641 | 1.487490 | 70.23 | 0.5300 | 21.745 | 58.382 |
| 24 | −157.47489 | 0.19000 | | | | 21.895 | |
| 25 | 90.68628 | 1.90796 | 1.589130 | 61.14 | 0.5406 | 22.109 | 112.137 |
| 26 | −244.91474 | (Variable) | | | | 22.124 | |
| 27 (Stop) | ∞ | 1.49938 | | | | 21.531 | |
| 28 | 31.00767 | 1.42500 | 1.755199 | 27.51 | 0.6103 | 21.431 | −75.913 |
| 29 | 19.78262 | 3.46411 | 1.592010 | 67.02 | 0.5357 | 20.634 | 42.707 |
| 30 | 83.92386 | 14.71759 | | | | 20.349 | |
| 31 | 48.39285 | 3.81455 | 1.761821 | 26.52 | 0.6135 | 18.560 | 20.996 |
| 32 | −23.38220 | 1.20000 | 1.749505 | 35.33 | 0.5818 | 18.490 | −15.573 |
| 33 | 24.14287 | 15.00026 | | | | 18.114 | |
| 34 | 37.69649 | 7.47218 | 1.496999 | 81.54 | 0.5374 | 26.161 | 35.644 |
| 35 | −31.38922 | 4.19375 | | | | 26.323 | |
| 36 | −28.03877 | 1.20000 | 1.903660 | 31.32 | 0.5946 | 24.753 | −61.931 |
| 37 | −56.90913 | 46.04769 | | | | 25.488 | |
| Image plane | ∞ | | | | | | |

Aspherical surface data
Twenty-first surface

K = 6.47521e+003   A4 = 7.28288e−007   A6 = 1.43818e−009   A8 = −1.89454e−011
A10 = −7.91776e−014   A12 = 9.52326e−016

| Various data Zoom ratio 5.00 | | | |
|---|---|---|---|
| | Wide angle | Intermediate | Telephoto |
| Focal length | 30.00 | 70.00 | 150.00 |
| F-number | 4.00 | 4.00 | 4.00 |
| Half angle of field | 27.40 | 12.52 | 5.92 |
| Image height | 15.55 | 15.55 | 15.55 |
| Entire lens length | 274.98 | 274.98 | 274.98 |
| BF | 46.05 | 46.05 | 46.05 |
| d14 | 1.50 | 32.58 | 44.16 |
| d21 | 38.25 | 25.71 | 1.50 |
| d26 | 20.00 | 1.47 | 14.09 |
| Incidence pupil position | 66.66 | 129.34 | 198.76 |
| Exit pupil position | −57.05 | −57.05 | −57.05 |

-continued

| Unit: mm | | | |
|---|---|---|---|
| Front principal point position | 87.93 | 151.81 | 130.52 |
| Rear principal point position | 16.05 | −23.95 | −103.95 |

Zoom lens unit data

| Unit | First surface | Focal length | Lens structure length | Front principal point position | Rear principal point position |
|---|---|---|---|---|---|
| 1 | 1 | 63.20 | 94.05 | 61.05 | 18.81 |
| 2 | 15 | −22.00 | 14.74 | 5.31 | −5.12 |
| 3 | 22 | 69.00 | 6.40 | 2.13 | −2.05 |
| 4 | 27 | 95.06 | 53.99 | 16.56 | −37.00 |

Moving amount of second sub-lens unit in focusing
(provided that direction from object side to image side is positive)

| Unit | Infinity | Closest (0.8 m) |
|---|---|---|
| Second sub-lens unit | 0 | 15.70 |

Paraxial ray tracing value (Wide angle end)

| Surface number | α | H | α' | H' |
|---|---|---|---|---|
| 1 | 0.0000 | 1.0000 | −1.0000 | −2.2221 |
| 2 | 0.0789 | 0.9961 | −1.1754 | −2.1634 |
| 3 | −0.3265 | 1.1758 | −0.2948 | −2.0012 |
| 4 | −0.4921 | 1.2003 | −0.0130 | −2.0005 |
| 5 | −0.4638 | 1.2165 | −0.0602 | −1.9984 |
| 6 | −0.0943 | 1.2243 | −0.6671 | −1.9438 |
| 7 | −0.3149 | 1.2642 | −0.3169 | −1.9036 |
| 8 | −0.2254 | 1.2737 | −0.4517 | −1.8847 |
| 9 | −0.2924 | 1.3599 | −0.3525 | −1.7807 |
| 10 | −0.0845 | 1.4123 | −0.6247 | −1.3935 |
| 11 | 0.2632 | 1.4017 | −0.9678 | −1.3546 |
| 12 | 0.0256 | 1.3923 | −0.7381 | −1.0808 |
| 13 | 0.1321 | 1.3914 | −0.8208 | −1.0756 |
| 14 | 0.5056 | 1.2977 | −1.1095 | −0.8699 |
| 15 | 0.4747 | 1.2739 | −1.0888 | −0.8154 |
| 16 | 0.7922 | 1.2560 | −1.2920 | −0.7862 |
| 17 | −0.2283 | 1.2929 | −0.6533 | −0.6806 |
| 18 | −0.6451 | 1.3083 | −0.4339 | −0.6702 |
| 19 | −0.3408 | 1.3362 | −0.5898 | −0.6220 |
| 20 | −0.3887 | 1.3598 | −0.5675 | −0.5875 |
| 21 | −1.1237 | 1.3859 | −0.2499 | −0.5817 |
| 22 | −1.1479 | 2.8495 | −0.2398 | −0.2759 |
| 23 | −0.0639 | 2.8509 | −0.3448 | −0.2682 |
| 24 | −0.9280 | 2.9146 | −0.2635 | −0.2501 |
| 25 | −0.6564 | 2.9188 | −0.2868 | −0.2483 |
| 26 | −0.0853 | 2.9222 | −0.3354 | −0.2349 |
| 27 | 0.1264 | 2.8379 | −0.3524 | 0.0000 |
| 28 | 0.1264 | 2.8307 | −0.3524 | 0.0203 |
| 29 | 1.8131 | 2.7793 | −0.3403 | 0.0299 |
| 30 | 1.4710 | 2.6097 | −0.3440 | 0.0696 |
| 31 | 1.1089 | 2.0553 | −0.3536 | 0.2464 |
| 32 | 1.7847 | 1.9055 | −0.2726 | 0.2693 |
| 33 | 1.9046 | 1.8636 | −0.2557 | 0.2749 |
| 34 | 0.1713 | 1.7937 | −0.5113 | 0.4835 |
| 35 | 0.9704 | 1.5452 | −0.2959 | 0.5593 |
| 36 | 1.9732 | 1.5388 | 0.0671 | 0.5591 |
| 37 | 0.2913 | 1.5338 | −0.5440 | 0.5685 |

Aberration coefficient of third-order distortion
(Wide angle end)

| Surface number | V |
|---|---|
| 1 | 0.4523 |
| 2 | 0.4710 |
| 3 | 0.0660 |
| 4 | 0.0029 |
| 5 | −0.2349 |
| 6 | 0.0099 |

-continued

| Unit: mm | |
|---|---|
| 7 | 0.0164 |
| 8 | 0.0121 |
| 9 | −0.5915 |
| 10 | 0.0574 |
| 11 | 0.0241 |
| 12 | −0.6125 |
| 13 | 0.1221 |
| 14 | −0.9567 |
| 15 | 0.7236 |
| 16 | 0.0389 |
| 17 | 0.5124 |
| 18 | −0.0404 |
| 19 | −0.1582 |
| 20 | 0.4586 |
| 21 | 0.0360 |
| 22 | 0.0117 |
| 23 | 0.0021 |
| 24 | 0.0495 |
| 25 | 0.0251 |
| 26 | −0.0893 |
| 27 | 0.0000 |
| 28 | 0.0871 |
| 29 | −0.0062 |
| 30 | −0.0758 |
| 31 | 0.0944 |
| 32 | 0.0028 |
| 33 | −0.4636 |
| 34 | 0.4764 |
| 35 | 0.4001 |
| 36 | −0.4859 |
| 37 | 0.0043 |

Numerical Embodiment 6

| Unit: mm | | | | | | | |
|---|---|---|---|---|---|---|---|
| Surface data | | | | | | | |
| i-th surface | ri | di | ndi | vdi | θgFi | Effective diameter | Focal length |
| 1 | 4223.62978 | 2.50000 | 1.696797 | 55.53 | 0.5433 | 61.571 | −86.684 |
| 2 | | 59.78700 | 10.22649 | | | 56.665 | |
| 3 | −146.88609 | 2.20000 | 1.696797 | 55.53 | 0.5433 | 56.615 | −244.586 |
| 4 | −1042.17543 | 6.91855 | | | | 56.954 | |
| 5 | 93.47373 | 5.17118 | 1.808095 | 22.76 | 0.6307 | 62.443 | 280.417 |
| 6 | 154.04313 | 2.50000 | | | | 62.354 | |
| 7 | 222.07620 | 8.59235 | 1.487490 | 70.23 | 0.5300 | 62.803 | 169.972 |
| 8 | −131.20537 | 16.57309 | | | | 63.049 | |
| 9 | 111.48673 | 2.85000 | 1.805181 | 25.42 | 0.6161 | 60.674 | −136.130 |
| 10 | 54.89059 | 13.36539 | 1.496999 | 81.54 | 0.5374 | 58.518 | 85.836 |
| 11 | −178.29679 | 0.19000 | | | | 58.228 | |
| 12 | 72.85828 | 8.19012 | 1.595220 | 67.74 | 0.5442 | 55.439 | 128.730 |
| 13 | 1330.23098 | (Variable) | | | | 53.890 | |
| 14 | 39.06758 | 1.42500 | 1.772499 | 49.60 | 0.5521 | 28.548 | −77.609 |
| 15 | 23.32081 | 5.36255 | | | | 26.000 | |
| 16 | −77.14879 | 1.33000 | 1.589130 | 61.14 | 0.5406 | 25.973 | −67.116 |
| 17 | 82.28676 | 1.14000 | | | | 26.222 | |
| 18 | 33.53582 | 4.01958 | 1.846660 | 23.78 | 0.6205 | 27.145 | 56.613 |
| 19 | 103.13541 | 2.89438 | | | | 26.656 | |
| 20 | −52.21673 | 1.23500 | 1.589130 | 61.14 | 0.5406 | 26.586 | −50.763 |
| 21 | 71.25518 | (Variable) | | | | 26.820 | |
| 22 | 146.90596 | 3.99420 | 1.589130 | 61.14 | 0.5406 | 27.183 | 80.980 |
| 23 | −70.34347 | 0.12825 | | | | 27.448 | |
| 24 | −562.62295 | 4.30225 | 1.496999 | 81.54 | 0.5374 | 27.415 | 84.489 |
| 25 | −39.28096 | 1.33000 | 1.834000 | 37.16 | 0.5775 | 27.413 | −83.883 |
| 26 | −90.22950 | (Variable) | | | | 27.784 | |
| 27 (Stop) | ∞ | 1.00000 | | | | 27.617 | |
| 28 | 34.58038 | 4.67355 | 1.618000 | 63.33 | 0.5441 | 27.579 | 59.758 |
| 29 | 488.38014 | 13.55541 | | | | 26.918 | |
| 30 | −77.11980 | 2.59571 | 2.102050 | 16.77 | 0.6721 | 20.604 | 107.591 |
| 31 | −47.81605 | 1.50000 | 1.728250 | 28.46 | 0.6077 | 20.917 | −28.866 |
| 32 | 38.57836 | 13.79597 | | | | 21.253 | |

-continued

| Unit: mm | | | | | | | |
|---|---|---|---|---|---|---|---|
| 33 | 120.06049 | 5.73515 | 1.592400 | 68.30 | 0.5456 | 29.338 | 52.370 |
| 34 | −41.28142 | 5.68368 | | | | 29.894 | |
| 35 | −28.86122 | 1.50000 | 1.903660 | 31.32 | 0.5946 | 29.814 | −106.338 |
| 36 | −42.13698 | 0.20000 | | | | 31.248 | |
| 37 | 60.30831 | 6.34934 | 1.589130 | 61.14 | 0.5406 | 33.009 | 98.013 |
| 38 | −1435.31250 | 43.99960 | | | | 32.940 | |
| Image plane | ∞ | | | | | | |

Various data
Zoom ratio 2.86

| | Wide angle | Intermediate | Telephoto |
|---|---|---|---|
| Focal length | 35.00 | 60.00 | 100.00 |
| F-number | 2.80 | 2.80 | 2.80 |
| Half angle of field | 23.95 | 14.53 | 8.84 |
| Image height | 15.55 | 15.55 | 15.55 |
| Entire lens length | 256.34 | 256.34 | 256.34 |
| BF | 44.00 | 44.00 | 44.00 |
| d13 | 1.90 | 27.21 | 41.12 |
| d21 | 31.71 | 20.00 | 1.50 |
| d26 | 15.70 | 2.10 | 6.69 |
| Incidence pupil position | 64.70 | 97.79 | 127.01 |
| Exit pupil position | −93.92 | −93.92 | −93.92 |
| Front principal point position | 90.82 | 131.68 | 154.51 |
| Rear principal point position | 9.00 | −16.00 | −56.00 |

Zoom lens unit data

| Unit | First surface | Focal length | Lens structure length | Front principal point position | Rear principal point position |
|---|---|---|---|---|---|
| 1 | 1 | 75.40 | 79.28 | 59.32 | 26.22 |
| 2 | 14 | −31.20 | 17.41 | 8.32 | −4.68 |
| 3 | 22 | 83.00 | 9.75 | 2.41 | −3.90 |
| 4 | 27 | 77.99 | 56.59 | 34.72 | −31.32 |

Moving amount of second sub-lens unit in focusing
(provided that direction from object side to image side is positive)

| Unit | Infinity | Closest (0.7 m) |
|---|---|---|
| Second sub-lens unit | 0 | 15.07 |

Paraxial ray tracing value (Wide angle end)

| Surface number | α | H | α' | H' |
|---|---|---|---|---|
| 1 | 0.0000 | 1.0000 | −1.0000 | −1.8486 |
| 2 | 0.0058 | 0.9998 | −1.0107 | −1.8062 |
| 3 | −0.4038 | 1.1177 | −0.2708 | −1.7270 |
| 4 | −0.5901 | 1.1396 | 0.0172 | −1.7277 |
| 5 | −0.5634 | 1.2509 | −0.0234 | −1.7230 |
| 6 | −0.1810 | 1.2656 | −0.5502 | −1.6783 |
| 7 | −0.4157 | 1.2953 | −0.2388 | −1.6612 |
| 8 | −0.3159 | 1.3474 | −0.3669 | −1.6007 |
| 9 | −0.1401 | 1.4137 | −0.5758 | −1.3281 |
| 10 | 0.2206 | 1.4038 | −0.9146 | −1.2870 |
| 11 | −0.0606 | 1.4193 | −0.6568 | −1.1196 |
| 12 | 0.0782 | 1.4188 | −0.7663 | −1.1155 |
| 13 | 0.4854 | 1.3477 | −1.0864 | −0.9563 |
| 14 | 0.4642 | 1.3225 | −1.0714 | −0.8981 |
| 15 | 1.3838 | 1.2908 | −1.6959 | −0.8592 |
| 16 | −0.1198 | 1.3091 | −0.6950 | −0.7527 |
| 17 | −0.4711 | 1.3204 | −0.4930 | −0.7409 |
| 18 | −0.8032 | 1.3465 | −0.3066 | −0.7310 |
| 19 | 0.3984 | 1.3219 | −0.9589 | −0.6716 |
| 20 | 0.0148 | 1.3206 | −0.7640 | −0.6084 |
| 21 | −0.5087 | 1.3319 | −0.5228 | −0.5968 |
| 22 | −0.8957 | 2.1433 | −0.3495 | −0.2802 |
| 23 | −0.5936 | 2.1859 | −0.3890 | −0.2523 |
| 24 | 0.0496 | 2.1857 | −0.4632 | −0.2506 |
| 25 | −0.0182 | 2.1872 | −0.4554 | −0.2133 |
| 26 | −0.6825 | 2.2013 | −0.3907 | −0.2052 |

-continued

| | | Unit: mm | | |
|---|---|---|---|---|
| 27 | 0.0342 | 2.1859 | −0.4575 | 0.0000 |
| 28 | 0.0342 | 2.1839 | −0.4575 | 0.0280 |
| 29 | 1.5239 | 1.9668 | −0.4384 | 0.0904 |
| 30 | 1.5076 | 1.5374 | −0.4391 | 0.2155 |
| 31 | 0.8932 | 1.4932 | −0.5253 | 0.2415 |
| 32 | 1.0009 | 1.4762 | −0.5078 | 0.2501 |
| 33 | −0.1397 | 1.5161 | −0.7011 | 0.4504 |
| 34 | 0.0123 | 1.5143 | −0.6559 | 0.5485 |
| 35 | 1.1634 | 1.4347 | −0.2390 | 0.5648 |
| 36 | −0.5436 | 1.4435 | −0.9110 | 0.5795 |
| 37 | 0.5047 | 1.3714 | −0.4902 | 0.6495 |
| 38 | 1.0796 | 1.2859 | −0.2178 | 0.6668 |

Aberration coefficient of third-order distortion
(Wide angle end)

| Surface number | V |
|---|---|
| 1 | 0.6366 |
| 2 | 0.3913 |
| 3 | 0.0284 |
| 4 | 0.0017 |
| 5 | −0.2496 |
| 6 | 0.0226 |
| 7 | −0.0019 |
| 8 | −0.4153 |
| 9 | 0.0403 |
| 10 | 0.0479 |
| 11 | −0.5818 |
| 12 | 0.0718 |
| 13 | −0.9622 |
| 14 | 0.1441 |
| 15 | 0.2632 |
| 16 | 0.5721 |
| 17 | 0.0010 |
| 18 | −0.1526 |
| 19 | −0.2407 |
| 20 | 0.8336 |
| 21 | −0.0067 |
| 22 | 0.0406 |
| 23 | −0.2071 |
| 24 | 0.1280 |
| 25 | 0.0873 |
| 26 | −0.1976 |
| 27 | 0.0000 |
| 28 | 0.1457 |
| 29 | −0.1038 |
| 30 | 0.0637 |
| 31 | −0.0006 |
| 32 | −0.6216 |
| 33 | 0.3841 |
| 34 | 0.1256 |
| 35 | −0.2189 |
| 36 | 0.0025 |
| 37 | 0.3382 |
| 38 | −0.0156 |

Numerical Embodiment 7

| | | Unit: mm | | | | | |
|---|---|---|---|---|---|---|---|
| | | Surface data | | | | | |
| i-th surface | ri | di | ndi | vdi | θgFi | Effective diameter | Focal length |
| 1* | 98.70007 | 2.50000 | 1.772499 | 49.60 | 0.5521 | 75.668 | −55.418 |
| 2 | 29.62727 | 16.26062 | | | | 55.309 | |
| 3 | 64.42910 | 2.00000 | 1.772499 | 49.60 | 0.5521 | 52.747 | −87.740 |
| 4 | 32.65886 | 18.07660 | | | | 47.083 | |
| 5 | −52.68987 | 2.00000 | 1.589130 | 61.14 | 0.5406 | 46.718 | −111.047 |
| 6 | −270.22920 | 1.49474 | | | | 49.520 | |

-continued

| Unit: mm | | | | | | | |
|---|---|---|---|---|---|---|---|
| 7 | 76.48550 | 5.60617 | 1.922860 | 18.90 | 0.6495 | 55.360 | 117.496 |
| 8 | 243.28386 | 4.02023 | | | | 55.283 | |
| 9 | 4668.02554 | 8.22678 | 1.487490 | 70.23 | 0.5300 | 55.637 | 134.050 |
| 10 | −66.46589 | 5.36022 | | | | 55.818 | |
| 11 | −622.14337 | 2.00000 | 1.846660 | 23.78 | 0.6205 | 52.313 | −51.330 |
| 12 | 47.28994 | 12.39326 | 1.487490 | 70.23 | 0.5300 | 51.310 | 71.424 |
| 13 | −122.23105 | 0.15000 | | | | 51.721 | |
| 14 | 118.96805 | 11.02578 | 1.496999 | 81.54 | 0.5374 | 52.223 | 80.349 |
| 15 | −58.51414 | 0.15000 | | | | 52.037 | |
| 16 | 46.98238 | 4.59503 | 1.772499 | 49.60 | 0.5521 | 43.725 | 99.532 |
| 17 | 114.76830 | (Variable) | | | | 42.814 | |
| 18 | 10396.90306 | 1.20000 | 1.754998 | 52.32 | 0.5476 | 27.090 | −33.265 |
| 19 | 25.16697 | 4.86194 | | | | 23.972 | |
| 20 | −153.43950 | 1.20000 | 1.496999 | 81.54 | 0.5374 | 23.390 | −43.659 |
| 21 | 25.42462 | 5.07329 | 1.784696 | 26.29 | 0.6135 | 24.170 | 31.942 |
| 22 | −4324.64113 | 3.34835 | | | | 24.087 | |
| 23 | −39.81518 | 1.20000 | 1.834000 | 37.16 | 0.5775 | 23.967 | −59.807 |
| 24 | −195.14536 | (Variable) | | | | 24.612 | |
| 25 | 142.25721 | 2.95792 | 1.729157 | 54.68 | 0.5444 | 25.745 | 79.349 |
| 26 | −97.37703 | 0.20000 | | | | 25.921 | |
| 27 | 60.75670 | 5.04520 | 1.496999 | 81.54 | 0.5374 | 25.935 | 49.403 |
| 28 | −40.26471 | 1.40000 | 1.834000 | 37.16 | 0.5775 | 25.718 | −67.044 |
| 29 | −143.79570 | (Variable) | | | | 25.753 | |
| 30 (Stop) | ∞ | 1.39957 | | | | 24.312 | |
| 31 | 85.08699 | 4.36998 | 1.761821 | 26.52 | 0.6135 | 24.020 | 33.919 |
| 32 | −36.74762 | 1.50000 | 1.720467 | 34.70 | 0.5834 | 23.714 | −32.337 |
| 33 | 65.96749 | 10.69231 | | | | 22.734 | |
| 34 | 112.13875 | 1.50000 | 1.834000 | 37.16 | 0.5775 | 21.437 | −79.706 |
| 35 | 41.64594 | 5.81919 | 1.496999 | 81.54 | 0.5374 | 21.070 | 46.821 |
| 36 | −50.62143 | 7.77569 | | | | 20.819 | |
| 37 | 36.34485 | 5.68860 | 1.496999 | 81.54 | 0.5374 | 22.099 | 35.111 |
| 38 | −31.99802 | 1.50000 | 1.834000 | 37.16 | 0.5775 | 21.977 | −19.605 |
| 39 | 34.59932 | 5.00023 | | | | 22.435 | |
| 40 | 40.76716 | 6.64810 | 1.487490 | 70.23 | 0.5300 | 27.106 | 44.425 |
| 41 | −44.04308 | 0.00000 | | | | 27.669 | |
| Image plane | ∞ | | | | | | |

Aspherical surface data
First surface

K = 0.00000e+000  A4 = 2.23037e−006  A6 = −6.41540e−010  A8 = 4.30245e−013
A10 = −1.45017e−016  A12 = 3.57965e−020

Various data
Zoom ratio 2.86

| | Wide angle | Intermediate | Telephoto |
|---|---|---|---|
| Focal length | 14.00 | 21.00 | 40.00 |
| F-number | 2.79 | 2.79 | 2.80 |
| Half angle of field | 48.00 | 36.52 | 21.24 |
| Image height | 15.55 | 15.55 | 15.55 |
| Entire lens length | 255.05 | 255.05 | 255.05 |
| BF | 40.00 | 40.00 | 40.00 |
| d17 | 2.31 | 16.93 | 27.94 |
| d24 | 29.18 | 21.91 | 2.34 |
| d29 | 9.32 | 1.97 | 10.53 |
| d41 | 40.00 | 40.00 | 40.00 |
| Incidence pupil position | 33.57 | 38.48 | 46.11 |
| Exit pupil position | −70.63 | −70.63 | −70.63 |
| Front principal point position | 45.80 | 55.49 | 71.65 |
| Rear principal point position | 26.00 | 19.00 | 0.00 |

Zoom lens unit data

| Unit | First surface | Focal length | Lens structure length | Front principal point position | Rear principal point position |
|---|---|---|---|---|---|
| 1 | 1 | 25.00 | 95.86 | 45.18 | 44.95 |
| 2 | 18 | −24.00 | 16.88 | 4.02 | −7.88 |
| 3 | 25 | 54.82 | 9.60 | 1.06 | −4.98 |
| 4 | 30 | 83.91 | 51.89 | 34.16 | −13.01 |

-continued

| Unit: mm | | |
|---|---|---|
| Moving amount of second sub-lens unit in focusing (provided that direction from object side to image side is positive) | | |
| Unit | Infinity | Closest (0.7 m) |
| Second sub-lens unit | 0 | 2.36 |

| Paraxial ray tracing value (Wide angle end) | | | | |
|---|---|---|---|---|
| Surface number | α | H | α' | H' |
| 1 | 0.0000 | 1.0000 | −1.0000 | −2.3981 |
| 2 | 0.1101 | 0.9889 | −1.2640 | −2.2710 |
| 3 | −0.2526 | 1.2824 | −0.4311 | −1.7703 |
| 4 | −0.0363 | 1.2853 | −0.7296 | −1.7117 |
| 5 | −0.4640 | 1.8844 | −0.1601 | −1.5049 |
| 6 | −0.7601 | 1.9526 | 0.0764 | −1.5118 |
| 7 | −0.7003 | 2.0274 | 0.0301 | −1.5150 |
| 8 | −0.3536 | 2.1006 | −0.2290 | −1.4676 |
| 9 | −0.4665 | 2.2346 | −0.1501 | −1.4245 |
| 10 | −0.4632 | 2.4174 | −0.1522 | −1.3644 |
| 11 | −0.2142 | 2.4994 | −0.2928 | −1.2523 |
| 12 | −0.2623 | 2.5196 | −0.2687 | −1.2316 |
| 13 | −0.5352 | 2.8377 | −0.1353 | −1.1512 |
| 14 | −0.3762 | 2.8417 | −0.1998 | −1.1491 |
| 15 | −0.2095 | 2.9519 | −0.2672 | −1.0086 |
| 16 | 0.1425 | 2.9503 | −0.3875 | −1.0045 |
| 17 | 0.8249 | 2.7979 | −0.6198 | −0.8900 |
| 18 | 0.5600 | 2.7054 | −0.5355 | −0.8015 |
| 19 | 0.5628 | 2.6780 | −0.5364 | −0.7754 |
| 20 | −0.5671 | 2.8749 | −0.2092 | −0.7027 |
| 21 | −0.6979 | 2.9149 | −0.1773 | −0.6926 |
| 22 | −0.2271 | 2.9608 | −0.2891 | −0.6341 |
| 23 | −0.2195 | 3.0133 | −0.2907 | −0.5646 |
| 24 | −1.1088 | 3.0650 | −0.1241 | −0.5588 |
| 25 | −0.9243 | 4.9913 | −0.1578 | −0.2300 |
| 26 | −0.5646 | 5.0602 | −0.1743 | −0.2088 |
| 27 | −0.0318 | 5.0606 | −0.1963 | −0.2060 |
| 28 | 0.5495 | 4.9285 | −0.2200 | −0.1531 |
| 29 | −0.0347 | 4.9304 | −0.2018 | −0.1421 |
| 30 | 0.3682 | 4.6852 | −0.2134 | 0.0000 |
| 31 | 0.3682 | 4.6484 | −0.2134 | 0.0213 |
| 32 | 0.9561 | 4.4797 | −0.2107 | 0.0585 |
| 33 | 1.0298 | 4.4157 | −0.2098 | 0.0716 |
| 34 | 0.3500 | 4.1484 | −0.2208 | 0.2402 |
| 35 | 0.7847 | 4.1027 | −0.1956 | 0.2516 |
| 36 | 0.3146 | 4.0154 | −0.2245 | 0.3138 |
| 37 | 0.8682 | 3.5332 | −0.1812 | 0.4145 |
| 38 | 1.5465 | 3.1138 | −0.1016 | 0.4420 |
| 39 | 1.0822 | 3.0508 | −0.1675 | 0.4518 |
| 40 | 0.0460 | 3.0344 | −0.3210 | 0.5664 |
| 41 | 0.5558 | 2.8571 | −0.2258 | 0.6384 |

| Aberration coefficient of third-order distortion (Wide angle end) | |
|---|---|
| Surface number | V |
| 1 | −0.1651 |
| 2 | 0.2887 |
| 3 | 0.0083 |
| 4 | 0.2140 |
| 5 | 0.0292 |
| 6 | 0.0014 |
| 7 | −0.0587 |
| 8 | −0.0035 |
| 9 | 0.0041 |
| 10 | −0.1276 |
| 11 | 0.0511 |
| 12 | 0.0268 |
| 13 | −0.0289 |
| 14 | 0.0039 |
| 15 | −0.2629 |

-continued

| Unit: mm | |
|---|---|
| 16 | 0.0159 |
| 17 | −0.1932 |
| 18 | 0.2801 |
| 19 | 0.0366 |
| 20 | 0.0222 |
| 21 | −0.0215 |
| 22 | −0.0507 |
| 23 | 0.1389 |
| 24 | −0.0109 |
| 25 | 0.0104 |
| 26 | −0.0330 |
| 27 | 0.0134 |
| 28 | 0.0150 |
| 29 | −0.0377 |
| 30 | 0.0000 |
| 31 | 0.0316 |
| 32 | −0.0005 |
| 33 | −0.0355 |
| 34 | 0.0391 |
| 35 | −0.0176 |
| 36 | −0.0056 |
| 37 | 0.0377 |
| 38 | −0.0050 |
| 39 | −0.1681 |
| 40 | 0.1437 |
| 41 | 0.0047 |

TABLE 1

Values corresponding to the conditional expressions of the embodiments

| Conditional Expression | Numerical Embodiment | | | | | | |
|---|---|---|---|---|---|---|---|
| | 1 | 2 | 3 | 4 | 5 | 6 | 7 |
| (1) f1/f2 | −1.94 | −2.16 | −2.72 | −2.92 | −2.87 | −2.42 | −1.04 |
| (2) f2/f3 | −0.36 | −0.30 | −0.34 | −0.43 | −0.32 | −0.38 | −0.46 |
| (3) 1/β3w | −0.05 | 0.08 | −0.08 | −0.37 | −0.11 | −0.04 | −0.40 |
| (4) f12/f11 | −2.07 | −2.05 | −1.93 | −1.62 | −1.85 | −2.02 | −4.38 |
| (5) f13/f1 | 1.39 | 1.29 | 0.96 | 0.98 | 1.22 | 1.11 | 2.02 |
| (6) ν11n − ν11p | 31.87 | 20.67 | 30.83 | 38.76 | 36.47 | 32.77 | 34.55 |
| (7) (R1 + R2)/(R1 − R2) | 2.14 | 1.19 | 0.79 | 0.21 | 1.48 | 1.03 | 1.86 |
| (8) (θ13p − θ13n)/(ν13p − ν13n) | −1.82 × 10⁻³ | −2.15 × 10⁻³ | −9.71 × 10⁻⁴ | −1.79 × 10⁻³ | −1.53 × 10⁻³ | −1.53 × 10⁻³ | −1.86 × 10⁻³ |
| (9) (θ2p − θ2n)/(ν2p − ν2n) | −1.76 × 10⁻³ | −3.23 × 10⁻³ | −2.39 × 10⁻³ | −2.39 × 10⁻³ | −2.72 × 10⁻³ | −2.27 × 10⁻³ | −1.93 × 10⁻³ |
| (10) f11p/f11 | −2.50 | −1.64 | — | — | −2.46 | −3.33 | −4.28 |
| (11) f11n/f11 | 0.64 | 0.55 | — | — | 0.68 | 0.74 | 0.69 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-092305, filed Apr. 13, 2012, which is hereby incorporated by reference herein in its entirety.

What is claimed is:

1. A zoom lens comprising in order from an object side:
   a first lens unit having a positive refractive power which does not move for varying magnification;
   a second lens unit having a negative refractive power which moves during varying magnification;
   a third lens unit having a positive refractive power which moves during varying magnification; and
   a fourth lens unit having a positive refractive power which does not move for varying magnification,
   wherein the third lens unit moves toward an image side and then toward the object side when varying magnification from a wide angle end to a telephoto end, and
   wherein the following relationships are satisfied:

$$-3.2 < f1/f2 < -1.0;$$

$$-0.55 < f2/f3 < -0.20; \text{ and}$$

$$-0.7 < 1/\beta 3w < 0.5,$$

where f1 is a focal length of the first lens unit, f2 is a focal length of the second lens unit, f3 is a focal length of the third lens unit, and β3w is a lateral magnification of the third lens unit at the wide angle end when a ray enters from infinity.

2. A zoom lens according to claim 1, wherein the first lens unit includes:
   a first sub-lens unit having a negative refractive power which does not move for focusing;

a second sub-lens unit having a positive refractive power which moves toward the image side when focusing from the infinity side to a proximity side; and a third sub-lens unit having a positive refractive power which does not move for focusing.

3. A zoom lens according to claim 2, wherein the following relationships are satisfied:

$$-2.3 < f12/f11 < -1.5; \text{ and}$$

$$0.9 < f13/f1 < 1.5,$$

where f11 is a focal length of the first sub-lens unit, f12 is a focal length of the second sub-lens unit, and f13 is a focal length of the third sub-lens unit.

4. A zoom lens according to claim 2, wherein the first sub-lens unit includes at least one convex lens and at least one concave lens and satisfies the following relationship:

$$18 < v11n - v11p < 45,$$

where v11p is an average value of an Abbe constant of the at least one convex lens constituting the first sub-lens unit, and v11n is an average value of an Abbe constant of the at least one concave lens constituting the first sub-lens unit.

5. A zoom lens according to claim 2, wherein a lens disposed on the most object side of the first sub-lens unit is one of the at least one concave lens and satisfies the following relationship:

$$-0.5 < (R1+R2)/(R1-R2) < 2.5,$$

where R1 is a curvature radius of a surface on the object side of the at least one concave lens, and R2 is a curvature radius of a surface on the image side of the at least one concave lens.

6. A zoom lens according to claim 2, wherein the third sub-lens unit includes at least two convex lenses and at least one concave lens and satisfies the following relationship:

$$-2.5 \times 10^{-3} < (\theta 13p - \theta 13n)/(v13p - v13n) < -5.0 \times 10^{-4},$$

where v13p and θ13p are average values of Abbe constants and partial dispersion ratios of the at least two convex lenses constituting the third sub-lens unit, respectively, and v13n and θ13n are average values of an Abbe constant and a partial dispersion ratio of the at least one concave lens constituting the third sub-lens unit, respectively.

7. A zoom lens according to claim 2, wherein the second lens unit includes at least one convex lens and at least two concave lenses and satisfies the following relationship:

$$-3.5 \times 10^{-3} < (\theta 2p - \theta 2n)/(v2p - v2n) < -1.5 \times 10^{-3},$$

where v2p and θ2p are average values of an Abbe constant and a partial dispersion ratio of the at least one convex lens constituting the second lens unit, respectively, and v2n and θ2n are average values of Abbe constants and partial dispersion ratios of the at least two concave lenses constituting the second lens unit, respectively.

8. A zoom lens according to claim 2, wherein the first sub-lens unit includes one convex lens and at least two concave lenses, and a lens disposed on the most image side of the first sub-lens unit comprises the one convex lens.

9. A zoom lens according to claim 8, wherein the first sub-lens unit satisfies the following relationships:

$$-3.5 < f11p/f11 < -1.5; \text{ and}$$

$$0.5 < f11n/f11 < 0.8,$$

where f11p is a combined focal length of the one convex lens in the first sub-lens unit, f11n is a combined focal length of the at least two concave lenses in the first sub-lens unit, and f11 is a focal length of the first sub-lens unit.

10. An image pickup apparatus, comprising:

a zoom lens comprising in order from an object side:
  a first lens unit having a positive refractive power which does not move for varying magnification;
  a second lens unit having a negative refractive power which moves during varying magnification;
  a third lens unit having a positive refractive power which moves during varying magnification; and
  a fourth lens unit having a positive refractive power which does not move for varying magnification,
  wherein the third lens unit moves toward an image side and then toward the object side when varying magnification from a wide angle end to a telephoto end, and
  wherein the zoom lens satisfying the following relationships:

$$-3.2 < f1/f2 < -1.0;$$

$$-0.55 < f2/f3 < -0.20; \text{ and}$$

$$-0.7 < 1/\beta 3w < 0.5,$$

where f1 is a focal length of the first lens unit, f2 is a focal length of the second lens unit, f3 is a focal length of the third lens unit, and β3w is a lateral magnification of the third lens unit at the wide angle end when a ray enters from infinity; and a solid-state image pick-up element for receiving an image formed by the zoom lens.

* * * * *